(12) United States Patent
Misumi et al.

(10) Patent No.: US 8,899,311 B2
(45) Date of Patent: Dec. 2, 2014

(54) VEHICULAR AIR CONDITIONER

(75) Inventors: Haruki Misumi, Kariya (JP); Takuya Kataoka, Okazaki (JP); Koji Ota, Kariya (JP); Michio Nishikawa, Obu (JP); Shinichirou Hirai, Ichinomiya (JP); Yoshiaki Suzuki, Kariya (JP); Akihiro Haraguchi, Chiryu (JP); Katsuji Kuwada, Kariya (JP); Yasuhiro Sagou, Chiryu (JP)

(73) Assignee: Denso Corporation, Kariya (JP)

( * ) Notice: Subject to any disclaimer, the term of this patent is extended or adjusted under 35 U.S.C. 154(b) by 828 days.

(21) Appl. No.: 12/927,441

(22) Filed: Nov. 15, 2010

(65) Prior Publication Data

US 2011/0114739 A1    May 19, 2011

(30) Foreign Application Priority Data

Nov. 16, 2009  (JP) ................................. 2009-260765
Nov. 17, 2009  (JP) ................................. 2009-261753
Mar. 9, 2010    (JP) ................................. 2010-052041
Mar. 26, 2010  (JP) ................................. 2010-073143

(51) Int. Cl.
*B60H 1/00* (2006.01)

(52) U.S. Cl.
CPC .. *B60H 1/00742* (2013.01); *B60H 2001/00992* (2013.01)
USPC ................ 165/202; 165/203; 62/244; 454/75

(58) Field of Classification Search
CPC .. B60H 1/00; B60H 1/00642; B60H 1/00735; B60H 1/00742; B60H 1/00814; B60H 1/00007; B60H 1/00035; B60H 1/00064; B60H 1/0007; B60H 2001/00178; B60H 2001/00192; B60H 2001/002

USPC ................ 165/202, 203, 204; 62/244; 454/75
See application file for complete search history.

(56) References Cited

U.S. PATENT DOCUMENTS 2,817,282 A * 12/1957 Dolison ........................... 62/244
4,382,463 A *  5/1983 Ikebukuro ..................... 165/203
(Continued)

FOREIGN PATENT DOCUMENTS

JP   H06-156056   6/1994
JP   8-25948      1/1996
(Continued)

OTHER PUBLICATIONS

Office action dated Dec. 3, 2013 in corresponding Japanese Application No. 2010-073143.

(Continued)

*Primary Examiner* — Ljiljana Ciric
(74) *Attorney, Agent, or Firm* — Harness, Dickey & Pierce, PLC

(57) ABSTRACT

When there is no occupant in seats other than a driver seat during a foot mode, an air-conditioning controller executes a single seat concentration mode to prevent blowing of warm air to a passenger seat and a backseat by closing foot outlets on a passenger seat side and a backseat side. In this case, in order to maintain an air volume blown from the foot outlet on a driver seat side when the controller changes the mode from the normal foot mode to the single seat concentration mode, the controller sets a blower level to be lower than in the case of the normal foot mode with respect to the same target blown air temperature.

8 Claims, 33 Drawing Sheets

(56) References Cited

U.S. PATENT DOCUMENTS

| | | | |
|---|---|---|---|
| 4,498,309 A * | 2/1985 | Kobayashi et al. | 165/43 |
| 4,911,257 A * | 3/1990 | Kajimoto et al. | 454/75 |
| 5,086,628 A * | 2/1992 | Hashimoto | 62/244 |
| 5,323,872 A * | 6/1994 | Yabe | 454/75 |
| 5,361,865 A * | 11/1994 | Lindner | 454/75 |
| 5,390,728 A * | 2/1995 | Ban | 165/204 |
| 5,452,587 A * | 9/1995 | Honda et al. | 62/244 |
| 5,582,234 A * | 12/1996 | Samukawa et al. | 165/204 |
| 5,642,856 A * | 7/1997 | Samukawa et al. | 165/203 |
| 5,775,415 A * | 7/1998 | Yoshimi et al. | 165/202 |
| 5,839,506 A * | 11/1998 | Honda et al. | 165/203 |
| 5,868,616 A * | 2/1999 | Ohsaki et al. | 454/75 |
| 5,878,809 A * | 3/1999 | Heinle | 165/202 |
| 5,954,577 A * | 9/1999 | Meckler | 454/75 |
| 6,012,297 A * | 1/2000 | Ichishi et al. | 165/203 |
| 6,079,485 A * | 6/2000 | Esaki et al. | 165/43 |
| 6,454,178 B1 * | 9/2002 | Fusco et al. | 165/203 |
| 6,859,687 B2 * | 2/2005 | Obradovich et al. | 165/202 |
| 6,892,807 B2 * | 5/2005 | Fristedt et al. | 165/202 |
| 7,222,667 B2 * | 5/2007 | Fujiki et al. | 165/202 |
| 7,246,656 B2 * | 7/2007 | Ichishi et al. | 165/202 |
| 7,246,657 B2 * | 7/2007 | Oga et al. | 165/203 |
| 7,255,161 B2 * | 8/2007 | Durach et al. | 165/202 |
| 7,497,251 B2 * | 3/2009 | Ichishi et al. | 165/202 |
| 7,610,767 B2 * | 11/2009 | Kadle et al. | 62/244 |
| 7,775,453 B2 * | 8/2010 | Hara | 62/244 |
| 7,828,050 B2 * | 11/2010 | Esaki | 165/202 |
| 7,904,220 B2 * | 3/2011 | Szczerba et al. | 165/202 |
| 8,181,475 B2 * | 5/2012 | Kanemaru | 62/244 |
| 8,267,165 B2 * | 9/2012 | Nanaumi et al. | 165/202 |
| 8,376,037 B2 * | 2/2013 | Nanaumi et al. | 165/204 |
| 2002/0161501 A1 * | 10/2002 | Dulin et al. | 701/45 |
| 2002/0197949 A1 * | 12/2002 | Kampf et al. | 454/75 |
| 2003/0136138 A1 * | 7/2003 | Tsuboi et al. | 62/244 |
| 2004/0053571 A1 * | 3/2004 | Aoki et al. | 454/159 |
| 2004/0065101 A1 * | 4/2004 | Krupp et al. | 62/244 |
| 2004/0089005 A1 * | 5/2004 | Ichishi et al. | 62/244 |
| 2004/0093885 A1 * | 5/2004 | Ito et al. | 62/244 |
| 2004/0107713 A1 * | 6/2004 | Aoki | 62/244 |
| 2004/0118555 A1 * | 6/2004 | Fristedt et al. | 165/202 |
| 2005/0039902 A1 * | 2/2005 | Oga et al. | 165/203 |
| 2005/0103488 A1 * | 5/2005 | Ichishi et al. | 165/202 |
| 2008/0202139 A1 * | 8/2008 | Darroman et al. | 62/244 |
| 2009/0000778 A1 * | 1/2009 | Nathan et al. | 165/202 |
| 2009/0031741 A1 * | 2/2009 | Hara et al. | 62/239 |
| 2010/0263395 A1 * | 10/2010 | Adachi et al. | 62/244 |
| 2011/0284202 A1 * | 11/2011 | Hirai et al. | 165/287 |

FOREIGN PATENT DOCUMENTS

| | | |
|---|---|---|
| JP | 9-20127 | 1/1997 |
| JP | 9-323525 | 12/1997 |
| JP | 2000-142081 | 5/2000 |
| JP | 2002-12020 | 1/2002 |
| JP | 2002-46455 | 2/2002 |
| JP | 2003-252026 | 9/2003 |
| JP | 2004-090681 | 3/2004 |
| JP | 2004-136844 | 5/2004 |
| JP | 2004-203190 | 7/2004 |
| JP | 2006-103584 | 4/2006 |
| JP | 2007-253884 | 10/2007 |
| JP | 2008-265382 | 11/2008 |
| JP | 2009-255917 | 11/2009 |

OTHER PUBLICATIONS

Office action dated Apr. 16, 2013 in corresponding Japanese Application No. 2010-073143.

Office action dated Jun. 4, 2013 in corresponding Japanese Application No. 2010-052041.

Office Action issued Mar. 5, 2013 n corresponding Japanese Application No. 2009-261753 with English translation.

* cited by examiner

FIG. 30

| | FACE OUTLETS | | | | FOOT OUTLETS | | | DEFROSTER OUTLET | ABOVE-THE-KNEE OUTLET |
|---|---|---|---|---|---|---|---|---|---|
| | PASSENGER SEAT SIDE FACE | PASSENGER SEAT CENTER | DRIVER SEAT CENTER | DRIVER SEAT SIDE FACE | PASSENGER SEAT | BACKSEAT | DRIVER SEAT | | |
| FOOT MODE (FOUR SEATS) | YES | NO | NO | YES | YES | YES | YES | YES | NO |
| SINGLE SEAT CONCENTRATION | NO | NO | YES | YES | NO | NO | YES | YES | YES |

VEHICULAR AIR CONDITIONER

CROSS REFERENCE TO RELATED APPLICATION

This application is based on and incorporates herein by reference Japanese Patent Applications No. 2009-260765 filed on Nov. 16, 2009, No. 2009-261753 filed on Nov. 17, 2009, No. 2010-52041 filed on Mar. 9, 2010, and No. 2010-73143 filed on Mar. 26, 2010.

BACKGROUND OF THE INVENTION

1. Field of the Invention

The present invention relates to a vehicular air conditioner.

2. Description of Related Art

There is a vehicular air conditioner that turns blown air toward a driver seated in a driver seat when no passenger is in a passenger seat, whereby much air-conditioning wind directly hits the driver seated in the driver seat, for example, as described in Patent document 1 (JP-A-H8-25948) or Patent document 2 (JP-A-2000-142081).

In recent years, improvement of fuel consumption of the vehicle has been required, and therefore energy saving of the vehicular air conditioner has been desired.

Patent document 1 describes improving comfort for the occupant by turning the wind direction of the outlet on the passenger seat side toward the driver seat. However, nothing is described in Patent document 1 about the energy saving of the vehicular air conditioner.

There is a vehicular air conditioner that has a middle outlet for blowing warm air toward a lower body of an occupant extending from the tights to the waist, for example, as described in Patent document 3 (JP-A-2002-12020) and Patent document 4 (JP-A-2004-203190). For example, in the vehicular air conditioner described in Patent document 3, the middle outlet is formed in a side surface of a center console.

Such the vehicular air conditioner blows the warm air toward the lower body of the occupant during heating, thereby improving comfort of the occupant as compared to the case where the warm air is blown from a foot outlet toward the feet of the occupant.

In this way, by providing the outlet for blowing the air-conditioning wind toward the lower body of the occupant and by blowing the warm air from the outlet during the heating, the occupant's sensation of warmth can be improved as compared to the case where the warm air is blown from the foot outlet toward the feet of the occupant.

However, in the case where such the outlet is provided in front of the occupant with respect to a front-back direction of the vehicle, if the warm air blowing direction from the outlet heads to the head of the occupant when seen from an upper side of the vehicle, the warm air having flown above the thighs of the occupant flows along the upper body of the occupant, whereby the warm air strikes against the face and causes flush in the face.

Such the problem of the flush in the face occurs not only in the case where the outlet is provided in front of the occupant but also in the case where the outlet is provided in a position other than the front position in the vehicle.

There is a vehicular air conditioner having an air-conditioning case formed with a center face opening section and a side face opening section. The center face opening section is connected to a center face outlet used for blowing air-conditioning wind from a central portion in a vehicle compartment toward an upper body of an occupant. The side face opening section is connected to a side face outlet used for blowing the air-conditioning wind from both of right and left sides in the vehicle compartment toward the upper body of the occupant (for example, refer to Patent document 5: JP-A-2004-136844).

This kind of the vehicular air conditioner has a door section in the air-conditioning case for opening and closing the center face opening section and the side face opening section. The common vehicular air conditioner uses the door for opening or closing the respective face opening sections at the same time. However, for example, the vehicular air conditioner capable of performing the air conditioning independently between the right side and the left side of the vehicle uses a construction capable of adjusting the opening degree of the door that opens and closes the opening section on a passenger seat side independently in the face opening sections.

In recent years, it has been desired to make the various kinds of component parts of the vehicular air conditioner common among different types of vehicles because of demand for cost reduction of the vehicular air conditioner. For example, the air-conditioning case is one of the component parts, the common use of which is desired.

However, since the air-conditioning case incorporates various air-conditioning devices, it is difficult to make the air-conditioning case common among the various vehicular air conditioners. For example, if it is tried to install a door section for adjusting an opening degree of a part of multiple face opening sections independently into an air-conditioning case incorporating a door section for opening or closing multiple face opening sections at the same time, a large change of the air-conditioning case is required and cost increases. It is because the structure of the door section, a position of a door shaft of the door section and the like inside the air-conditioning case are different between the two air-conditioning cases. Such the problem occurs not only in the case of the face opening sections but also in the case of foot opening sections or the like.

SUMMARY OF THE INVENTION

It is an object of the present invention to provide a vehicular air conditioner realizing energy saving.

It is another object of the present invention to provide a vehicular air conditioner and an outlet section thereof capable of inhibiting flush in a face of an occupant while improving occupant's sensation of warmth during heating.

It is yet another object of the present invention to provide a vehicular air conditioner capable of adjusting independently an opening degree of at least one of multiple opening sections of an air-conditioning case without changing the air-conditioning case.

According to a first example aspect of the present invention, a vehicular air conditioner has a switching section and a controller. The switching section switches between a normal air-conditioning mode, in which air-conditioning wind is blown from a driver seat outlet and the other outlets, and a single seat concentration mode, in which the blowing of the air-conditioning wind from at least one of the other outlets is prohibited and the air-conditioning wind is blown from the driver seat outlet. The controller is configured to control the switching section and to control an air blowing amount of the blower by setting a supply power to the blower in accordance with an air-conditioning heat load.

The controller is configured to execute the normal air-conditioning mode when an occupant is seated in the seat other than the driver seat. The controller is configured to execute the single seat concentration mode when there is no occupant in the seats other than the driver seat. The controller is configured to set the supply power to the blower in the single seat concentration mode to be smaller than in the normal air-conditioning mode with respect to the same air-conditioning heat load.

According to the above-described construction, when there is no occupant in the seats other than the driver seat, the single seat concentration mode is executed and the supply power to the blower is set smaller than in the case of the normal air-conditioning mode with respect to the same air-conditioning heat load. Accordingly, the electric power consumed by the electric motor of the blower can be reduced, thereby realizing the energy saving.

If the supply power to the blower is reduced, the target air blowing amount of the blower decreases.

If the supply power to the blower is maintained constant and the mode is switched from the normal air-conditioning mode to the single seat concentration mode, the air volume of the air-conditioning wind from the outlet on the driver seat side increases from the air volume in the case of the normal air-conditioning mode. In this case, the air volume of the air-conditioning wind blown from the outlet on the driver seat side differs between the normal air-conditioning mode and the single seat concentration mode, so the driver's feeling of being air-conditioned differs.

Therefore, in the configuration of the target air blowing amount of the blower in the single seat concentration mode, in order to maintain the air-conditioned feeling equal to the feeling in the normal air-conditioning mode, the supply power to the blower should be preferably set to conform the air volume of the air-conditioning wind blown from the outlet on the driver seat side in the single seat concentration mode to an air volume of the air-conditioning wind blown from the outlet on the driver seat side in the normal air-conditioning mode with respect to the same air-conditioning heat load.

According to a second example aspect of the present invention, the vehicular air conditioner further has a heating heat exchanger provided in an air-conditioning unit for heating the blown air by using a cooling fluid, which is used for cooling a drive unit used to obtain a driving force for running a vehicle, as a heat source. The controller is configured to request an operation of the drive unit when temperature of the cooling fluid is lower than predetermined temperature. The controller is configured to set the predetermined temperature based on the air-conditioning heat load. The controller is configured to set the predetermined temperature in the single seat concentration mode to be lower than in the normal air-conditioning mode with respect to the same air-conditioning heat load.

According to the above-described construction, the predetermined temperature in the single seat concentration mode is set lower than in the normal air-conditioning mode with respect to the same air-conditioning heat load. Accordingly, the stoppage period from the timing immediately after the drive unit is stopped can be lengthened, and the operation rate of the drive unit can be reduced as compared to the normal air-conditioning mode. Therefore, according to the present invention, the consumption energy of the drive unit can be reduced.

In the present invention, it is desirable to set the predetermined temperature and the supply power to the blower in a range where average temperature around the occupant becomes equal to or higher than the average temperature around the occupant in the case of the normal air-conditioning mode. Thus, the consumption energy of the drive unit can be reduced without spoiling the occupant's feeling of being warmed as compared to the case of the normal air-conditioning mode. Specifically, the feeling of being warmed similarly to the case of the normal air-conditioning mode can be maintained by setting the predetermined temperature and the supply power to the blower to conform the average temperature around the occupant to the average temperature around the occupant in the case of the normal air-conditioning mode.

According to a third example aspect of the present invention, the controller is configured to permit the blowing of the air-conditioning wind from the outlet, the blowing of the air-conditioning wind from which has been prohibited during the normal air-conditioning mode, among the outlets corresponding to the driver seat during the single seat concentration mode. By increasing the number of the outlets blowing the warm air toward the occupant in the driver seat, the driver's feeling of being warmed can be improved.

According to a fourth example aspect of the present invention, the controller is configured to set the predetermined temperature to be lower than in the normal air-conditioning mode with respect to the same air-conditioning heat load when the occupant manipulates an economy switch to select an economy mode during the single seat concentration mode.

According to a fifth example aspect of the present invention, the plurality of outlets are foot outlets for blowing the air-conditioning wind toward feet of occupants in the driver seat and the other seats. The controller is configured to execute the single seat concentration mode during a foot outlet mode, in which the warm air is blown from at least the foot outlets.

According to a sixth example aspect of the present invention, the controller is configured to set the power supply to the blower to be smaller than in the normal air-conditioning mode with respect to the same air-conditioning heat load when the occupant manipulates an economy switch to select an economy mode during the single seat concentration mode.

According to a seventh example aspect of the present invention, the controller is configured to control an opening degree adjusting section during the single seat concentration mode such that an opening degree of a defroster outlet becomes smaller than in the normal air-conditioning mode.

If the single seat concentration mode is executed, the air blowing amount from the defroster outlet increases as compared to the normal air-conditioning mode. Therefore, it is desirable to adjust the air blowing amount from the defroster outlet by reducing the opening degree of the defroster outlet as in the seventh example aspect of the present invention.

According to an eighth example aspect of the present invention, a vehicular air conditioner has a switching section, an air blowing amount ratio changing section, and a controller. The switching section is provided in an air-conditioning unit for switching between a normal air-conditioning mode, in which air-conditioning wind is blown from a driver seat outlet and a passenger seat outlet, and a single seat concentration mode, in which the blowing of the air-conditioning wind from the passenger seat outlet is prohibited and the air-conditioning wind is blown from the driver seat outlet. The air blowing amount ratio changing section is provided in the air-conditioning unit for changing a ratio between an air volume blown from the driver seat outlet and an air volume blown from the passenger seat outlet. The controller is configured to control the switching section and to control an air blowing amount of the blower by setting a supply power to the blower in accordance with an air-conditioning heat load.

The controller is configured to calculate target blown air temperature, which is target temperature of the air blown from the driver seat outlet and the passenger seat outlet, based on the air-conditioning heat load. The controller is configured to calculate heated air temperature, which is temperature of the air heated by a heating heat exchanger, based on temperature of a cooling fluid.

The controller is configured to execute the single seat concentration mode in a certain case where there is no occupant in the seats other than the driver seat and the heated air temperature is lower than the target blown air temperature. The controller is configured to set the power supply to the blower in the certain case to be smaller than in the normal air-conditioning mode with respect to the same air-conditioning heat load.

The controller is configured to execute the normal air-conditioning mode in another case where there is no occupant in the seats other than the driver seat and the heated air temperature is higher than the target blown air temperature. The controller is configured to control the air blowing amount ratio changing section in the another case such that the air blowing amount from the driver seat outlet decreases relatively and the air blowing amount from the passenger seat outlet increases relatively.

Also the above-described construction executes the single seat concentration mode and sets the supply power to the blower to be low when there is no occupant in the seats other than the driver seat and the heated air temperature is lower than the target blown air temperature. Therefore, the effect similar to the effect of the first example aspect of the present invention can be exerted.

If the single seat concentration mode is executed when the heated air temperature is higher than the target blown air temperature unlike the present invention, the heat amount of the cooling fluid not used in the heat exchange with the air in the heating heat exchanger is released from the surface of the drive unit. As a result, the heat amount cannot be used effectively.

As contrasted thereto, according to the present invention, the warm air is blown from the outlet on the passenger seat side in addition to the outlet on the driver seat side when there is no occupant in the seats other than the driver seat and the heated air temperature is higher than the target blown air temperature. Therefore, the heat amount of the cooling fluid can be used not only for heating the driver seat but also for heating the entire vehicle compartment. As a result, the heat amount of the cooling fluid can be used effectively.

When the air volume blown from the outlet is small, the temperature of the blown air becomes higher than in the case where the air volume blown from the outlet is large. Therefore, according to the present invention, the temperature of the blown air from the outlet on the driver seat side can be made higher than the temperature of the blown air from the outlet on the passenger seat side, thereby improving the driver's sensation of warmth.

According to a ninth example aspect of the present invention, the air blowing amount ratio changing section is an air volume ratio changing door that is provided upstream of the heating heat exchanger with respect to an airflow direction and that changes a ratio between an air volume flowing into the air passageway on the driver seat side and an air volume flowing into the air passageway on the passenger seat side. The air volume changing door is constructed such that the air volume blown from the outlet on the driver seat side decreases relatively and the air volume blown from the outlet on the passenger seat side increases relatively if the air volume ratio changing door makes the air volume flowing into the air passageway on the driver seat side smaller than the air volume flowing into the air passageway on the passenger seat side.

According to a tenth example aspect of the present invention, the air blowing amount ratio changing section is an air passage area changing section that changes a ratio between an air passage area on the driver seat side and an air passage area on the passenger seat side in the heating heat exchanger. The air passage area changing section is constructed such that the air volume blown from the outlet on the driver seat side decreases relatively and the air volume blown from the outlet on the passenger seat side increases relatively if the air passage area changing section makes the air passage area on the driver seat side smaller than the air passage area on the passenger seat side.

According to an eleventh example aspect of the present invention, a vehicular air conditioner has a switching section, a duct section, an instrument panel air passageway, an opening-closing section and a controller. The switching section is provided in an air-conditioning unit for switching between a normal air-conditioning mode, in which air-conditioning wind is blown from a driver seat outlet corresponding to a driver seat and other outlets corresponding to seats other than the driver seat, and a single seat concentration mode, in which the blowing of the air-conditioning wind from at least one of the other outlets is prohibited and the air-conditioning wind is blown from the driver seat outlet. The duct section is positioned in an inside space of an instrument panel in the foremost portion of the vehicle compartment and arranged in the air-conditioning unit. The duct section passes warm air having passed through the heating heat exchanger toward the driver seat outlet. The instrument panel air passageway is provided in the air-conditioning unit for blowing the warm air having passed through the heating heat exchanger toward the inside space of the instrument panel. The opening-closing section is for opening and closing the instrument panel air passageway. The controller is configured to control the switching section and the opening-closing section and to control an air blowing amount of a blower by setting a supply power to the blower in accordance with an air-conditioning heat load.

The controller is configured to calculate target blown air temperature, which is target temperature of the air blown from the outlets, based on the air-conditioning heat load. The controller is configured to calculate heated air temperature, which is temperature of the air heated by the heating heat exchanger, based on temperature of the cooling fluid.

The controller is configured to execute the single seat concentration mode and to close the instrument panel air passageway with the opening-closing section in a certain case where there is no occupant in the seats other than the driver seat and the heated air temperature is lower than the target blown air temperature. The controller is configured to set the power supply to the blower in the certain case to be smaller than in the normal air-conditioning mode with respect to the same air-conditioning heat load.

The controller is configured to execute the single seat concentration mode and to warm the duct section by opening the instrument panel air passageway with the opening-closing section and by blowing the warm air to the inside space of the instrument panel when there is no occupant in the seats other than the driver seat and the heated air temperature is higher than the target blown air temperature.

Also the above-described construction executes the single seat concentration mode and sets the supply power to the blower to be low when there is no occupant in the seats other than the driver seat and the heated air temperature is lower than the target blown air temperature. Therefore, the effect similar to the effect of the first example aspect of the present invention can be exerted.

If the single seat concentration mode is executed when the heated air, temperature is higher than the target blown air temperature unlike the present invention, the heat amount not used in the heat exchange with the air in the heating heat exchanger is released from the surface of the drive unit. Therefore, the heat amount cannot be used effectively.

As contrasted thereto, according to the present invention, the single seat concentration mode is executed and the warm air is blown to the inside space of the instrument panel when the heated air temperature is higher, than the target blown air temperature. Accordingly, the heat amount of the cooling fluid can be used effectively not only for heating the driver seat but also for heating the duct section. Furthermore, since the duct section is heated, the heat radiation loss, which can be caused when the warm air flows inside the duct section toward the outlet on the driver seat side, can be reduced.

According to a twelfth example aspect of the present invention, a vehicular air conditioner has an air-conditioning unit, a switching section, a heating heat exchanger, and a controller. The air-conditioning unit has a plurality of outlets corresponding to a driver seat and other seats and blows air-conditioning wind from the outlets to the driver seat and the other seats. The switching section is provided in the air-conditioning unit for switching between a normal air-conditioning mode, in which the air-conditioning wind is blown from a driver seat outlet corresponding to the driver seat and the other outlets corresponding to the seats other than the driver seat, and a single seat concentration mode, in which the blowing of the air-conditioning wind from at least one of the other outlets is prohibited and the air-conditioning wind is blown from the driver seat outlet. The heating heat exchanger is provided in the air-conditioning unit and heats the blown air heading to an inside of a vehicle compartment by using a cooling fluid, which cools a drive unit used for obtaining a driving force for running the vehicle, as a heat source. The controller is Configured to control the switching section and to request an operation of the drive unit when temperature of the cooling fluid is lower than predetermined temperature.

The controller is configured to execute the normal air-conditioning mode when there is an occupant in the seat other than the driver seat. The controller is configured to execute the single seat concentration mode when there is no occupant in the seats other than the driver seat. The controller is configured to set the predetermined temperature based on an air-conditioning heat load.

The controller is configured to set the predetermined temperature in the single seat concentration mode to be lower than in the normal air-conditioning mode with respect to the same air-conditioning heat load.

Also with such the construction, like the second example aspect of the present invention, the predetermined temperature in the single seat concentration mode is set lower than in the case of the normal air-conditioning mode with respect to the same air-conditioning heat load. Accordingly, the stoppage period from the timing immediately after the drive unit is stopped can be lengthened, and the operation rate of the drive unit can be reduced as compared to the normal air-conditioning mode. Therefore, according to the present invention, the energy consumed by the drive unit can be reduced.

If the mode is switched from the normal air-conditioning mode to the single seat concentration mode while maintaining the air volume setting of the blower constant, the air volume blown from the outlet corresponding to the driver seat increases. In the case where the blown air heated by the heating heat exchanger is blown from the outlet, there is a relationship that the average temperature around the occupant increases as the blowing amount of the air blown from the outlet increases when the temperature of the cooling fluid is the same. Therefore, even if the temperature of the cooling fluid is decreased in the single seat concentration mode, the influence on the driver's sensation of being warmed is small as compared to the case of the normal air-conditioning mode. Therefore, the predetermined temperature can be set lower than in the normal air-conditioning mode.

According to a thirteenth example aspect of the present invention, a vehicular air conditioner has an outlet section for blowing warm air to a lower body of an occupant extending from thighs to a waist. The outlet section includes a right side outlet section configured to blow the warm air such that a mainstream of the warm air passes by way of a position of the right thigh of the occupant and passes by a right side of a head of the occupant. The outlet section includes a left side outlet section configured to blow the warm air such that another mainstream of the warm air passes by way of a position of the left thigh of the occupant and passes by a left side of the head of the occupant.

With such the construction, the warm air flows above the both thighs of the occupant. Therefore, the lower body of the occupant extending from the thighs to the waist can be warmed. Accordingly, the occupant's sensation of warmth can be improved as compared to the case where the warm air is blown toward the feet.

The warm blown air flows through the spaces on the right side and the left side of the head of the occupant when seen from the upper side of the vehicle. Thus, the warm air flows to steer around the head of the occupant. Therefore, the flush in the occupant's face can be inhibited.

According to a fourteenth example aspect of the present invention, a vehicular air conditioner has an outlet section for blowing warm air to a lower body of an occupant extending from thighs to a waist. A wind direction of the outlet section is set such that the outlet section blows the warm air in a direction passing by way of a position of the right thigh of the occupant and passing by a right side of a head of the occupant and in a direction passing by way of a position of the left thigh of the occupant and passing by a left side of the head of the occupant. Also with such the construction, the effect similar to the effect of the thirteenth example aspect can be exerted.

According to a fifteenth example aspect of the present invention, a vehicular air conditioner has an outlet section for blowing warm air to a lower body of an occupant extending from thighs to a waist. The outlet section is configured to form a wind speed distribution such that wind speed of the warm air passing by way of a position of the right thigh of the occupant and heading to a position on a right side of a head of the occupant and wind speed of the warm air passing by way of a position of the left thigh of the occupant and heading to a space on a left side of the head of the occupant are relatively high and such that wind speed of the warm air heading to a position of the head of the occupant is relatively low.

With such the construction, the lower body of the occupant extending from the thighs to the waist can be warmed with the warm air flowing from the outlet section toward the positions of the both thighs of the occupant. Accordingly, the occupant's sensation of warmth can be improved as compared to the case where the warm air is blown toward the feet.

In addition, since the wind speed of the warm air heading from the outlet section toward the head position of the occupant is lowered, the flow of the warm air heading to the occupant's face can be reduced, and the flush in the occupant's face can be inhibited.

According to a sixteenth example aspect of the present invention, a vehicular air conditioner has an outlet section for blowing warm air to a lower body of an occupant extending from thighs to a waist. The outlet section includes a right side outlet section for blowing the warm air such that a mainstream of the warm air flows above a region of a seat surface of a seat of a vehicle on a right side of a virtual straight line, which connects a lateral center position of the entire outlet section and a center position of a back half portion of the seat surface of the seat. The mainstream is a stream of the warm air in a wind direction in which wind speed is the highest among airstreams blown from the right side outlet section. The outlet section includes a left side outlet section for blowing the warm air such that another mainstream of the warm air flows above a region of the seat surface of the seat on a left side of the virtual straight line. The another mainstream is a stream of the warm air in a wind direction in which the wind speed is the highest among airstreams blown from the left side outlet section.

With such the construction, the warm air is blown such that the mainstreams flow through the space on the right side of the virtual line and the space on the left side of the virtual line over the seat surface. Therefore, the warm air flows above the both thighs of the occupant. Thus, the lower body of the occupant extending from the thighs to the waist can be warmed, so the occupant's sensation of warmth can be improved as compared to the case where the warm air is blown toward the feet.

The lateral center position of the entire outlet section in the sixteenth example aspect of the present invention means the center of the outlet section when there is only one outlet section. When there are two outlet sections, the lateral center position means the middle point between the two outlet sections. When there are three or more outlet sections, the lateral center position means the middle point between the two outlet sections positioned in the both lateral ends.

The center position of the back half of the seat surface with respect to the front-back direction of the vehicle is a standard position of the head when seen from the upper side of the vehicle. Since the warm air flows to steer around the position, the flush in the occupant's face can be inhibited.

According to a seventeenth example aspect of the present invention, the outlet section is located within a certain range in a member positioned in front of a seat of the vehicle. The outlet section overlaps with the seat in the front-back direction of the vehicle in the certain range.

It is desirable to provide the outlet section in front of the seat in this way. With such the construction, the distances from the outlet section to the both thighs can be shortened as compared to the case where the outlet section is provided only on the right side or the left side of the seat. As a result, the sensation of warmth in the right thigh and the sensation of warmth in the left thigh can be approximated to the same level.

According to an eighteenth example aspect of the present invention, the outlet section is configured to blow the warm air in a V-shape toward the spaces on the right side and the left side of the head of the occupant when seen from the upper side of the vehicle.

According to a nineteenth example aspect of the present invention, the outlet section has a defining member that defines blowing directions of the warm air to blow the warm air in the V-shape.

By blowing the warm air in the V-shape, the warm air flows to the outside of the occupant. Therefore, the flow of the warm air toward the occupant's face can be inhibited as compared to the case where the warm air is blown to both the right side and the left side of the occupant's head in parallel or in a counter-V-shape.

According to a twentieth example aspect of the present invention, the outlet section is arranged in a position between a seat surface of the seat and an upper end of a steering wheel with respect to an up-and-down direction of the vehicle.

According to a twenty-first example aspect of the present invention, the outlet section is configured to blow the warm air downward to the thighs of the occupant. It is because the warm air can be inhibited from flowing toward the occupant's face positioned higher than the thighs by blowing the warm air downward.

According to a twenty-second example aspect of the present invention, the outlet section is provided separately from a face outlet section for blowing air-conditioning wind toward an upper body of the occupant and a foot outlet section for blowing the air-conditioning wind toward feet of the occupant.

According to a twenty-third example aspect of the present invention, the vehicular air conditioner is configured to prohibit the blowing of the warm air from the foot outlet section provided for the seat other than the driver seat, to blow the warm air from the foot outlet section provided for the driver seat, and to blow the warm air from the outlet section toward the lower body of the occupant extending from the thighs to the waist when there is no occupant in the seats other than the driver seat.

According to a twenty-fourth example aspect of the present invention, an outlet section of a vehicular air conditioner is for blowing warm air into a vehicle compartment. The outlet section is arranged in front of an occupant in a front-back direction of a vehicle for blowing the warm air toward a lower body of the occupant extending from thighs to a waist. The outlet section has a right side outlet section configured to blow the warm air such that a mainstream of the warm air heads to a position of the right thigh of the occupant and passes by a right side of a head of the occupant. The outlet section has a left side outlet section configured to blow the warm air such that another mainstream heads to a position of the left thigh of the occupant and passes by a left side of the head of the occupant. Also with such the construction, an effect similar to the effect of the thirteenth example aspect of the present invention can be exerted.

According to a twenty-fifth example aspect of the present invention, a vehicular air conditioner has an air-conditioning case, a plurality of duct members, an opening section opening-closing section, and an opening degree adjusting section. The air-conditioning case is formed with a plurality of opening sections corresponding to a plurality of outlets provided in a vehicle compartment. The plurality of duct members define air passageways for leading air inside the air-conditioning case from the opening sections to the outlets. The opening section opening-closing section is provided in the air-conditioning case for opening and closing the plurality of opening sections. The opening degree adjusting section is provided downstream of the opening section opening-closing section with respect to an airflow direction for adjusting an opening degree of at least one of the plurality of opening sections.

The opening degree adjusting section has a door section for adjusting the opening degree of the opening section and a frame member for supporting the door section. The frame member has an engaging section that can be engaged with an opening edge section of the opening section in a state where the frame member supports the door section, whereby the frame member is constructed to be attachable to the air-conditioning case.

According to the above-described construction, the opening degree adjusting section as the body separate from the air-conditioning case can be attached to at least one of the multiple opening sections formed in the air-conditioning case. Therefore, the opening degree of at least one of the multiple opening sections of the air-conditioning case can be adjusted independently without changing the air-conditioning case. As a result, the common air-conditioning case can be used among the vehicular air conditioners having the different functions.

According to a twenty-sixth example aspect of the present invention, the engaging section is constructed to be engaged with an inside of the opening edge section of the opening section. The frame member is accommodated inside the opening section while the frame member supports the door section.

According to the above-described construction, the frame member can be accommodated inside the air-conditioning case, so an external shape of the air-conditioning case is unchanged even if the opening degree adjusting section is attached. Therefore, for example, when the duct member is connected to an outside of the opening edge section of the opening section of the air-conditioning case, there is no need to change a structure of a connection of the duct member connected to the air-conditioning case. As a result, the common duct member can be used among the vehicular air conditioners having the different functions.

According to a twenty-seventh example aspect of the present invention, the engaging section is constructed to be engaged with an outside of the opening edge section of the opening section. The frame member is provided in a connection connecting the duct member and the opening section in a state where the frame member supports the door section.

According to a twenty-eighth example aspect of the present invention, the door section has a sliding door constructed to move along an opening plane of the opening section to adjust the opening degree of the opening section. The air-conditioning case is formed with a door accommodation section for accommodating the sliding door inside the plurality of opening sections. The opening plane of the present invention means a virtual plane connecting the opening edge section of the opening section.

According to a twenty-ninth example aspect of the present invention, the opening degree adjusting section is provided in at least one of the opening sections connected to the outlets for blowing the air-conditioning wind toward a passenger seat among the plurality of opening sections. Thus, the air-conditioning wind can be blown to the driver seat side in priority to the passenger seat side. For example, the air-conditioning concentrated on the driver seat side can be realized by adjusting the opening degree of the opening section on the passenger seat side to blow the air-conditioning wind to the driver seat side in priority to the passenger seat side when there is no occupant in the passenger seat.

According to a thirtieth example aspect of the present invention, the door sections are attached to the opening edge sections of the two or more opening sections of the air-conditioning case. The opening degree adjusting section drives the respective door sections corresponding to the two or more opening sections with a common drive section.

By using the common drive section for driving the multiple door sections, the increase in the number of parts of the opening degree adjusting section can be inhibited.

According to a thirty-first example aspect of the present invention, two duct members among the plurality of duct members are connected to at least one of the plurality of opening sections. The opening degree adjusting section is constructed to be able to adjust passage opening degrees of air passageways in the two duct members with the door section.

Thus, the opening degree adjusting section can adjust the air volume distribution of the air-conditioning winds blown via the two duct members.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 30 is a diagram showing blowing positions during foot modes of a single seat concentration mode and a four-seat air-conditioning according to the eleventh embodiment;

DETAILED DESCRIPTION OF EXAMPLE EMBODIMENTS

Figure 1:
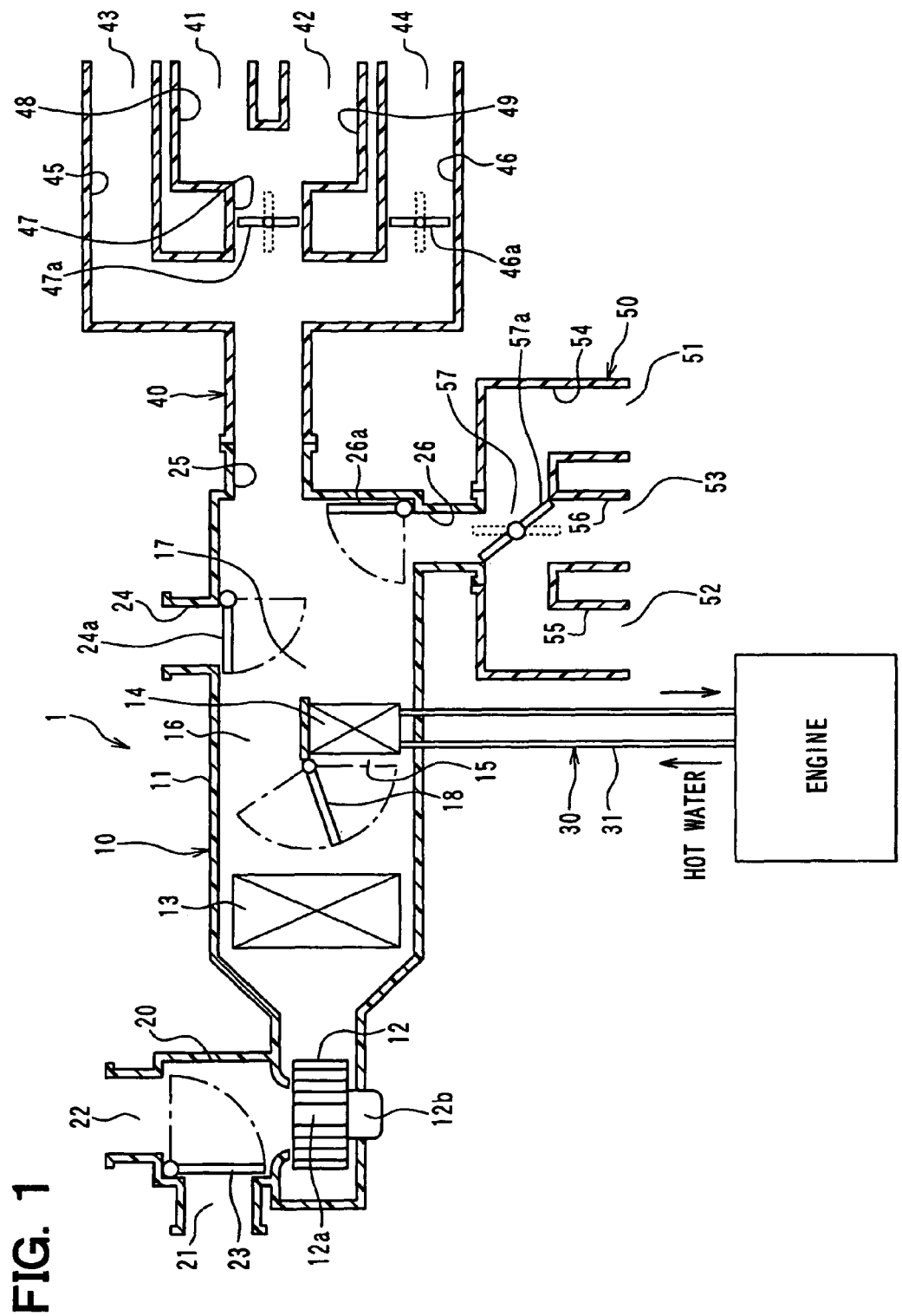
FIG. 1 is a schematic diagram showing an entire construction of a vehicular air conditioner according to a first embodiment of the present invention.

Hereinafter, embodiments of the present invention will be described based on the drawings. In the following description of the respective embodiments, the same sign is used in the drawings for identical or equivalent parts.

(First Embodiment)

Figure 2:
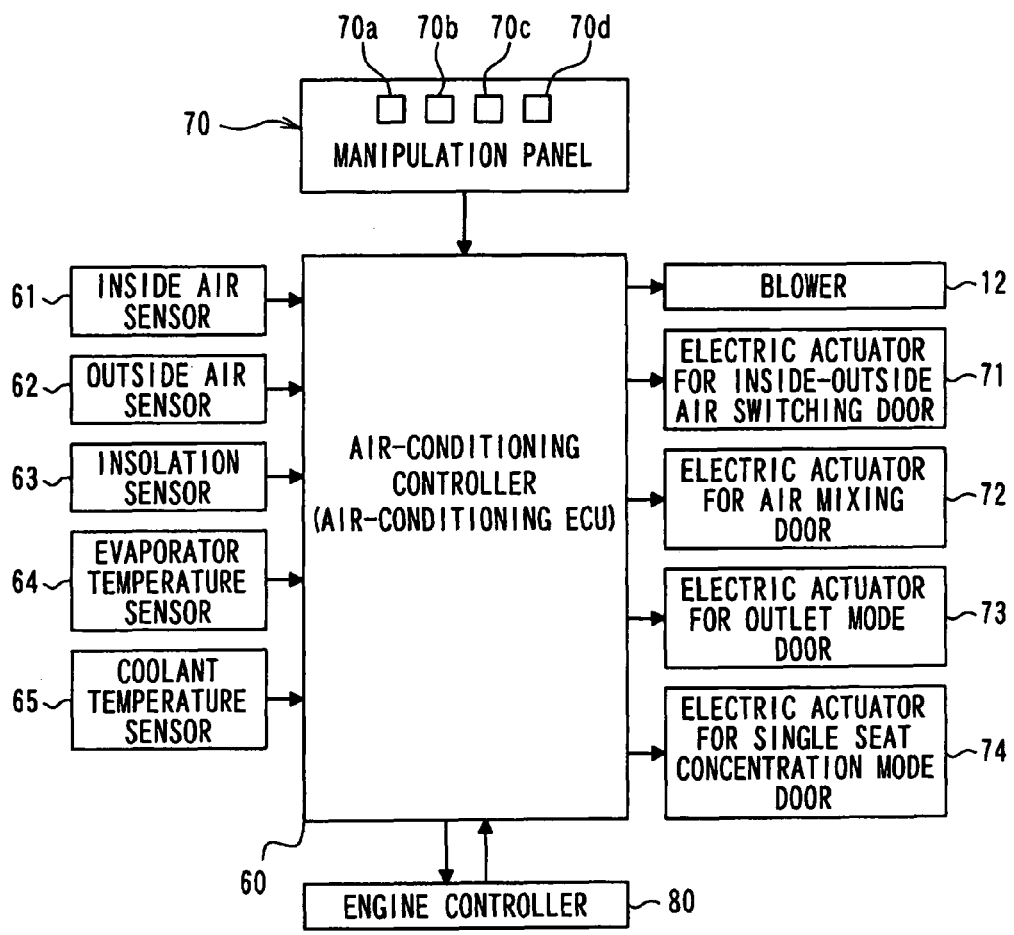
FIG. 2 is a diagram showing a construction of an electric control section of the vehicular air conditioner according to the first embodiment.

FIG. 1 shows an entire construction of a vehicular air conditioner according to a first embodiment of the present invention. FIG. 2 shows an electric control section of the vehicular air conditioner of FIG. 1. The vehicular air conditioner according to the present embodiment is mounted in a hybrid vehicle that obtains a driving force for running a vehicle from an engine (internal combustion engine) and an electric running motor.

The hybrid vehicle according to the present embodiment operates or stops the engine in accordance with a running load of the vehicle. Thus, the hybrid vehicle switches a running state of the vehicle among a state in which the vehicle runs by obtaining the driving force from both of the engine and the electric running motor, a state in which the vehicle runs by stopping the engine and by obtaining the driving force only from the electric running motor, and other states. Thus, the hybrid vehicle improves a vehicle fuel consumption as compared to an ordinary vehicle that obtains the driving force for running the vehicle only from the engine.

The vehicular air conditioner 1 has a compartment air-conditioning unit 10 shown in FIG. 1 and an air-conditioning controller 60 shown in FIG. 2 as a controller according to the present invention.

The compartment air-conditioning unit 10 is arranged inside an instrument panel positioned in the foremost part of a vehicle compartment. The compartment air-conditioning unit 10 accommodates a blower 12, an evaporator 13, a heater core 14 and the like in a casing 11 defining an outer shell of the compartment air-conditioning unit 10.

The casing 11 defines an air passageway of a blown air blown into the vehicle compartment. The casing 11 is molded with a resin having a certain degree of elasticity and excellent strength. An inside-outside air switching box 20 is arranged in the most upstream part of the casing 11 with respect to a flow direction of the blown air and switchably introduces inside air (air in vehicle compartment) or outside air (air outside vehicle compartment).

More specifically, an inside air introduction port 21 for introducing the inside air into the casing 11 and an outside air introduction port 22 for introducing the outside air into the casing 11 are formed in the inside-outside air switching box 20. An inside-outside air switching door 23 is arranged in the inside-outside air switching box 20 for changing an air volume ratio between an air volume of the inside air and an air volume of the outside air. The inside-outside air switching door 23 is driven by an electric actuator 71 for the inside-outside air switching door 23. An operation of the electric actuator 71 is controlled by a control signal outputted from the air-conditioning controller 60.

The blower 12 is arranged downstream of the inside-outside air switching box 20 with respect to the airflow direction. The blower 12 blows the air suctioned through the inside-outside air switching box 20 toward the vehicle compartment. The blower 12 is an electric blower that drives a centrifugal multi-blade fan 12a with an electric motor 12b. Target rotation speed of the blower 12, i.e., target air blowing volume, is controlled by a control signal outputted from the air-conditioning controller 60.

The evaporator 13 is arranged downstream of the blower 12 with respect to the airflow direction. The evaporator 13 is a cooling heat exchanger that performs heat exchange between a refrigerant circulating therein and the blown air, thereby cooling the blown air. The evaporator 13 constitutes a refrigeration cycle together with a compressor, a condenser, a gas-liquid separator, an expansion valve and the like (not shown).

Air passageways including a heating cold air passageway 15 for passing air having passed through the evaporator 13 and a cold air bypass passage 16 are formed downstream of the evaporator 13 with respect to the airflow direction. Further, a mixing space 17 for mixing the air flowing out of the heating cold air passageway 15 and the air flowing out of the cold air bypass passage 16 is formed downstream of the evaporator 13 with respect to the airflow direction.

The heater core 14 as a heating section for heating the air having passed through the evaporator 13 is arranged in the heating cold air passageway 15. The heater core 14 is a heating heat exchanger for heating the air having passed through the evaporator 13 by causing heat exchange between a coolant of the engine that outputs the driving force for running the vehicle and the air having passed through the evaporator 13. A coolant flow passage 31 is provided between the heater core 14 and the engine, thereby constructing a coolant circuit 30, through which the coolant circulates between the heater core 14 and the engine.

The cold air bypass passage 16 is an air passageway for leading the air having passed through the evaporator 13 to the mixing space 17 such that the air does not pass through the heater core 14. Therefore, temperature of the blown air mixed in the mixing space 17 changes with the air volume ratio between the air passing through the heating cold air passageway 15 and the air passing through the cold air bypass passage 16.

Therefore, in the present embodiment, an air mixing door 18 is arranged downstream of the evaporator 13 and on an inlet side of the heating cold air passageway 15 and the cold air bypass passage 16 with respect to the airflow direction. The air mixing door 18 continuously changes an air volume ratio between the cold air introduced into the heating cold air passageway 15 and the cold air introduced into the cold air bypass passage 16.

Therefore, the air mixing door 18 constitutes a temperature adjusting section that adjusts the air temperature in the mixing space 17 (i.e., temperature of blown air blown into vehicle compartment). The air mixing door 18 is driven by an electric actuator 72 for the air mixing door 18. An operation of the electric actuator 72 is controlled by a control signal outputted from the air-conditioning controller 60.

In order to blow the air having adjusted temperature from the mixing space 17 into the vehicle compartment as an object space of the air conditioning, a defroster opening section 24, a face opening section 25 and a foot opening section 26 are provided in the most downstream part of the casing 11 with respect to the flow direction of the blown air.

A defroster duct (not shown) is connected to the defroster opening section 24. The air-conditioning wind is blown from a defroster outlet, which is defined in a tip end portion of the defroster duct, toward an inner surface of a windshield. A defroster door 24a is arranged upstream of the defroster opening section 24 with respect to the airflow direction in the casing 11. The defroster door 24a adjusts the air volume of the air-conditioning wind by adjusting the opening area of the defroster opening section 24. The defroster door 24a constitutes an opening degree adjusting section that adjusts the opening degree of the defroster outlet.

A face duct 40 made of a resin is connected to the face opening section 25. The air-conditioning wind is blown from face outlets 41-44, which are formed in a tip end portion of the face duct 40, toward an upper body of an occupant in the vehicle compartment.

The face outlets 41-44 include a center face outlet 41 on a driver seat side of the vehicle and a center face outlet 42 on a passenger seat side of the vehicle. The center face outlets 41, 42 are positioned in a center position of a lateral direction of the vehicle. The face outlets 41-44 further include a side face outlet 43 on the driver seat side of the vehicle and a side face outlet 44 on the passenger seat side of the vehicle. The side face outlets 43, 44 are positioned in both end portions of the lateral direction of the vehicle.

The face duct 40 branches into three passages 45, 46, 47 downstream of the face opening section 25 with respect to the airflow direction. The passage 45 connects to the side face outlet 43 on the driver seat side. The passage 46 connects to the side face outlet 44 on the passenger seat side. The passage 47 connects to the center face outlets 41, 42 on the both of the driver seat side and the passenger seat side. The passage 47 branches into two passages 48, 49 on the driver side and the passenger seat side downstream of the branch point of the three passages 45, 46, 47 with respect to the airflow direction.

A face door 47a for adjusting a passage area is arranged in the passage 47. A single seat concentration switching door 46a for opening and closing the passage 46 is arranged in the passage 46. The single seat concentration switching door 46a switches between permission and prohibition of the blowing of the air from the side face outlet 44 on the passenger seat side.

A foot duct 50 made of a resin is connected to the foot opening section 26. The air-conditioning wind is blown from multiple foot outlets 51, 52, 53 defined in a tip end portion of the foot duct 50 toward feet of the occupants. A foot door 26a is arranged upstream of the foot opening section 26 with respect to the airflow direction in the casing 11.

Multiple foot outlets are provided for four seats in the vehicle compartment. A driver seat foot outlet 51 is provided near a foot position of the driver seat. A passenger seat foot outlet 52 is provided near a foot position of the passenger seat. A backseat foot outlet 53 is provided near foot positions of two backseats.

The foot duct 50 branches at a branch point 57 into three passages 54, 55, 56 downstream of the connection between the foot duct 50 and the foot opening section 26 with respect to the airflow direction. The passage 54 connects to the driver seat foot outlet 51. The passage 55 connects to the passenger seat foot outlet 52. The passage 56 connects to the backseat foot outlet 53. A single seat concentration switching door 57a is provided in the branch point 57. The single seat concentration switching door 57a is capable of switching between a position for closing the passages 55, 56 connecting to the passenger seat foot outlet 52 and the backseat foot outlet 53 other than the passage 54 connecting to the driver seat foot outlet 51 among the three passages 54, 55, 56 and a position for opening all the three passages 54, 55, 56.

Following outlet modes are executed with the above-mentioned defroster door 24a, the face door 47a and the foot door 26a. The outlet modes include a face mode, a bi-level mode, a foot mode and the like as before. In the face mode, the air is blown from the center face outlets 41, 42 on both of the driver seat side and the passenger seat side toward the upper bodies of the occupants in the vehicle compartment. In the bi-level mode, the air is blown from the center face outlets 41, 42 and the foot outlets 51-53 toward the upper bodies and the feet of the occupants in the vehicle compartment. In the foot mode, the air is blown mainly from the foot outlets 51-53 by fully opening the foot opening section 26 and by opening the defroster opening section 24 by a small opening degree. Except for a single concentration mode explained below, the air-conditioning wind is invariably blown from the side face outlets 43, 44 on both of the driver seat side and the passenger seat side.

In this way, the defroster door 24a, the face door 47a and the foot door 26a constitute an outlet mode switching section that switches the outlet mode. For example, the defroster door 24a, the face door 47a and the foot door 26a are linked with an electric actuator 73, which is used for driving the outlet mode doors, via a link mechanism (not shown) and are operated to rotate in conjunction with each other. An operation of the electric actuator 73 is controlled by a control signal outputted from the air-conditioning controller 60. Alternatively, the outlet mode doors may be operated by separate electric actuators respectively.

Furthermore, in the present embodiment, the single seat concentration mode can be executed during the foot mode. In the single seat concentration mode, the air-conditioning wind is blown only from foot outlet 51 on the driver seat side among all the foot outlets 51-53 by closing the passages connecting to the foot outlets 52, 53 on the passenger seat side and the backseat side other than the passage connecting to foot outlet 51 on the driver seat side with the single seat concentration switching door 57a for the feet. The single seat concentration switching door 46a for the side face closes the passage 46 in the single seat concentration mode, whereby the air-conditioning wind is blown only from the side face outlet 43 on the driver seat out of the side face outlets 43, 44.

In this way, the single seat concentration switching door 57a for the feet and the single seat concentration switching door 46a for the face constitute a single seat concentration mode switching section that switches the outlet mode to the single seat concentration mode. The single seat concentration switching door 57a and the single seat concentration switching door 46a are linked with an electric actuator 74, which is used for driving the single seat concentration switching doors, via a link mechanism (not shown) and are rotated and operated in conjunction with each other. An operation of the electric actuator 74 is controlled by a control signal outputted from the air-conditioning controller 60. Alternatively, the respective single seat concentration switching doors may be operated with separate electric actuators respectively.

Next, the electric control section according to the present embodiment will be explained based on FIG. 2. The air-conditioning controller 60 consists of a microcomputer having CPU, ROM, RAM and the like and peripheral circuitries. The air-conditioning controller 60 performs various calculations and processing based on an air-conditioning control program stored in the ROM. Thus, the air-conditioning controller 60 controls the operations of the blower 12, the various electric actuators 71, 72, 73, 74 and the like connected to an output side thereof.

As for the output to the blower 12 on the output side of the air-conditioning controller 60, the air-conditioning controller 60 controls a power supplied to the blower 12 to control a target air blowing amount of the blower 12. More specifically, the air-conditioning controller 60 outputs a control signal to a drive circuit (not shown), which drives the electric motor 12b, to set the power supplied from the drive circuit to the electric motor 12b, thereby controlling the rotation speed of the electric motor 12b. The rotation speed of the electric motor 12b increases when the power supplied to the electric motor 12b is high. The rotation speed of the electric motor 12b decreases when the power supplied to the electric motor 12b is low.

In a case where a voltage applied to the electric motor 12b is controlled (i.e., when voltage control is performed), the drive circuit applies a voltage, which corresponds to the control signal from the air-conditioning controller 60, to the electric motor 12b. In a case where PWM control of current supplied to the electric motor 12b is performed, the drive circuit controls average supply current of the electric motor 12b to desired intensity by setting a duty ratio of pulse width of a pulse signal, which is for controlling ON/OFF of the electric motor 12b, according to the control signal from the air-conditioning controller 60. In this way, the air-conditioning controller 60 is configured to set the output value for the blower 12. That is, the air-conditioning controller 60 is configured to set the voltage value or the current value outputted from the drive circuit to the electric motor 12b of the blower 12.

An input side of the air-conditioning controller 60 receives sensing signals of sensors such as an inside air sensor 61 that senses temperature in the vehicle compartment as vehicle compartment inside temperature Tr, an outside air sensor 62 (ambient temperature sensing device) that senses ambient temperature Tam, an insolation sensor 63 that senses an insolation amount Ts in the vehicle compartment, an evaporator temperature sensor 64 (evaporator temperature sensing section) that senses evaporator blowing air temperature TE (evaporator temperature), which is temperature of the air blown from the evaporator 13, and a coolant temperature sensor 65 that senses engine coolant temperature TW.

Further, the input side of the air-conditioning controller 60 receives manipulation signals from various air-conditioning manipulation switches provided in a manipulation panel 70 arranged near an instrument panel in the front portion of the vehicle compartment. The air-conditioning manipulation switches provided in the manipulation panel 70 include an operation switch (not shown) of the vehicular air conditioner 1, an air conditioner switch 70a for switching between ON and OFF of the air conditioner, an automatic control switch 70b for setting and canceling automatic control of the vehicular air conditioner 1, a switch (not shown) for switching an operation mode, a suction port mode switch (not shown) for switching a suction port mode, an outlet mode switch (not shown) for switching an outlet mode, an air volume setting switch (not shown) for setting the air volume of the blower 12, a vehicle compartment inside temperature setting switch 70c for setting the temperature in the vehicle compartment, an economy switch 70d for outputting a command for prioritizing power saving of the refrigeration cycle, and the like.

The air-conditioning controller 60 is electrically connected to an engine controller 80 that controls an operation of the engine. The air-conditioning controller 60 and the engine controller 80 are constructed to be able to perform electric communication therebetween. Thus, based on the sensing signal or the manipulation signal inputted to one of the two controllers 60, 80, the other one of the two controllers 60, 80 can control the operations of the various devices connected to the output side. For example, the air-conditioning controller 60 can operate the engine by outputting the engine operation request signal to the engine controller 80.

Figure 3:
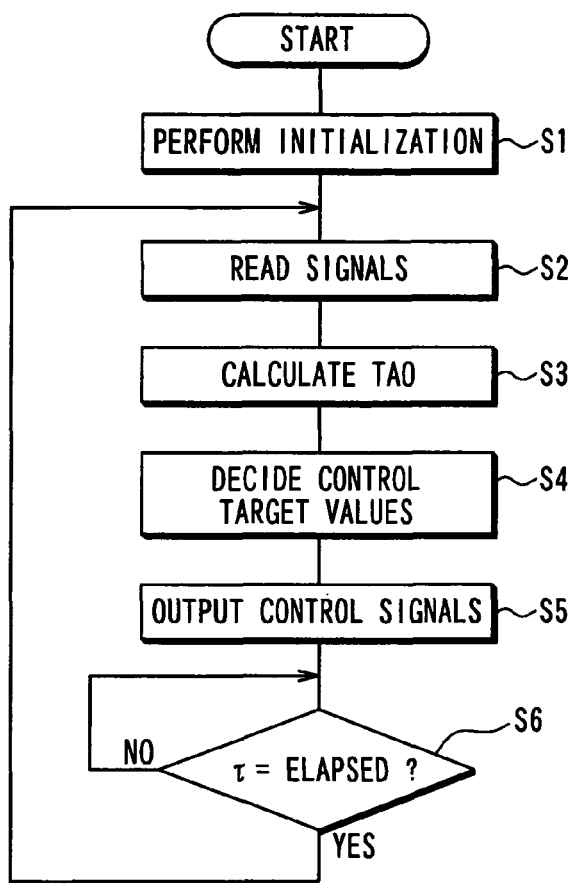
FIG. 3 is a flowchart showing control processing of an air-conditioning controller according to the first embodiment.

Next, an operation of the above-described construction according to the present embodiment will be explained based on FIG. 3. FIG. 3 is a flowchart showing control processing of the air-conditioning controller 60. Respective steps of FIG. 3 constitute various function realizing sections of the air-conditioning controller 60.

First, in S1 (S means "Step"), initialization of flags, timers and the like, initial positioning of stepping motors constituting the above-described electric actuators and the like are performed.

In following S2, the manipulation signals of the manipulation panel 70 and signals indicative of vehicle environment conditions used for the air-conditioning control (i.e., sensing signals of above-described sensors 61-65 and the like) are read. Then, the process proceeds to S3. The manipulation signals include vehicle compartment inside set temperature Tset set with the vehicle compartment inside temperature setting switch 70c, a selection signal of the outlet mode, a selection signal of the suction port mode, a setting signal of the air volume of the blower 12, and the like.

In S3, target blown air temperature TAO of the air blown into the vehicle compartment is calculated. The target blown air temperature TAO is calculated based on the vehicle compartment inside set temperature Tset and the vehicle environment conditions as shown by a following formula F1.

$$TAO = Kset \times Tset - Kr \times Tr - Kam \times Tam - Ks \times Ts + C \quad (F1)$$

In the formula F1, Tset is the vehicle compartment inside set temperature set with the vehicle compartment inside temperature setting switch 70c, Tr is the vehicle compartment inside temperature sensed with the inside air sensor 61, Tam is the ambient temperature sensed with the outside air sensor 62, and Ts is the insolation amount sensed with the insolation sensor 63. Kset, Kr, Kam, Ks are control gains, and C is a constant for correction.

In following S4, control target values of the various devices connected to the air-conditioning controller 60 are decided. For example, an air blowing amount of the blower 12 (i.e., blower level), the suction port mode, the outlet mode, the opening degree of the air mixing door, existence/nonexistence of request for the engine operation and the like are decided. The air blowing amount, the outlet mode and the like are decided based on the target blown air temperature TAO. As for the existence/nonexistence of the request for the engine operation, output of the engine operation request signal is decided when the coolant temperature TW is lower than reference temperature, for example.

Then, in S5, the control signals are outputted to the various devices connected to the air-conditioning controller 60 and the engine controller 80 to obtain the control target values decided in S4.

Thus, the blower 12 operates to achieve the desired air blowing amount, and the outlet mode doors and the single seat concentration switching doors are positioned to predetermined positions to achieve the desired outlet mode.

In following S6, the process waits until a control cycle τ elapses. When it is determined that the control cycle τ elapses, the process returns to S2.

Figure 4:
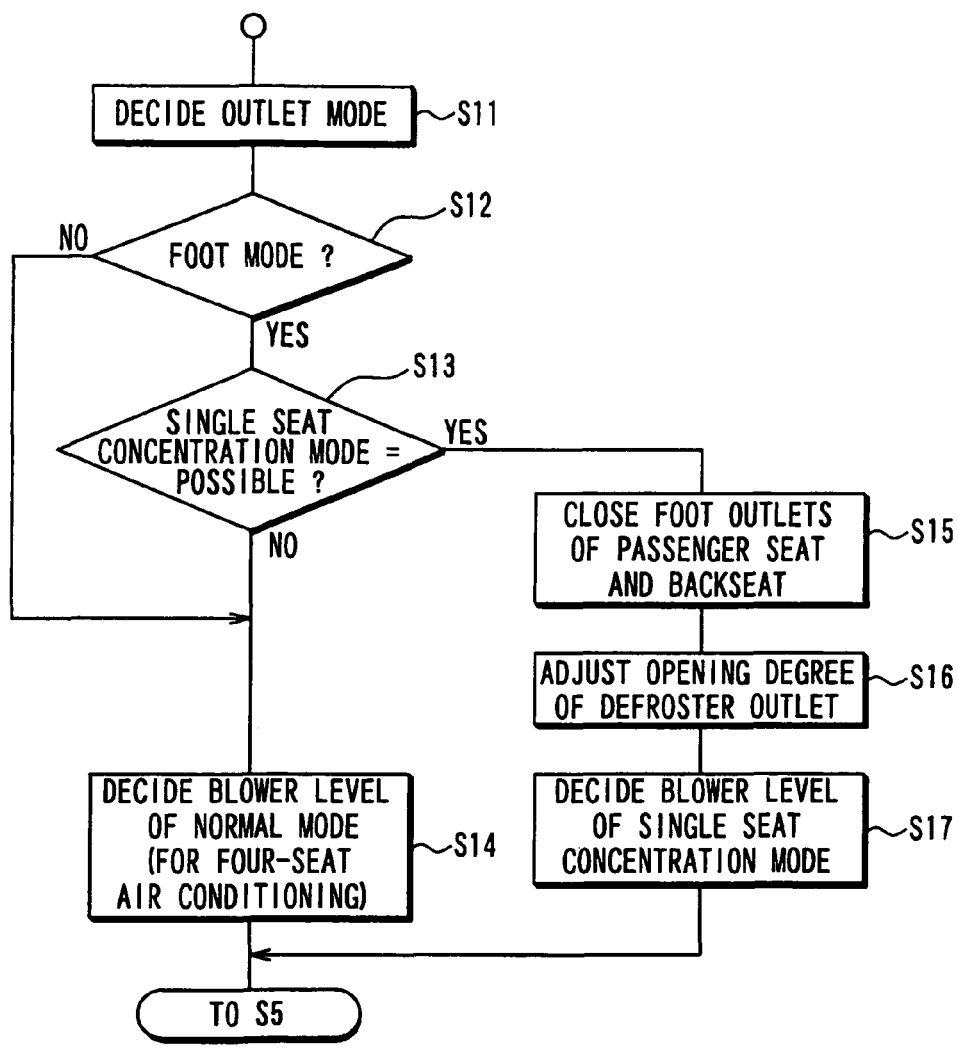
FIG. 4 is a flowchart explaining details of S4 of FIG. 3.

Next, detailed contents of the control target value deciding processing in above-mentioned S4 will be explained. FIG. 4 shows a flowchart for explaining the details of S4. FIG. 4 shows only decision steps of the outlet mode and the blowing amount of the blower 12 out of the control target values of the various devices. Next, the decision processing of the outlet mode and the blowing amount will be explained.

For example, the outlet mode is decided based on the target blown air temperature TAO in S11. In S11, the face mode, the foot mode or the like is decided as the outlet mode as before. In the decision, the position of the single seat concentration switching door 57a for the feet is set at the normal position for opening the passages connecting to all the foot outlets 51, 52, 53 on the driver seat side, the passenger seat side and the backseat side. In addition, the position of the single seat concentration switching door 46a for the face is set at the normal position for opening the passage 46 connecting to the side face outlet 44 on the passenger seat side.

In following S12, it is determined whether the outlet mode is the foot mode. The outlet mode is set at the foot mode in S11 during winter, in which the ambient temperature is low.

Therefore, during winter, determination result in S12 is "YES" and the process proceeds to S13. When the outlet mode is not the foot mode, the determination result of S12 is "NO" and the process proceeds to S14.

In S13, it is determined whether the single seat concentration mode can be executed. More specifically, it is determined whether the seats other than the driver seat are vacant. Whether the seats other than the driver seat are vacant can be determined by using a publicly-known occupant absence detection device described in JP-A-2000-142081, for example. For example, a sitting sensor, an IR sensor, a sensor for sensing whether a seatbelt is fastened or the like can be used as the occupant absence detection device.

When it is determined that there is an occupant in the seat other than the driver seat from the detection result of the occupant absence detection device (i.e., when S13: NO), the process proceeds to S14. In S14, the target air blowing amount of the blower 12 (i.e., blower level) for the four-seat air conditioning is decided as before. More specifically, the blower level is decided with reference to a control map beforehand stored in the air-conditioning controller 60 based on TAO decided in S3. Then, the process proceeds to S5, in which the control signals are outputted.

With such the construction, when the outlet mode is other than the foot mode or when the single seat concentration mode cannot be executed even in the foot mode, the door positions of the single seat concentration switching door 57a for the feet and the single seat concentration switching door 46a for the side face are set at the normal positions. Thus, the mode switching doors and the blower 12 operate to achieve the decided blowing mode and the air blowing amount as before. Such the case corresponds to the four-seat air conditioning and corresponds to a normal air-conditioning mode of the present invention.

When it is determined that there is no occupant in the seats other than the driver seat (i.e., when S13: YES), the process proceeds to S15.

In S15, the mode is decided on the single seat concentration mode for closing the foot outlets 52, 53 on the passenger seat side and the backseat side. More specifically, the position of the single seat concentration switching door 57a for the feet in the foot duct 50 is set at the position for closing the passages 55, 56 connecting to the foot outlets 52, 53 on the passenger seat side and the backseat side other than the foot outlet on the driver seat side and for opening the passage 54 connecting to the foot outlet 51 on the driver seat side. Thus, the blowing of the air from the foot outlet 51 on the driver seat side is permitted, and the blowing of the air from the foot outlets 52, 53 on the passenger seat side and the backseat side is prohibited. In addition, the single seat concentration switching door 46a for the side face in the face duct 40 is set at the position for closing the passage 46 connecting to the side face outlet 44 on the passenger seat side. Thus, the blowing of the air from the side face outlet 44 on the passenger seat side is prohibited.

In following S16, the opening degree of the defroster door 24a that opens and closes the defroster opening section 24 (defroster outlet) is adjusted. The air volume of the air-conditioning wind blown frond the defroster opening section 24 increases if the opening degree of the defroster opening section 24 in the case where the foot outlets 52, 53 other than foot outlet 51 on the driver seat side are closed is the same as the opening degree in the case where all the foot outlets 51, 52, 53 are opened during the foot mode. Therefore, in order to maintain the air blowing amount from the defroster opening section 24 to be equal to the air blowing amount in the case where all the foot outlets 51, 52, 53 are opened, the opening degree of the defroster opening section 24 is set smaller than in the case where all the foot outlets 51, 52, 53 are opened.

In following S17, the target blowing amount of the blower 12 (i.e., blower level) for the single seat concentration mode is decided as before. More specifically, the blower level as the control target is decided with reference to a control map beforehand stored in the air-conditioning controller 60 based on TAO decided in S3. The control map used in S17 is different from the control map for the four-seat air-conditioning used in S14.

Figure 5:
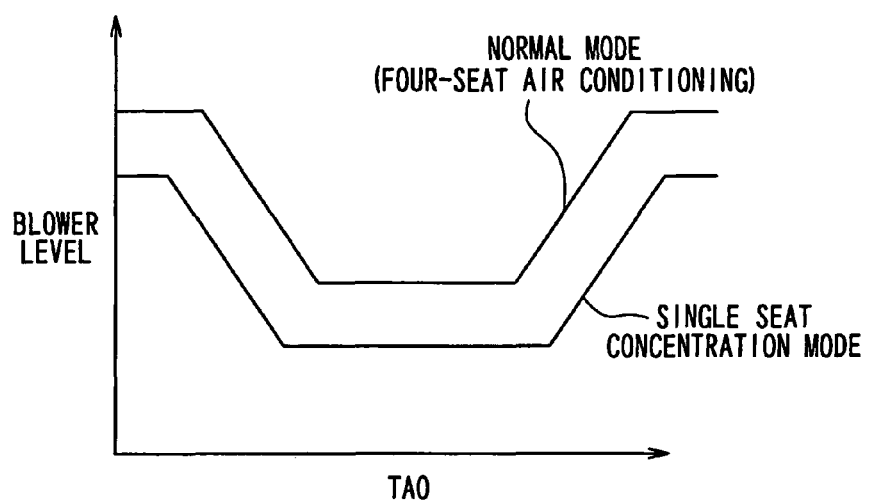
FIG. 5 is a diagram showing a control map of an air blowing amount of a blower according to the first embodiment.

FIG. 5 shows the control map of the air blowing amount used in the single seat concentration mode and the control map of the air blowing amount used during the four-seat air conditioning. In FIG. 5, the vertical axis shows the blower level, and the horizontal axis shows the target blown air temperature TAO.

The blower level is the target air blowing amount of the blower 12, i.e., the target rotation speed of the electric motor 12b. The blower level corresponds to the intensity of the power supplied to the electric motor 12b. For example, when the voltage control of the electric motor 12b is performed, the voltage value applied to the electric motor 12b by the drive circuit corresponds to the blower level. When the current control of the electric motor 12b is performed, the duty ratio, which is the ratio between the ON time and the OFF time of the electric motor 12b, corresponds to the blower level.

As shown in FIG. 5, the control map used in the four-seat air conditioning has a relationship between the blower level and TAO in the shape of a bath tub curve. That is, in an extremely low-temperature range (i.e., maximum cooling range) and an extremely high-temperature range (i.e., maximum heating range) of TAO, the air volume of the blower 12 is controlled to proximity of the maximum air volume by bringing the blower level to proximity of the maximum. If TAO increases from the extremely low-temperature range toward a middle temperature range, the blower level is decreased in accordance with the increase of TAO, thereby decreasing the air volume of the blower 12. If TAO decreases from the extremely high-temperature range toward the middle temperature range, the blower level is decreased in accordance with the decrease of TAO, thereby decreasing the air volume of the blower 12. If TAO enters a predetermined middle temperature range, the blower level is brought to the minimum to bring the air volume to the minimum.

In whole, the blower level in the control map used in the single seat concentration mode is lower than the blower level in the control map used in the four-seat air conditioning with respect to the same value of TAO. Therefore, the target air blowing amount of the blower 12 in the single seat concentration mode is decreased from the target air blowing amount of the blower 12 in the four-seat air conditioning when TAO is the same.

The decrease amount in the blower level is set to maintain the air volume blown from the foot outlet 51 on the driver seat side when the mode is changed from the normal foot mode (four-seat air conditioning) to the single seat concentration mode. It is because the air volume blown from the foot outlet 51 on the driver seat side increases if the relationship between the blower level and TAO at the time when the mode is changed from the normal foot mode (four-seat air conditioning) to the single seat concentration mode is unchanged from the relationship prior to the mode change. In this way, blowing performance of the blower 12 is lowered.

Then, the process proceeds to S5, in which the control signals are outputted. Thus, when the mode is the foot mode and the single seat concentration mode can be executed, the positions of the outlet mode switching doors 26a, 47a are set at the positions of the foot mode, and the position of the single seat concentration switching door 57a for the feet is set at the position for closing the foot outlets 52, 53 on the passenger seat side and the backseat side and for opening the foot outlet 51 on the driver seat side. As a result, the single concentration mode for blowing the warm air only from the foot outlet 51 out of the foot outlets 51-53 is realized.

In addition, the position of the defroster door 24a is set at the position for decreasing the opening degree from the opening degree at the position of the normal foot mode, whereby the air of the volume similar to the volume in the case of the normal foot mode is blown from the defroster outlet.

Furthermore, in order to maintain the air volume blown from the foot outlet 51 on the driver seat side to be equal to the air volume in the case of the normal foot mode, the blower 12 is operated at the lower blower level than the blower level in the case of the normal foot mode.

As explained above and shown in S12, S13 and S15, when there is no occupant in the seats other than the driver seat during the foot mode, the air-conditioning controller 60 executes the single seat concentration mode by closing the foot outlets 52, 53 on the passenger seat side and the backseat side and by preventing the blowing of the warm air to the passenger seat and the backseat. Furthermore, in this case, when the air-conditioning controller 60 changes the mode from the normal foot mode (four-seat air conditioning) to the single seat concentration mode, the air-conditioning controller 60 sets the blower level to be lower than the blower level in the case of the four-seat air-conditioning with respect to the same value of TAO in S17 to maintain the air volume blown from the foot outlet 51 on the driver seat side.

If the entire vehicle compartment is warmed when the occupant is only the driver, the space where no occupant exists is warmed, thereby wasting the heat amount necessary for the heating.

As contrasted thereto, according to the present embodiment, the single seat concentration mode for prohibiting the blowing of the air from the foot outlets 52, 53 other than the foot outlet on the driver seat side is performed when the occupant is only the driver. Thus, the heat amount of the engine coolant as the heat source is used for warming the driver seat side, thereby inhibiting the waste of the heat amount.

Moreover, according to the present embodiment, the air volume blown from the foot outlet 51 on the driver seat side in the single seat concentration mode is the same as the air volume in the case of the normal foot mode. Therefore, driver's sensation of warmth can be maintained. Since the blower level is reduced from the blower level in the case of the normal mode with respect to the same value of TAO, the electric power consumed by the electric motor 12b of the blower 12 can be reduced, thereby realizing energy saving.

Moreover, since the blower level is reduced as compared to the normal foot mode, the air volume passing through the heater core 14 reduces and the heat radiation amount of the heater core 14 can be reduced. Therefore, temperature increase of the engine coolant is accelerated during the engine operation, and temperature decrease becomes slow during stoppage of the engine.

As a result, the temperature of the engine coolant reaches desired temperature quickly during the warm-up, and therefore the engine stop can be started at earlier timing. If the temperature of the engine coolant decreases to an extent that the heating cannot be maintained when the heating is performed during the stoppage of the engine, the engine operation request signal is outputted to operate the engine or an auxiliary electric heater is operated, thereby maintaining the heating, for example. Regarding this point, according to the present embodiment, a gradient of the temperature decrease of the engine coolant becomes gentle. Therefore, the frequency of operations of the engine or the auxiliary electric heater for maintaining the heating can be reduced, thereby suppressing deterioration of the fuel consumption.

Respective steps of FIG. 4 constitute various function realizing sections of the air-conditioning controller 60. That is, S15 corresponds to a single seat concentration mode executing section that executes the single seat concentration mode when there is no occupant in the seats other than the driver seat. S17 corresponds to a target air blowing amount setting section that reduces the supply power to the blower 12 to set the target air blowing amount to be smaller in the single seat concentration mode than in the case of the four-seat air conditioning (i.e., normal air-conditioning mode).

(Second Embodiment)

Figure 6:
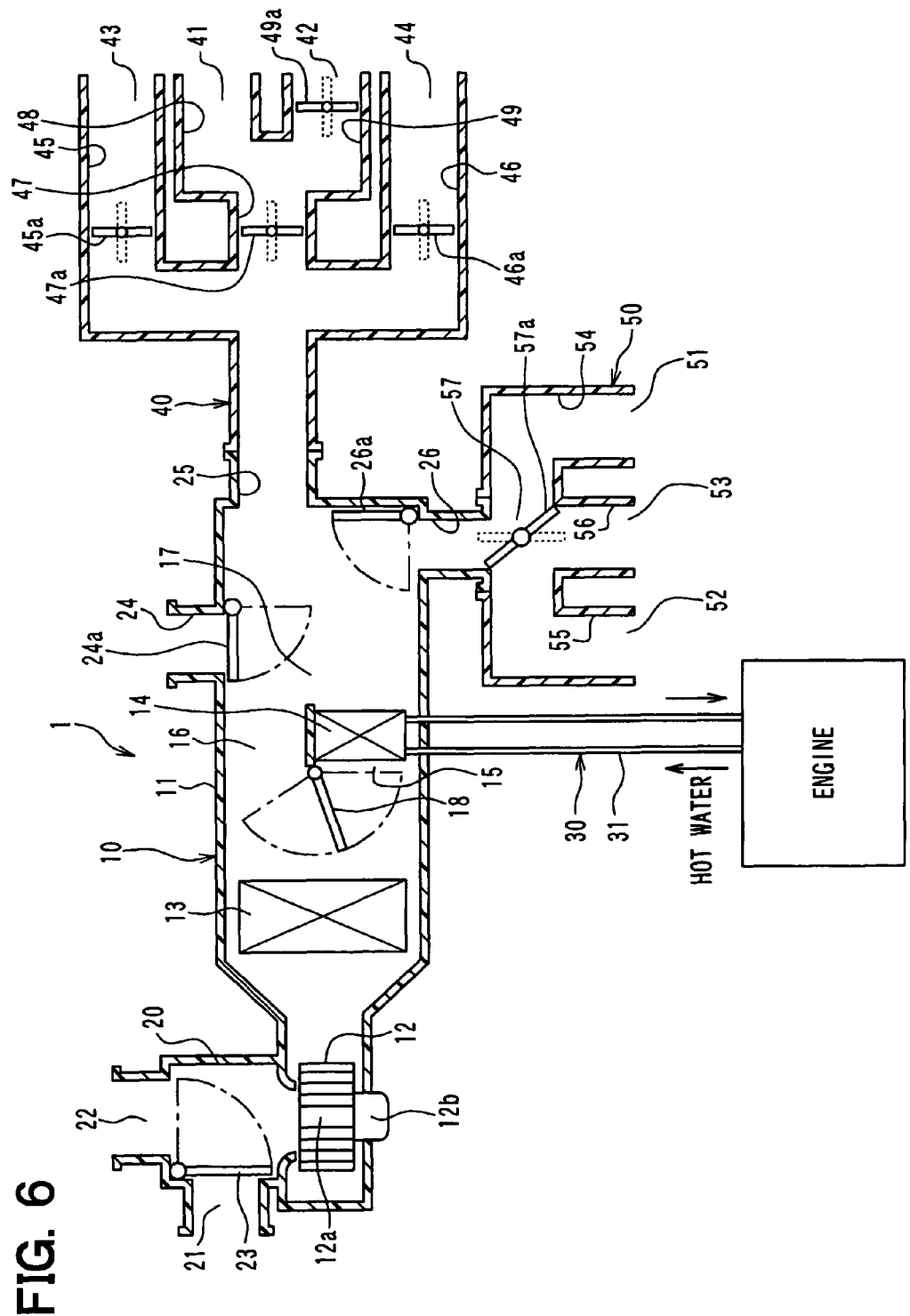
FIG. 6 is a schematic diagram showing an entire construction of a vehicular air conditioner according to a second embodiment of the present invention.

Next, a second embodiment of the present invention will be described. FIG. 6 shows an entire construction of a vehicular air conditioner according to the second embodiment. In the present embodiment, an air volume adjusting door 45a for adjusting an air blowing amount blown from the side face outlet 43 on the driver seat side is provided inside the face duct 40 of the construction of FIG. 1 explained in the description of the first embodiment. The air volume adjusting door 45a is provided in the passage 45 connecting to the side face outlet 43 on the driver seat side.

The air-conditioning controller 60 according to the second embodiment performs air-conditioning control similar to the air-conditioning control of the first embodiment. The air-conditioning controller 60 according to the second embodiment further performs adjustment of the air volume of the side face outlet 43 on the driver seat side when the air-conditioning controller 60 performs the adjustment of the opening degree of the defroster opening section 24 in S16 of FIG. 4. More specifically, in order to maintain the air volume of the side face outlet 43 on the driver seat side to be equal to the air volume prior to the closing of the foot outlets 52, 53 other than the foot outlet on the driver seat side, the opening degree of the air volume adjusting door 45a is set smaller than the opening degree prior to the closing of the foot outlets 52, 53 other than the foot outlet on the driver seat side.

In addition, in the present embodiment, a single seat concentration switching door 49a for the center face on the passenger seat side is provided in the face duct 40. The single seat concentration switching door 49a switches between permission and prohibition of the blowing of the air from the center face outlet 42 on the passenger seat side. The single seat concentration switching door 49a is provided in the passage 49 connecting to the center face outlet 42 on the passenger seat side.

In the first embodiment, the single seat concentration mode is executed during the foot mode. Regarding this point, according to the second embodiment, the single seat concentration mode can be executed not only during the foot mode but also during the bi-level mode. For example, the second embodiment can be implemented by modifying the air-conditioning control of the air-conditioning controller 60 of the first embodiment as follows.

S12 of FIG. 4 is modified to determine whether the mode is the foot mode or the bi-level mode. S15 is modified to close the center face outlet 42 on the passenger seat side with the single seat concentration switching door 49a in addition to closing the foot outlets 52, 53 on the passenger seat side and the backseat side and the side face outlet 44 on the passenger seat side. Thus, during the bi-level mode, the face door 47a opens the center face passage 47, and the single seat concentration switching door 49a closes the passage 49 connecting to the center face outlet 42 on the passenger seat side. Thus, the air-conditioning wind can be blown only from the outlets 51, 41 on the driver seat side among the foot outlets and the center face outlets.

(Third Embodiment)

Figure 7:
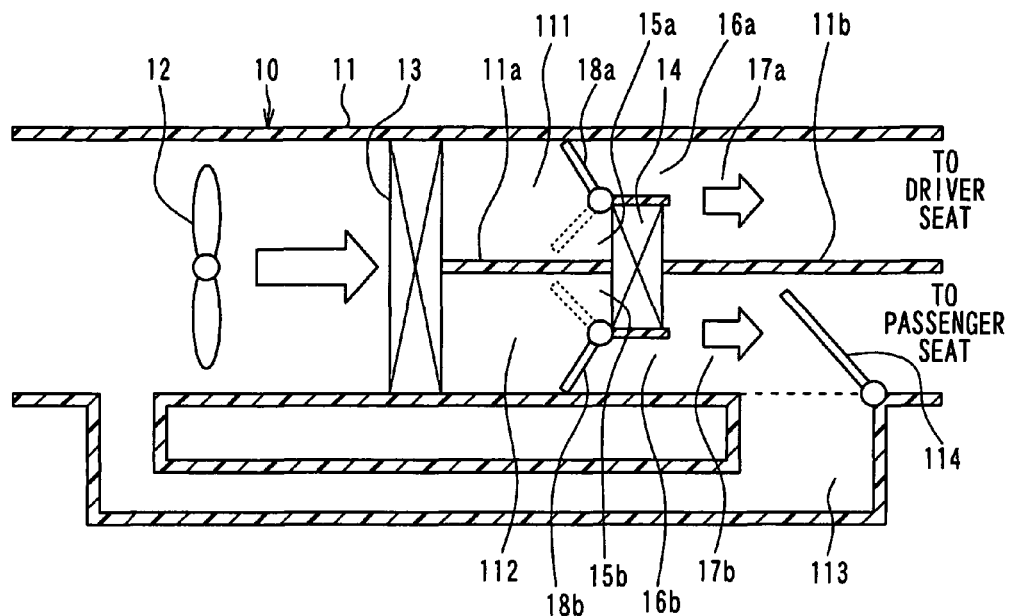
FIG. 7 is a schematic diagram showing an entire construction of a vehicular air conditioner according to a third embodiment of the present invention.

Next, a third embodiment of the present invention will be described. FIG. 7 is a schematic diagram showing a vehicular air conditioner according to the third embodiment. The vehicular air conditioner according to the present embodiment performs air-conditioning control independently between the driver seat side and the passenger seat side.

More specifically, in the vehicular air conditioner according to the present embodiment, partition walls 11a, 11b are provided in the casing 11 of the vehicle compartment air-conditioning unit 10 for partitioning the air passageway downstream of the evaporator 13 with respect to the airflow direction into an air passageway 111 on the driver seat side and an air passageway 112 on the passenger seat side. The heater core 14 is arranged to straddle both of the air passageway 111 on the driver seat side and the air passageway 112 on the passenger seat side Further, a heating cold air passageway 15a, a cold air bypass passage 16a and a mixing space 17a are formed in the air passageway 111 on the driver seat side. A heating cold air passageway 15b, a cold air bypass passage 16b and a mixing space 17b are formed in the air passageway 112 on the passenger seat side. Air mixing doors 18a, 18b are provided upstream of the heater core 14 for the air passageways 111, 112 respectively.

The air passageway 111 on the driver seat side connects to the outlets such as the foot outlet on the driver seat side. An outlet mode door for switching the outlet mode on the driver seat side is provided in the air passageway 111. The air passageway 112 on the passenger seat side connects to the outlets such as the foot outlet on the passenger seat side. An outlet mode door for switching the outlet mode on the passenger seat side is provided in the air passageway 112.

The air mixing doors 18a, 18b and the outlet mode doors are controlled by the air-conditioning controller 60 independently between the driver seat side and the passenger seat side.

The vehicular air conditioner having such the construction can execute the single seat concentration mode like the first embodiment by closing the outlet mode door on the passenger seat side even without providing the single seat concentration switching door. Therefore, the outlet mode door on the passenger seat side constitutes a switching section for switching to the single seat concentration mode.

However, if the outlet mode door on the passenger seat side is closed, heat exchange between the entire heat exchanging core section of the heater core 14 and the blown air cannot be performed. Therefore, there occurs a problem that the sufficient heat amount cannot be obtained from the heater core 14. It is because the heater core 14 is divided into a portion on the driver seat side where the air in the air passageway 111 on the driver seat side passes and the other portion on the passenger seat side where the air in the air passageway 112 on the passenger seat side passes. If the outlet mode door on the passenger seat side is closed, the air does not flow through the portion of the heater core 14 on the passenger seat side. In this case, the heat exchange between the coolant and the air is not performed in the passenger seat side portion of the heater core 14.

Therefore, in the present embodiment, a recirculation passage 113 for recirculating the air having passed through the heater core 14 to a space upstream of the blower 12 and an opening-closing door 114 for opening and closing the recirculation passage 113 are provided. In the present embodiment, the opening-closing door 114 is provided in a branch point between the recirculation passage 113 and an air passageway connecting to the outlet on the passenger seat side. The opening-closing door 114 enables switching between the airflow flowing toward the recirculation passage 113 and the airflow flowing toward the outlet on the passenger seat side.

During the single seat concentration mode, the air-conditioning controller 60 opens the opening-closing door 114 of the recirculation passage 113. Thus, the air having passed through the passenger seat side portion of the heater core 14 is passed to the space upstream of the blower 12 through the recirculation passage 113, thereby mixing the recirculated air with the air suctioned by the blower 12. At that time, the air mixing doors 18a, 18b are positioned at the maximum heating positions.

Thus, the heat amount obtained in the passenger seat side portion of the heater core 14 can be given to the air flowing toward the outlet on the driver seat side. Thus, the heat amount of the heater core 14 can be fully used.

(Fourth Embodiment)

Figure 8:
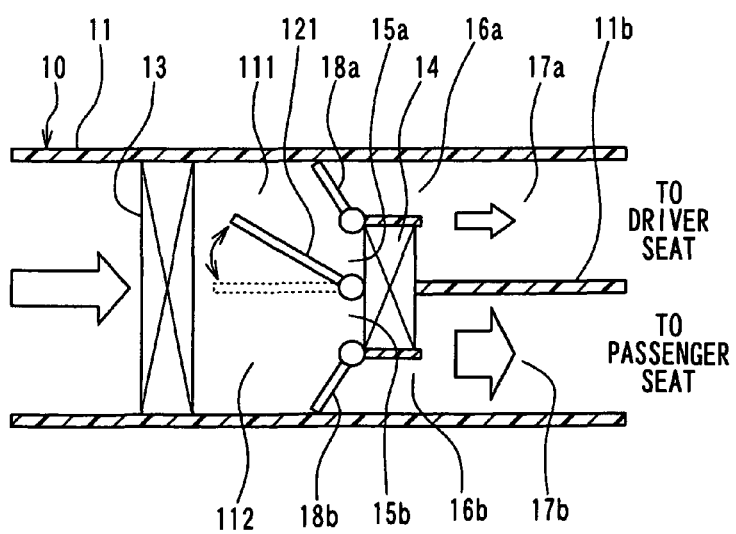
FIG. 8 is a schematic diagram showing an entire construction of a vehicular air conditioner according to a fourth embodiment of the present invention.

Next, a fourth embodiment of the present invention will be described. FIG. 8 is a schematic diagram showing a vehicular air conditioner according to the fourth embodiment. The vehicular air conditioner according to the present embodiment performs air-conditioning control independently between the driver seat side and the passenger seat side. In the present embodiment, the partition wall 11a arranged between the evaporator 13 and the heater core 14 in the construction shown in FIG. 7 is replaced with an air volume ratio changing door 121 that changes an air volume ratio between the air passageway 111 on the driver seat side and the air passageway 112 on the passenger seat side.

The air volume ratio changing door 121 is arranged upstream of the heater core 14 with respect to the airflow direction. The air volume ratio changing door 121 changes a door position thereof to change passage cross-sectional areas of the air passageway 111 on the driver seat side and the air passageway 112 on the passenger seat side. More specifically, the air volume ratio changing door 121 is capable of moving between a normal position for equalizing the passage cross-sectional areas of the air passageways 111, 112 and a position for setting the passage cross-sectional area of the air passageway 111 on the driver seat side to be smaller than the passage cross-sectional area of the air passageway 112 on the passenger seat side.

If the ratio between the air volume of the air passageway 111 on the driver seat side and the air volume of the air passageway 112 on the passenger seat side is changed by the air volume ratio changing door 121, the ratio between the air volume blown from the outlet on the driver seat side and the air volume blown from the outlet on the passenger seat side is changed. Therefore, the air volume ratio changing door 121 constitutes an air blowing amount ratio changing section that changes the ratio between the air volume blown from the outlet on the driver seat side and the air volume blown from the outlet on the passenger seat side.

In the present embodiment, a ratio between an air passage area of the driver seat side portion of the heater core 14 and an air passage area of the passenger seat side portion of the heater core 14 is fixed. That is, a ratio between a cross-sectional area of the portion of the heater core 14, through which the wind heading to the outlet on the driver seat side passes, and a cross-sectional area of the portion of the heater core 14, through which the wind heading to the outlet on the passenger seat side passes, is fixed.

Figure 9:
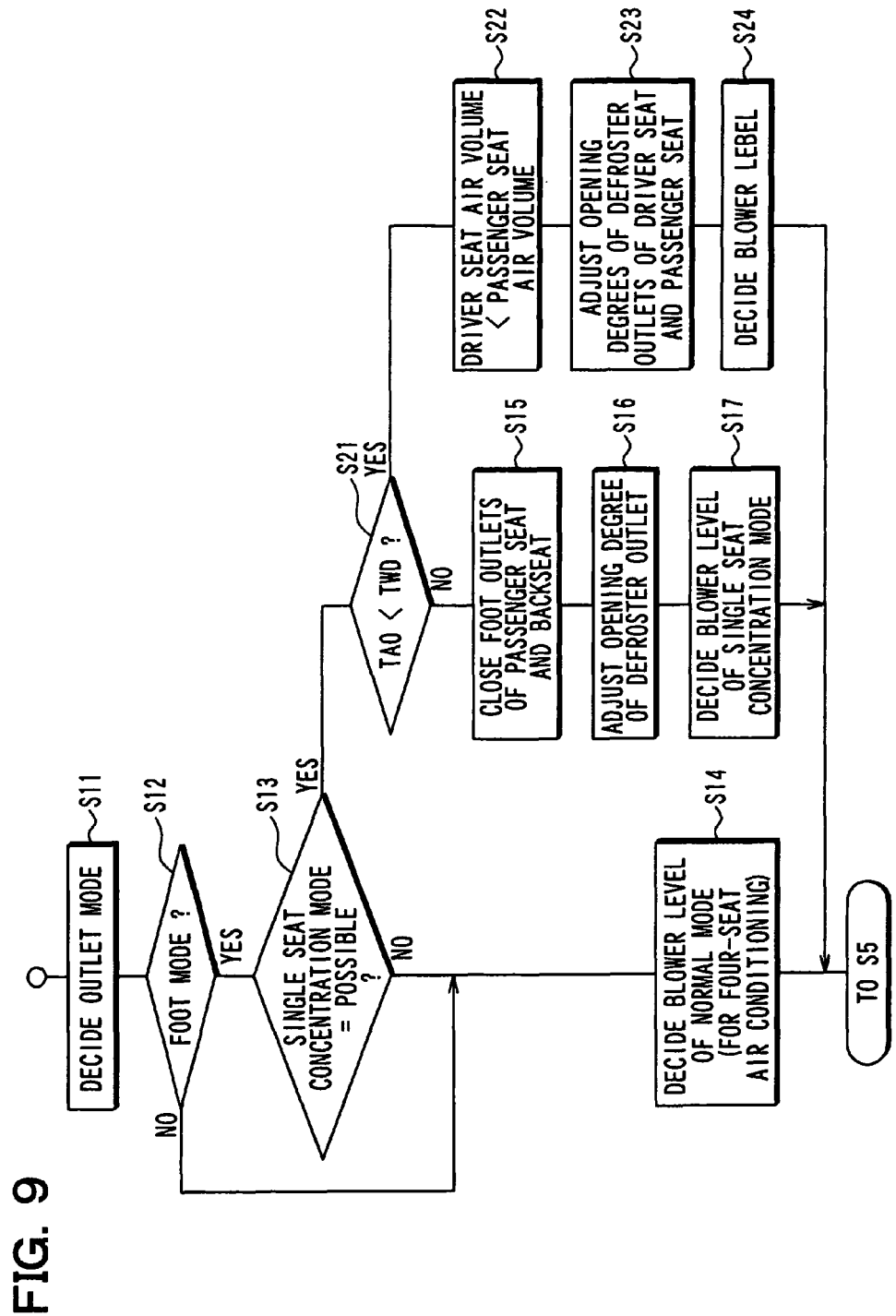
FIG. 9 is a flowchart showing a part of control processing of an air-conditioning controller according to the fourth embodiment.

Next, an operation of the above-described construction according to the present embodiment will be explained based on FIG. 9. FIG. 9 is a flowchart showing a part of the control processing of the air-conditioning controller 60 and corresponds to FIG. 4. The present embodiment has S21 to S24 differently from the first embodiment.

More specifically, in the present embodiment, as shown in FIG. 9, when it is determined that the single seat concentration mode can be executed in S13, it is determined whether the target blown air temperature TAO is lower than heater core blown air temperature TWD, which is calculated from the coolant temperature TW, in S21. The heater core blown air temperature TWD is temperature of the air blown from the heater core 14. The heater core blown air temperature TWD is temperature of the heated air at the time when the air is heated by the heat exchange between the air and the engine coolant in the heater core 14. More strictly, the heater core blown air temperature TWD is calculated based on the coolant temperature TW, air temperature TE of the air having passed through the evaporator 13, heat exchange performance of the heater core 14 and the like. The heater core blown air temperature TWD is substantially the same as the coolant temperature TW.

If the target blown air temperature TAO is equal to or higher than the heater core blown air temperature TWD, the determination result in S21 is "NO" and the process proceeds to S15-S17. S15-S17 are the same as the first embodiment. If the target blown air temperature TAO is lower than the heater core blown air temperature TWD, the determination result in S21 is "YES" and the process proceeds to S22.

In S22, the air volume ratio between the air passageway 111 on the driver seat side and the air passageway 112 on the passenger seat side is changed such that the air volume of the air passageway 111 on the driver seat side becomes relatively small and the air volume of the air passageway 112 on the passenger seat side becomes relatively large. More specifically, the position of the air volume ratio changing door 121 is set to a position for setting the passage cross-sectional area of the air passageway 111 on the driver seat side to be smaller than the passage cross-sectional area of the air passageway 112 on the passenger seat side. Thus, the air volume blown from the foot outlet on the driver seat side is decreased relatively, and the air volume blown from the foot outlet on the passenger seat side is increased relatively. When S22 is performed, the foot outlets on the passenger seat side and the backseat side are not closed but are opened differently from S15.

Then, in following S23, the opening degrees of the defroster doors on the driver seat side and the passenger seat side are adjusted. For example, the opening degree on the driver seat side is set smaller than the opening degree on the passenger seat side. Thus, a balance between the air volume blown from the defroster outlet on the driver seat side and the air volume blown from the defroster outlet on the passenger seat side is regulated.

In following S24, the air blowing amount of the blower 12 (i.e., blower level) is decided with reference to a control map like S14 or S17. For example, the control map used in S24 is defined such that the blower level is in the middle between the value in the single seat concentration mode and the value in the four-seat air conditioning with respect to the same value of TAO. Alternatively, the same control map as the control map of S14 for the four-seat air conditioning may be used.

When S22-S24 are performed, the air-mixing doors 18a, 18b on the driver seat side and the passenger seat side are also brought to the maximum heating positions. Moreover, the set temperature of the air-conditioning control on the passenger seat side is canceled.

Then, the process proceeds to S5, in which the control signals are outputted. Thus, the outlet mode switching doors on the driver seat side, the passenger seat side and the backseat side and the air volume ratio changing door 121 are brought to the control target positions, and the blower 12 operates to achieve the control target air volume.

In the present embodiment, when the single seat concentration mode can be executed during the foot mode and the heater core blown air temperature TWD is lower than the target blown air temperature TAO, the single seat concentration mode is executed as shown in S15 like the first embodiment. Thus, the warm air is blown only from the foot outlet on the driver seat side among the foot outlets. Furthermore, as shown in S17, the blower 12 is operated at the lower blower level than in the case of the foot mode of the four-seat air conditioning, while maintaining the air blowing amount from the foot outlet on the driver seat side.

By performing such the control, the air volume passing through the heater core 14 decreases and the heat release amount of the heater core 14 can be reduced as compared to the case of the four-seat air conditioning. Therefore, temperature increase of the engine coolant is accelerated during the engine operation, and temperature decrease becomes slow during stoppage of the engine. Accordingly, there will occur more situations where the temperature TW of the engine coolant is higher than the target blown air temperature TAO of the air conditioning.

Request coolant temperature used as a reference (threshold value) for deciding the engine operation request is decided according to the target blown air temperature TAO. If the target blown air temperature TAO is low, the request coolant temperature is also set low. However, since the engine coolant temperature does not decrease soon, the situation where the coolant temperature is higher than the target blown air temperature TAO of the air conditioning is not canceled soon.

In the situation where the coolant temperature is higher than the target blown air temperature TAO of the air conditioning, the temperature of the blown air-conditioning wind is adjusted with the opening degree of the air mixing door 18a. However, the heat amount not used in the heat exchange with the air in the heater core 14 is released from the engine surface, thereby causing a problem that the heat amount cannot be used effectively.

Therefore, in the present embodiment, when the heater core blown air temperature TWD is higher than the target blown air temperature TAO, the air-conditioning controller 60 opens not only the foot outlet on the driver seat side but also the foot outlets on the passenger seat side and the backseat side as in S22. Thus, the warm air is blown toward the driver seat and also to the seats other than the driver seat.

In this way, a portion of the heat amount of the engine coolant, which will, be surplus if the heating for only the driver seat is performed, is used for heating the entire vehicle compartment. Therefore, the heat release loss from the engine surface can be reduced, and the heat amount can be used effectively. In this case, the vehicle compartment temperature increases more than in the case of the single seat concentration mode due to the heating of the entire vehicle compartment. Therefore, the target blown air temperature lowers, and the engine operation request threshold value decreases. Accordingly, the engine operation rate lowers and the fuel consumption improves.

As shown in S22, the air-conditioning controller 60 sets the air blowing amount ratio between the driver seat side and the passenger seat side such that the air volume blown from the foot outlet on the driver seat side is small and the air volume blown from the foot outlet on the passenger seat side is large. When the air volume blown from the outlet is small, the temperature of the blown air becomes higher than in the case where the air volume blown from the outlet is large. It is because an endothermic amount per unit air volume increases if the air blowing amount decreases when heating performance of the heating heat exchanger is constant.

Therefore, according to the present embodiment, the temperature of the air blown from the outlet on the driver seat side can be heightened as compared to the blown air from the outlet on the passenger seat side. Accordingly, the driver's sensation of warmth can be improved as compared to the case where the blower level is the same and the air volume on the driver seat side is the same as the air volume on the passenger seat side.

In this way, according to the present embodiment, the warm wind at as high temperature as possible can be hit directly against the occupant, whereby the occupant can feel sufficient warmth. In addition, the vehicle compartment can be warmed with the heat amount corresponding to the engine heat radiation loss in the case of the single seat concentration mode.

In the present embodiment, the single seat concentration mode is executed during the foot mode. Alternatively, the single seat concentration mode of the present embodiment may be executed not only during the foot mode but also during the bi-level mode.

Respective steps of FIG. 9 constitute various function realizing sections of the air-conditioning controller 60. In the present embodiment, S15 and S17 correspond to a single seat concentration mode executing section that executes the single seat concentration mode when there is no occupant in the seats other than the driver seat and that sets the target air blowing amount of the blower 12 to be small by decreasing the power supplied to the blower 12 as compared to the four-seat air conditioning (normal air-conditioning mode). S22 corresponds to a semi-single seat concentration mode executing section that sets the air blowing amount ratio such that the air blowing amount from the outlet on the driver seat side becomes relatively small and such that the air blowing amount from the outlet on the passenger seat side becomes relatively large when there is not occupant in the seats other than the driver seat and the heated air temperature is higher than the target blown air temperature. S22 is not the step for executing the single seat concentration mode but is the step executed when there is no occupant in the seats other than the driver seat. Therefore, it can be said that S22 is a section that executes the semi-single seat concentration mode similar to the single seat concentration mode.

(Fifth Embodiment)

Figure 10:
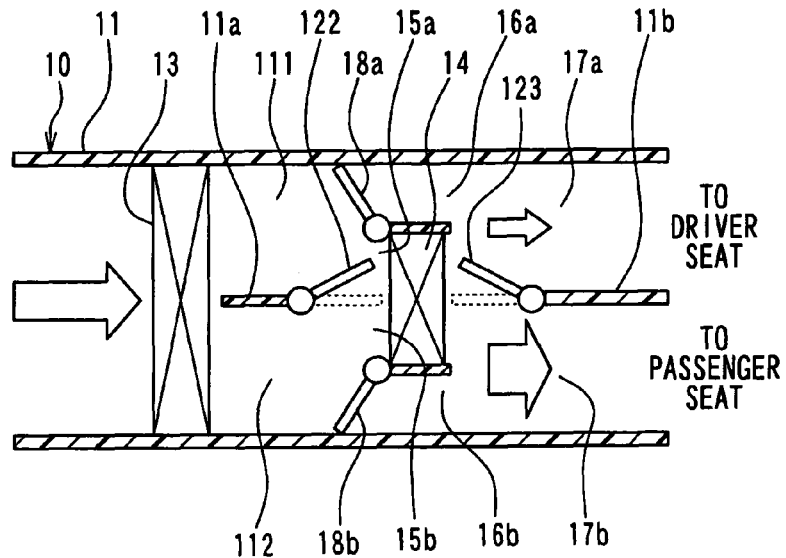
FIG. 10 is a schematic diagram showing an entire construction of a vehicular air conditioner according to a fifth embodiment of the present invention.

Next, a fifth embodiment of the present invention will be explained. FIG. 10 is a schematic diagram showing a vehicular air conditioner according to the fifth embodiment. The vehicular air conditioner according to the present embodiment performs air-conditioning control independently between the driver seat side and the passenger seat side like the fourth embodiment. Instead of the air volume ratio changing door 121 in the construction shown in FIG. 8, the present embodiment uses air passageway area changing doors 122, 123 as air passageway area changing sections for changing air passageway areas of the heater core 14 on the driver seat side and the passenger seat side.

More specifically, an upstream air passageway area changing door 122 is provided adjacently upstream of the heater core 14 with respect to the airflow direction. A downstream air passageway area changing door 123 is provided adjacently downstream of the heater core 14 with respect to the airflow direction. A partition wall 11a is provided between the evaporator 13 and the upstream air passageway area changing door 122 and partitions the air passageway 111 on the driver seat side and the air passageway 112 on the passenger seat side. A partition wall 11b is provided downstream of the downstream air passageway area changing door 123 and partitions the air passageway 111 on the driver seat side and the air passageway 112 on the passenger seat side.

Both of the air passageway area changing doors 122, 123 are constructed to be able to move between normal positions shown by broken lines and positions shown by solid lines in FIG. 10. When the air passageway area changing doors 122, 123 are positioned at the normal positions, the air passageway area of the heater core 14 on the driver seat side is conformed to the air passageway area of the heater core 14 on the passenger seat side. When the air passageway area changing doors 122, 123 are positioned at the positions shown by the solid lines, the air passageway area of the heater core 14 on the driver seat side is set relatively small and the air passageway area on the passenger seat side is set relatively large.

In the present embodiment, the control processing of the air-conditioning controller 60 explained in the description of the fourth embodiment is modified as follows.

Positioning the air passageway area changing doors 122, 123 to the normal positions is added to S11 of FIG. 9.

In S22 of FIG. 9, instead of changing the air volume ratio between the air passageway 111 on the driver seat side and the air passageway 112 on the passenger seat side, a ratio between the air passageway area of the heater core 14 on the driver seat side and the air passageway area of the heater core 14 on the passenger seat side is changed. More specifically, the air passageway area changing doors 122, 123 are brought to the positions for relatively decreasing the air passageway area of the heater core 14 on the driver seat side and relatively increasing the air passageway area of the heater core 14 on the passenger seat side.

Thus, also in the present embodiment, when the single seat concentration mode can be executed and the heater core blown air temperature TWD is higher than the target blown air temperature TAO, the air volume blown from the foot outlet on the driver seat side can be decreased relatively, and the air volume blown from the foot outlet on the passenger seat side can be increased relatively. Accordingly, an effect similar to the effect of the fourth embodiment can be exerted.

(Sixth Embodiment)

Figure 11:
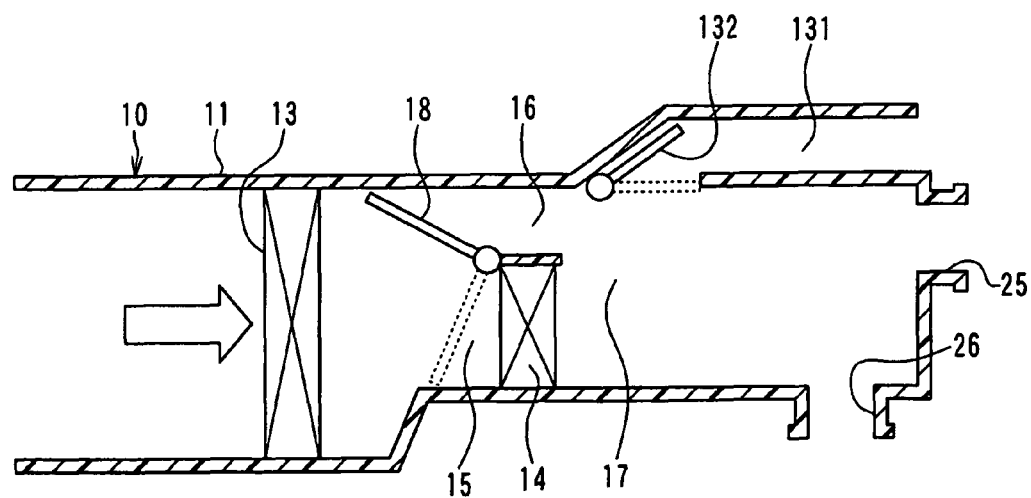
FIG. 11 is a schematic diagram showing an entire construction of a vehicular air conditioner according to a sixth embodiment of the present invention.

Next, a sixth embodiment of the present invention will be described. FIG. 11 is a schematic diagram showing a vehicular air conditioner according to the sixth embodiment. The vehicular air conditioner according to the present embodiment has an instrument panel air passageway 131 as an air passageway for an instrument panel and an instrumental panel opening-closing door 132 as an opening-closing section for opening and closing the air passageway 131 in addition to the construction according to the first embodiment shown in FIG. 1.

The instrumental panel air passageway 131 is for blowing the air-conditioning wind not to the inside of the vehicle compartment but to an inside space of the instrumental panel. More specifically, the instrumental panel air passageway 131 is provided in the most downstream portion of the casing 11 downstream of the heater core 14 with respect to the airflow direction independently from the defroster opening section, the face opening section 25 and the foot opening section 26. An outlet (not shown) as a tip end portion of the instrumental panel air passageway 131 is arranged inside the instrumental panel. The defroster opening section, the outlet mode doors and the outlets are not shown in FIG. 11.

The air-conditioning controller 60 according to the present embodiment performs the control processing explained in the description of the fourth embodiment in a partly modified manner as follows.

Positioning the instrumental panel opening-closing door 132 to a position for closing the instrumental panel air passageway 131 is added to S11 and S15 of FIG. 9.

In S22 of FIG. 9, the single seat concentration switching door 57a for the feet is positioned to a position for closing the passages 55, 56 connecting to the foot outlet 52 on the passenger seat side and the foot outlet 53 on the backseat side other than the passage connecting to the foot outlet 51 on the driver seat side. Further, the instrumental panel opening-closing door 132 is positioned to a position for opening the instrumental panel air passageway 131.

Therefore, in the present embodiment, when the single seat concentration mode can be executed during the foot mode and the heater core blown air temperature TWD is higher than the target blown air temperature TAO, the single seat concentration mode is executed and the warm air is blown toward the space inside the instrumental panel through the instrumental panel air passageway 131. Thus, the foot duct 50 can be warmed by warming the inside space of the instrumental panel. Thus, the heat radiation loss, which is caused when the warm air passes through the inside of the foot duct 50, can be reduced. As a result, the temperature of the air blown from the foot outlet 51 on the driver seat side can be increased as compared to the case where the instrument panel air passageway 131 is closed.

Thus, according to the present embodiment, the warm air at as high temperature as possible is hit directly against the occupant, so the occupant can have the sensation of sufficient warmth. In addition, the heat amount equivalent to the engine heat radiation loss in the case of the single seat concentration mode can be used effectively.

In the present embodiment, the air-conditioning wind is blown toward the space inside the instrumental panel through the instrumental panel air passageway 131. Regarding this point, in order to reduce the heat radiation loss at the time when the warm air passes through the duct, the outlet of the instrumental panel air passageway 131 should be preferably formed to blow the air-conditioning wind to a duct section defining the air passageway 54 connecting to the outlet 51 on the driver seat side in the foot duct 50.

In the present embodiment, S15 and S17 correspond to a single seat concentration mode executing section that executes the single seat concentration mode when there is no occupant in the seats other than the driver seat and that reduces the power supplied to the blower 12 to set the target air blowing amount of the blower 12 smaller than in the case of the four-seat air conditioning (i.e., normal air-conditioning mode). S22 corresponds to a second single seat concentration mode executing section that executes the single seat concentration mode when there is no occupant in the seats other than the driver seat and the heated air temperature is higher than the target blown air temperature and that decides the opening or closing of the instrumental panel air passageway 131 to blow the warm air to the inside space of the instrumental panel.

(Seventh Embodiment)

Figure 12:
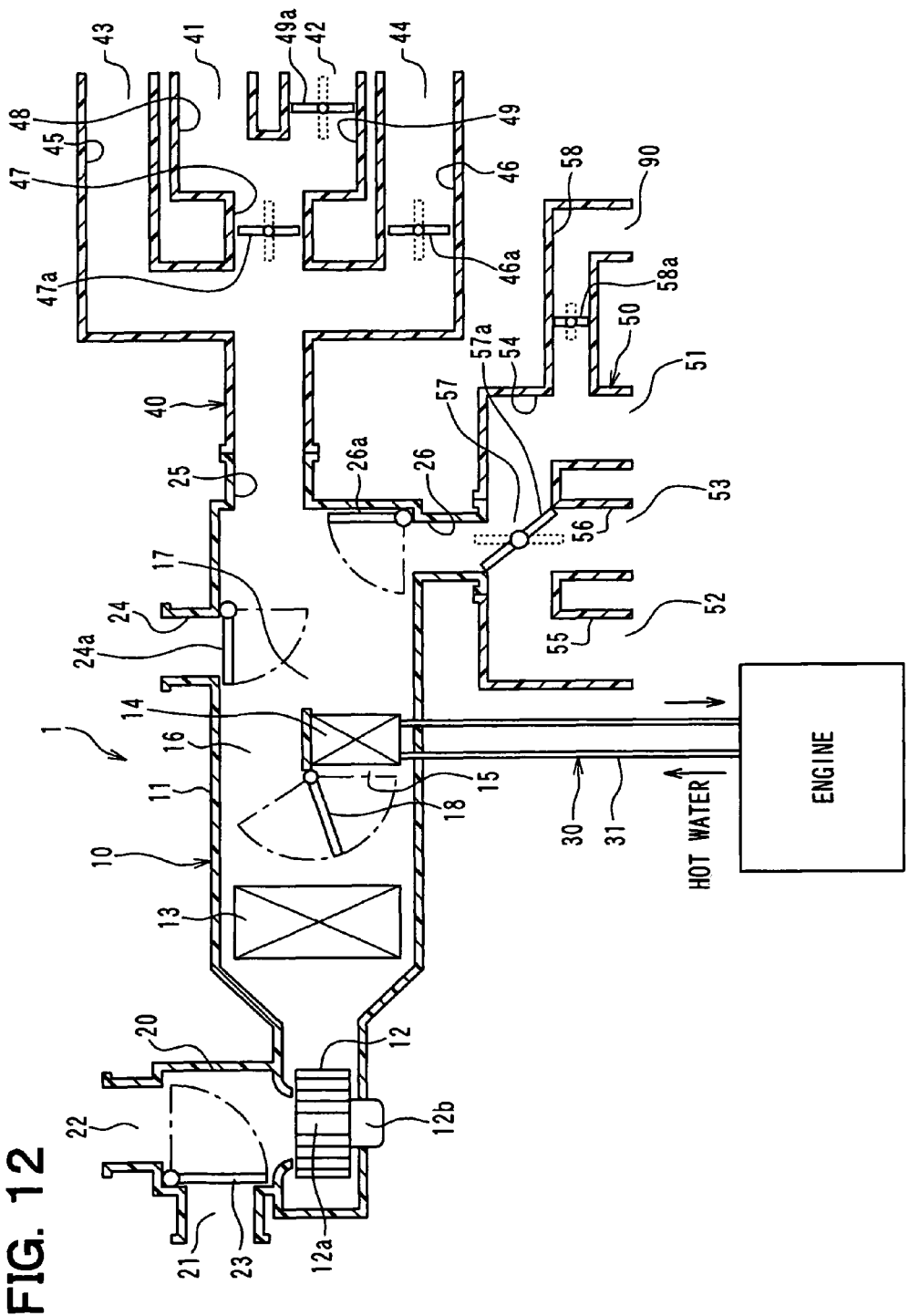
FIG. 12 is a schematic diagram showing an entire construction of a vehicular air conditioner according to a seventh embodiment of the present invention.

Next, a twelfth embodiment of the present invention will be described. FIG. 12 shows an entire construction of a vehicular air conditioner according to the seventh embodiment. In the present embodiment, an above-the-knee outlet ahead of the driver seat is added to the construction of FIG. 1 explained as the first embodiment. A single seat concentration switching door 49a for the center face is provided like the second embodiment.

The above-the-knee outlet 90 is arranged near a space above the knees of the occupant in the driver seat. The above-the-knee outlet 90 blows the air-conditioning wind toward the lower body of the occupant extending from the thighs to the waist and connects to the foot duct 50. The foot duct 50 has a passage 58 that branches from the passage 54, which connects to the foot outlet 51 on the driver seat side, and that connects to the above-the-knee outlet 90. An above-the-knee single seat concentration switching door 58a for opening and closing the passage 58 is provided in the passage 58. The single seat concentration switching door 58a switches between permission and prohibition of the blowing of the air-conditioning wind from the above-the-knee outlet 90.

Figure 13:
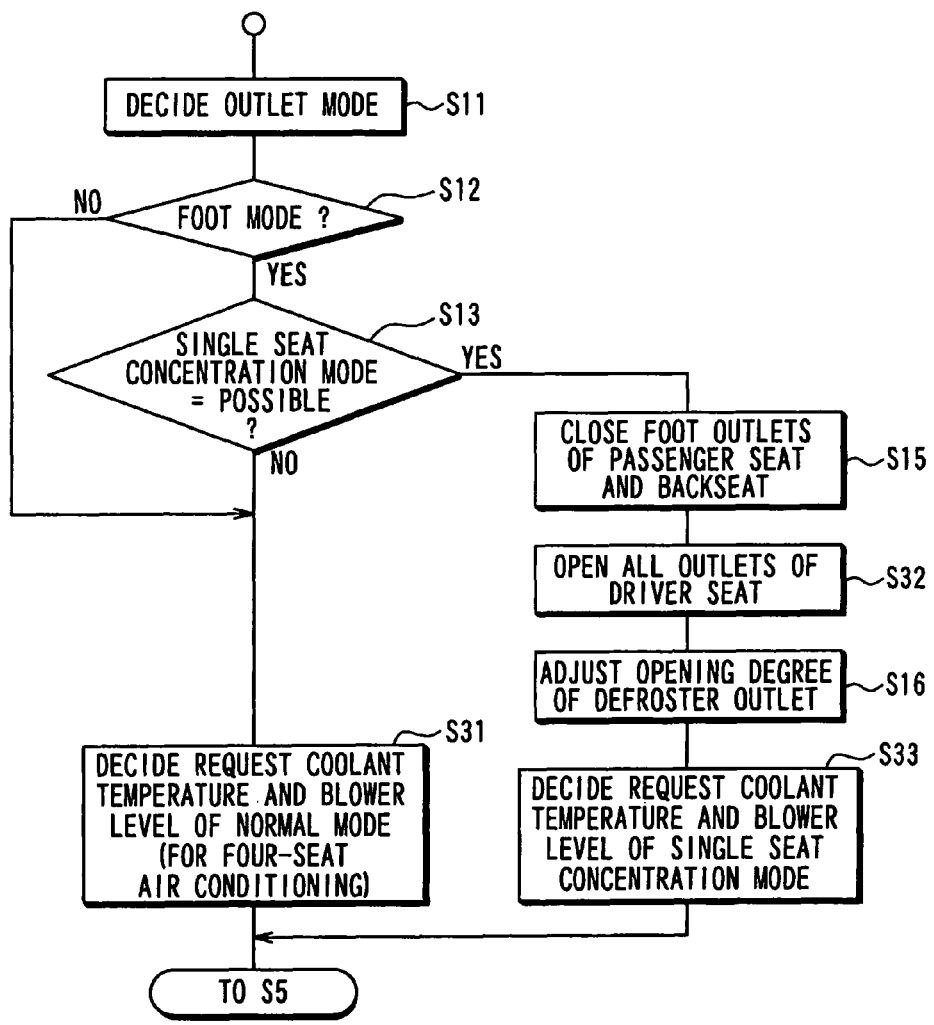
FIG. 13 is a flowchart showing a part of control processing of an air-conditioning controller, according to the seventh embodiment.

Next, an operation of the present embodiment will be explained. FIG. 13 is a flowchart showing a part of the control processing of the air-conditioning controller according to the present embodiment and corresponds to FIG. 4. In the present embodiment, S14 and S17 of FIG. 4 are replaced with S31 and S33 respectively, and S32 is added between S15 and S16.

As shown in FIG. 13, when the determination result is "NO" in S13, the target air blowing amount of the blower 12 (i.e., blower level) for the four-seat air conditioning and the engine operation request coolant temperature are decided in S31.

When the determination result in S13 is "YES," the mode is decided on the single seat concentration mode for closing the foot outlets 52, 53 on the passenger seat side and the backseat side in S15. Then in S32, it is decided to open all the outlets on the driver seat side. That is, the blowing of the air-conditioning wind from certain outlets corresponding to the driver seat, the blowing from which is prohibited in the four-seat air-conditioning foot mode, is permitted among the outlets corresponding to the driver seat.

More specifically, the face door 47a is positioned to the position for opening the center face passage 47. In addition, the single seat concentration switching door 49a for the face is positioned to the position for closing the passage 49 connecting to the center face outlet 42 on the passenger seat side. Thus, the blowing of the air from the center face outlet 41 on the driver seat side is permitted.

In addition, the single seat concentration switching door 46a for the side face is positioned to the position for closing the passage 46 connecting to the side face outlet 44 on the passenger seat side. Thus, the blowing of the air from the side face outlet 44 on the passenger seat side is prohibited. Furthermore, the single seat concentration switching door 58a for the above-the-knee space is positioned to the position for opening the passage 58 connecting to the above-the-knee outlet 90. Thus, the blowing of the air from the above-the-knee outlet 90 is permitted. The blowing of the air from the foot outlet 51 on the driver seat side is permitted during the foot mode and the blowing of the air from the side face outlet on the driver seat side is invariably permitted.

Thus, the blowing of the air from all the outlets on the driver seat side is permitted during the single seat concentration mode.

Then, the opening degree of the defroster outlet is adjusted in S16. Then, in S33, the target air blowing amount of the blower 12 (blower level) for the single seat concentration mode and the engine operation request coolant temperature are decided. At that time, the blower level and the request coolant temperature are decided with reference to a control map beforehand stored in the air-conditioning controller 60 based on TAO decided in S3 of FIG. 3.

Figure 14:
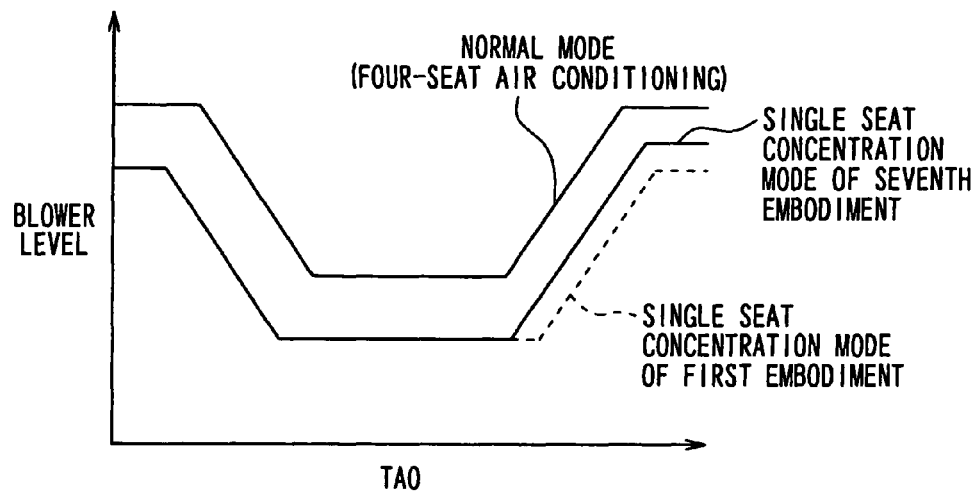
FIG. 14 is a diagram showing a control map of an air blowing amount of a blower according to the seventh embodiment.
Figure 15:
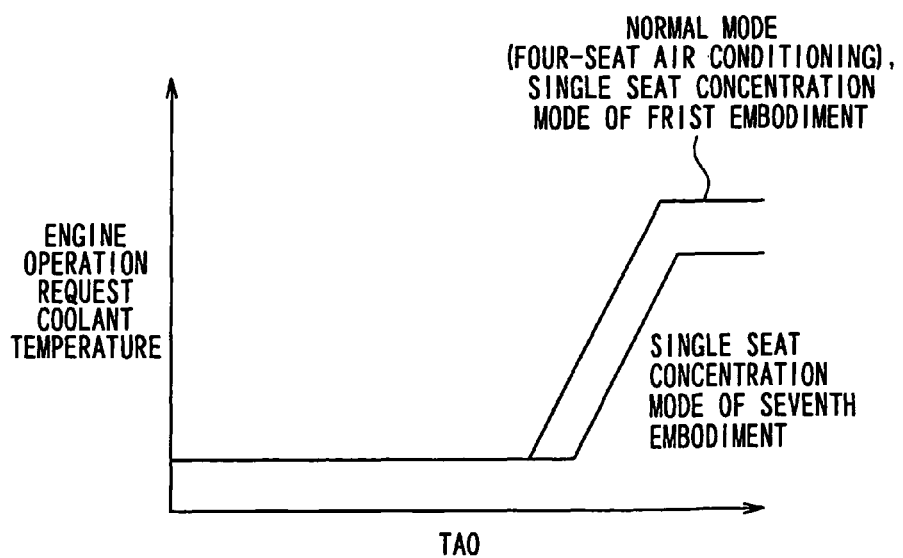
FIG. 15 is a diagram showing a control map of engine operation request coolant temperature according to the seventh embodiment.

FIGS. 14 and 15 show the control map of the blower level and the control map of the request coolant temperature used in the present embodiment. The vertical axis of FIG. 14 shows the blower level. The vertical axis of FIG. 15 shows the engine operation request coolant temperature. The horizontal axes of FIGS. 14 and 15 show the target blown air temperature TAO.

As shown in FIG. 14, the control map of the blower level used during the single seat concentration mode is defined such that the blower level is lower than the blower level in the control map used during the four-seat air conditioning with respect to the same value of TAO in whole. Therefore, the target air blowing amount of the blower 12 during the single seat concentration mode is smaller than the target air blowing amount of the blower 12 during the four-seat air conditioning when TAO is the same.

However, the control map used in the present embodiment is defined such that the blower level in the high-temperature range where TAO is higher than predetermined temperature is higher than the blower level defined in the control map used in the first embodiment. Therefore, the target air blowing amount of the blower 12 during the single seat concentration mode is larger than the target air blowing amount of the blower 12 during the single seat concentration mode of the first embodiment when TAO is the same.

As shown in FIG. 15, the control map of the engine operation request coolant temperature during the four-seat air conditioning or the single seat concentration mode of the first embodiment is defined such that the request coolant temperature is constant in the low-temperature range where TAO is lower than predetermined temperature. In the high-temperature range where TAO is higher than the predetermined temperature, the request coolant temperature increases as TAO increases. The request coolant temperature becomes constant maximum temperature when TAO is equal to or higher than certain temperature.

The control map of the engine operation request coolant temperature used during the single seat concentration mode of the seventh embodiment is defined such that the request coolant temperature in the high-temperature range of TAO is lower than the request coolant temperature in the control map used during the four-seat air conditioning or the single-seat concentration mode of the first embodiment with respect to the same value of TAO. Therefore, during the foot mode in which TAO is in the high-temperature range, the engine operation request coolant temperature during the single seat concentration mode is set at the lower temperature than the request coolant temperature during the four-seat air conditioning when TAO is the same.

Such the control map of the blower level and the control map of the engine operation request coolant temperature in the single seat concentration mode are obtained based on a relationship between the blower level and the request coolant temperature explained below.

Figure 16:
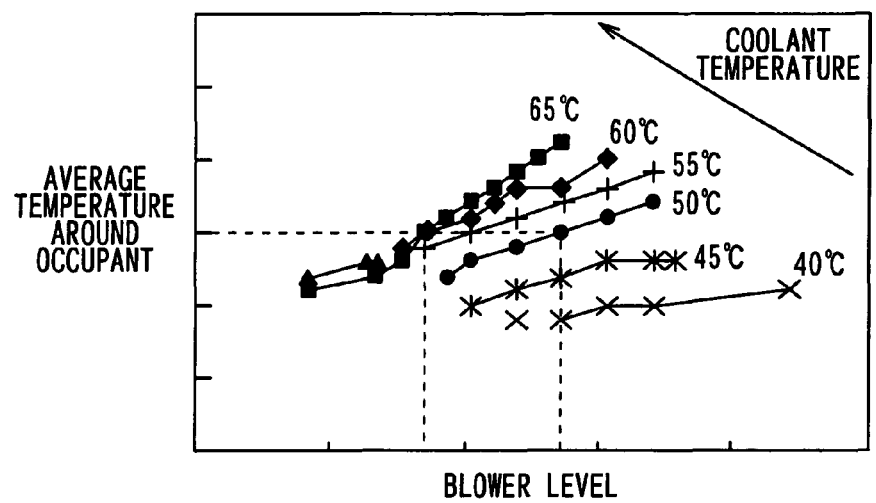
FIG. 16 is a diagram showing a relationship between a blower level and average temperature around occupant.

FIG. 16 shows a relationship between the blower level and average temperature around the occupant at each coolant temperature. FIG. 16 shows measurement results in the case where the blowing from all the outlets corresponding to the driver seat is permitted in S15 and S32 of FIG. 13 in the vehicular air conditioner according to the present embodiment. The average temperature around the occupant is average temperature around the occupant in the driver seat. The average temperature around the occupant is an average value of measured temperatures at positions from the head position to the foot position of the occupant in the driver seat.

The experimental results obtained by the inventors as shown in FIG. 16 show that the average temperature around the occupant increases as the blower level increases and the air blowing amount of the blower increases when the coolant temperature is constant at any coolant temperature. Furthermore, as shown by a broken line in FIG. 16, it is found that the average temperature around the occupant at the time when the coolant temperature is low can be equalized to the average temperature around the occupant at the time when the coolant temperature is high by increasing the blower level.

Figure 17:
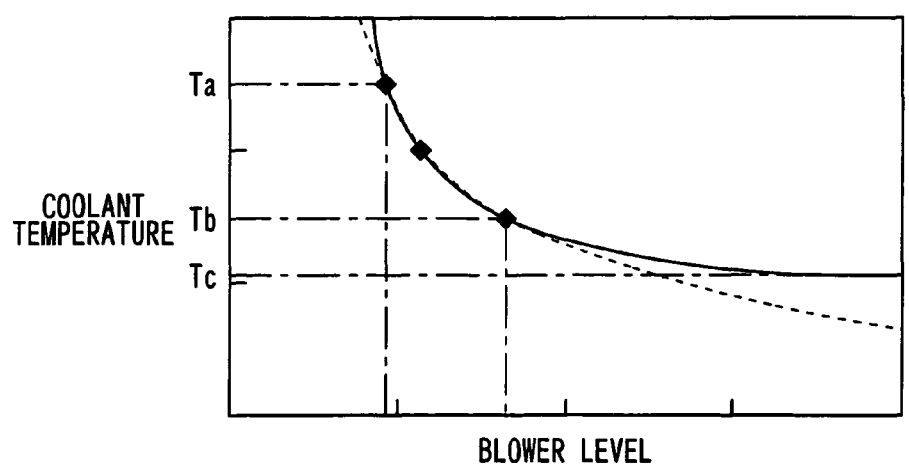
FIG. 17 is a diagram showing a relationship between coolant temperature and the blower level providing equal average temperature around the occupant.

FIG. 17 shows a relationship between the coolant temperature and the blower level for equalizing the average temperature around the occupant. A solid curve line in FIG. 17 shows a relationship between the coolant temperature and the blower level providing the equal temperature around the occupant based on the measurement results shown in FIG. 16. That is, the solid curve line in FIG. 17 is an equal warmth sensation line indicating the occupant's sensation of equal warmth. A broken curve line in FIG. 17 is an equal heat amount line indicating an equal heat amount used for the heating.

If the relationship between the coolant temperature and the blower level coincides with a relationship on the equal warmth sensation line shown in FIG. 17, the occupant's sensation of being warmed is the same. However, even when the relationship between the coolant temperature and the blower level resides on the equal warmth sensation line, the heat amount used for the heating increases if the coolant temperature deviates upward from the equal heat amount line of FIG. 17 as shown in the range between Tb and Tc. Therefore, from the viewpoint of energy saving, the coolant temperature and the blower level should preferably have a relationship residing on the equal warmth sensation line and the equal heat amount line as shown in the range of the coolant temperature between Ta and Tb.

Therefore, in the control map of the blower level and the control map of the engine operation request coolant temperature during the single seat concentration mode shown in FIGS. 14 and 15, the request coolant temperature and the blower level during the single seat concentration mode are set to satisfy the relationship residing on the equal warmth sensation line and the equal heat amount line shown in FIG. 17 as opposed to the request coolant temperature and the blower level during the four-seat air conditioning. For example, the request coolant temperature in the single seat concentration mode is set lower than the request coolant temperature in the four-seat air conditioning by approximately 10 Celsius degrees. The blower level in the single-seat concentration mode corresponding to the request coolant temperature is set such that the occupant in the driver seat can have the sensation of being warmed equal to the sensation in the case of the four-seat air conditioning.

Then, the process proceeds to S5, in which the control signals are outputted. Thus, when the outlet mode is decided on the foot mode and the single seat concentration mode can be executed, the respective doors are brought to the positions of the single seat concentration mode.

At that time, the blower 12 operates at the blower level that is lower than in the case of the normal foot mode and that is higher than in the case of the single seat concentration mode of the first embodiment. The air-conditioning controller 60 determines whether the engine operation request is necessary based on the request coolant temperature set lower than the usual value.

As a result, the warm air is blown only from the foot outlet 51 on the driver seat side among the foot outlets 51-53. The warm air is blown only from the center face outlet 41 and the side face outlet 43 on the driver seat side among the face outlets 41-44. The warm air is blown from the above-the-knee outlet 90.

As explained above, the air-conditioning controller 60 according to the present embodiment sets the blower level and the engine operation request coolant temperature during the single seat concentration mode to be lower than in the case of the normal foot mode with respect to the same value of TAO in S33.

Therefore, like the first embodiment, the electric power consumed by the electric motor 12b of the blower 12 can be reduced to realize the energy saving in the present embodiment.

Furthermore, according to the present embodiment, the stoppage period of the engine from the timing immediately after the engine is stopped to the timing when the operation of the engine is started can be lengthened by setting the engine operation request coolant temperature to be low. Accordingly, the engine operation rate can be reduced. Therefore, according to the present embodiment, the engine fuel consumption can be reduced without spoiling the driver's sensation of being warmed. Thus, a practical fuel economy, which is a running distance per unit fuel amount, can be improved.

Figure 18A:
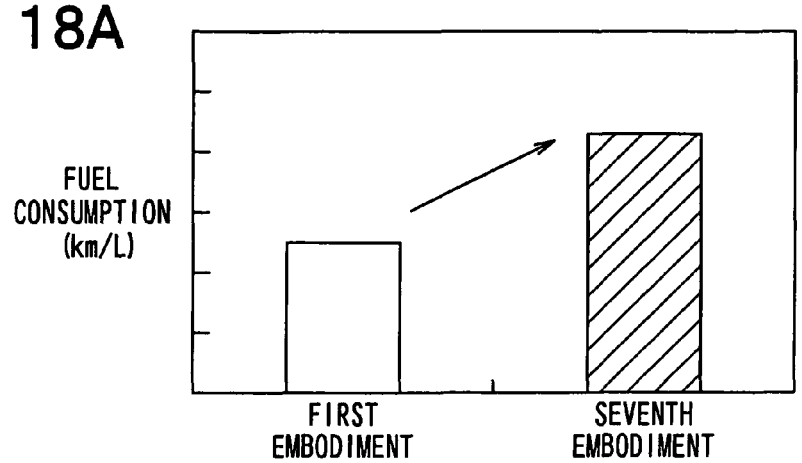
FIGS. 18 A, 18B and 18C are diagrams showing results of comparison of fuel consumption, an engine operation rate and a heating heat amount during a single seat concentration mode between the first embodiment and the seventh embodiment.
Figure 18B:
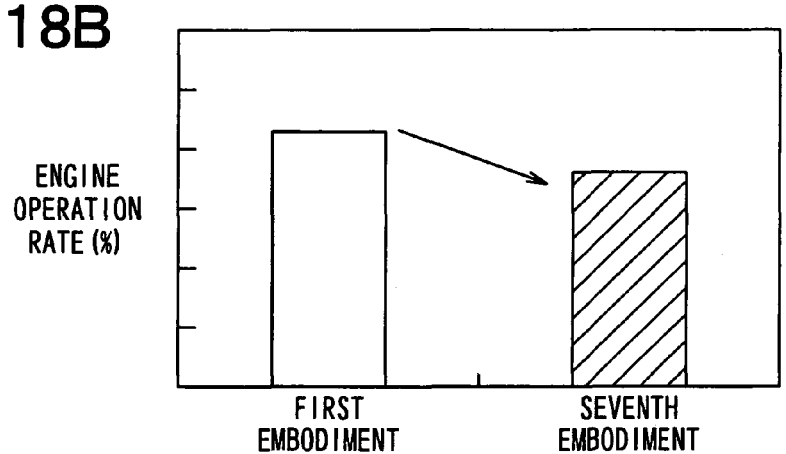
Figure 18C:
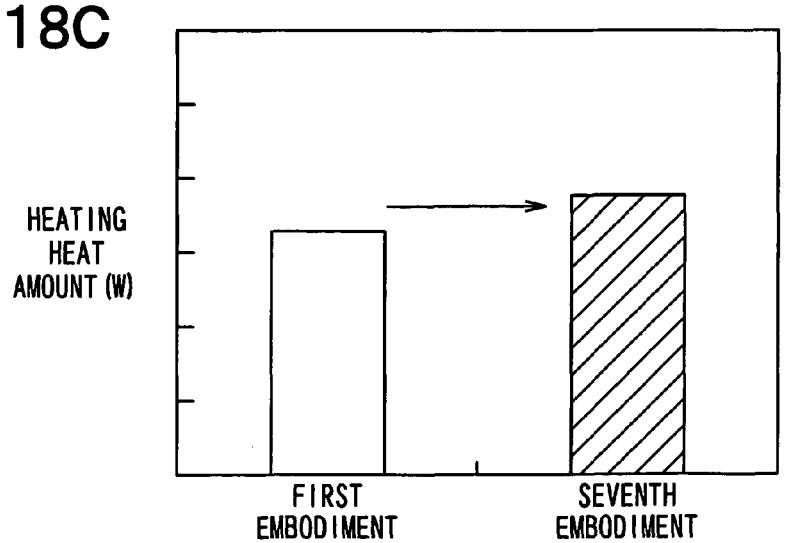

FIGS. 18A, 18B and 18C show the results of the comparison of the fuel consumption, the engine operation rate and the heating heat amount during the single seat concentration mode between the first embodiment and the present embodiment (seventh embodiment) respectively. FIGS. 18A, 18B and 18C show the results of measurement based on a predetermined practical fuel economy evaluation mode run. During the measurement, the request coolant temperature Tb (degrees C.) of the present embodiment is set lower than the request coolant temperature Ta (degrees C.) of the first embodiment (i.e., Ta>Tb), and the blower rotation speed Nb (rpm) of the present embodiment is set higher than the blower rotation speed Na (rpm) of the first embodiment (i.e., Na<Nb).

As shown in FIGS. 18A-18C, according to the present embodiment, the fuel consumption can be improved and the engine operation rate can be reduced while maintaining the consumed heating heat amount near the same level as compared to the first embodiment.

(Eighth Embodiment)

Figure 19:
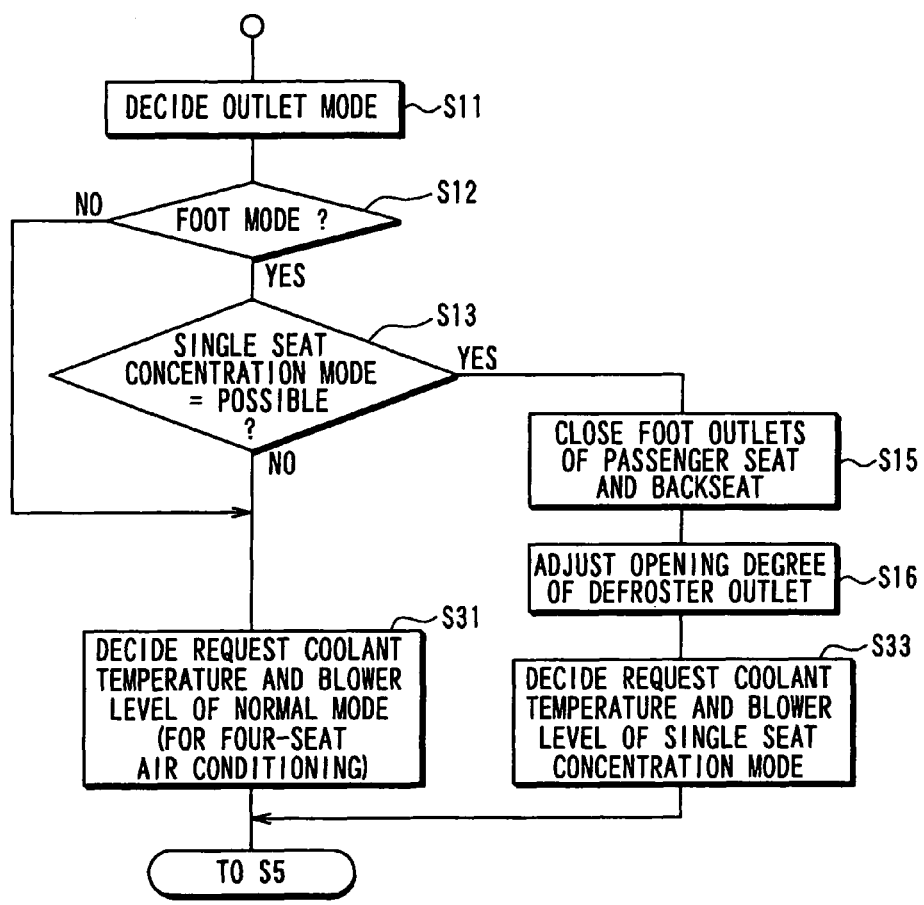
FIG. 19 is a flowchart showing a part of control processing of an air-conditioning controller according to an eighth embodiment of the present invention.

Next, an eighth embodiment of the present invention will be described. FIG. 19 is a flowchart showing a part of the control processing of the air-conditioning controller according to the present embodiment. In FIG. 19, S32 of the flowchart of FIG. 13 of the seventh embodiment is not used.

In the seventh embodiment, it is decided to open all the outlets on the driver seat side in S32 when the single seat concentration mode is executed. As contrasted thereto, in the present embodiment, only the blowing of the air from the foot outlet 51 on the driver seat side is permitted among the foot outlets 51-53 in S15.

There occurs a certain degree of difference from the seventh embodiment in such the case where the warm air is blown from the foot outlet 51 on the driver seat side without opening all the outlets on the driver seat side during the single seat concentration mode as in the present embodiment. However, also in such the case of the present embodiment, there is a relationship that the average temperature around the occupant increases as the blowing amount of the blower increases when the coolant temperature is constant as shown in FIG. 16. There is also a relationship between the coolant temperature and the blower level equalizing the average temperature around the occupant as shown in FIG. 17.

Therefore, also in the present embodiment, the blower level and the request coolant temperature during the single seat concentration mode can be set lower than in the case of the four-seat air conditioning in the range where the occupant in the driver seat can have the sensation of being warmed similarly to the case of the four-seat air conditioning.

(Ninth Embodiment)

Figure 20:
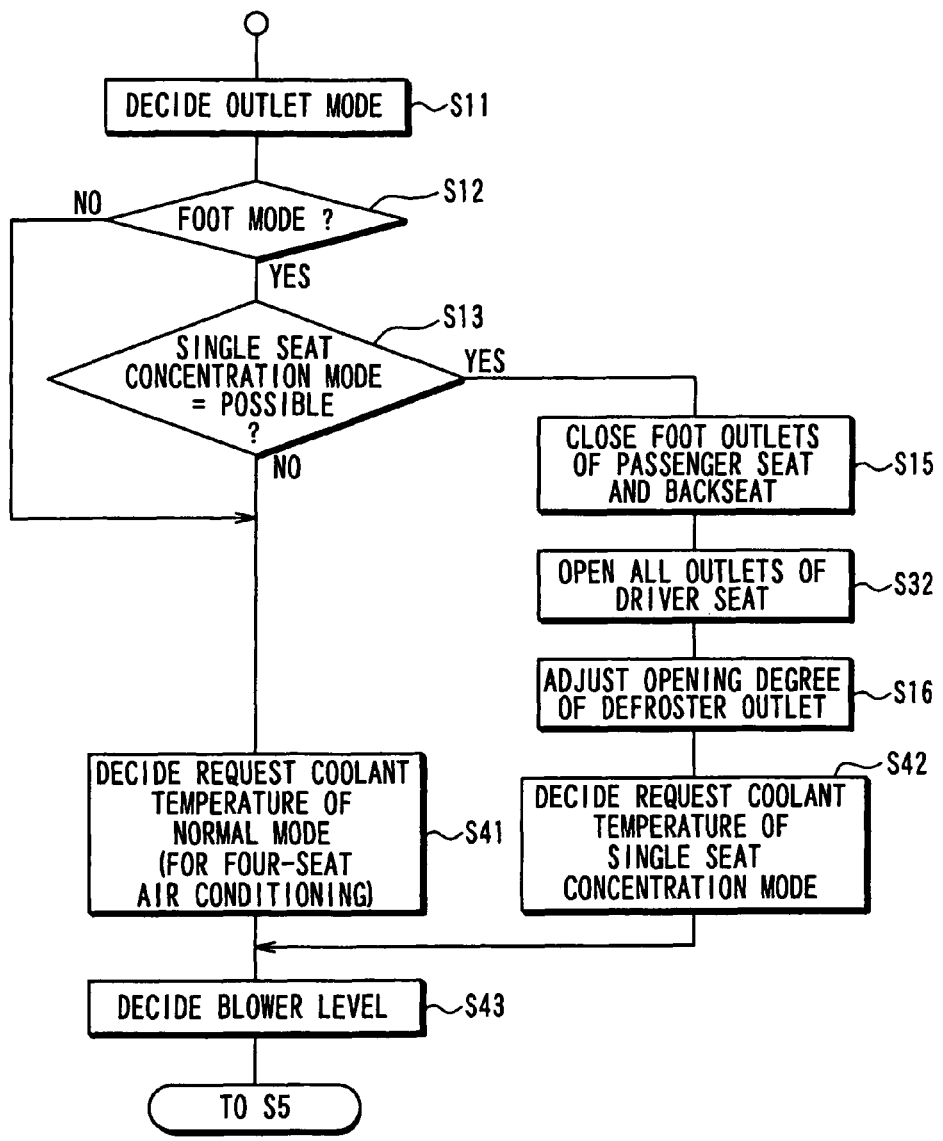
FIG. 20 is a flowchart showing a part of control processing of an air-conditioning controller according to a ninth embodiment of the present invention.

Next, a ninth embodiment of the present invention will be described. FIG. 20 is a flowchart showing a part of control processing performed by an air-conditioning controller according to the present embodiment. In the flowchart of FIGS. 20, S31 and S33 of FIG. 13 of the seventh embodiment are replaced with S41 and S42 respectively, and S43 is added after S41 and S42. In the present embodiment, only the engine operation request coolant temperature among the blower level and the engine operation request coolant temperature is set lower in the single seat concentration mode than in the case of the four-seat air conditioning.

More specifically, the engine operation request coolant temperature is decided in S41 when the determination result is "NO" in S13. At that time, the request coolant temperature is decided based on TAO with reference to a control map of the engine operation request coolant temperature for the four-seat air conditioning beforehand stored in the air-conditioning controller 60.

When the determination result in S13 is "YES," S15, S32 and S16 are performed like the seventh embodiment. Then, the engine operation request coolant temperature for the single seat concentration mode is decided in S42. At that time, the request coolant temperature is decided based on TAO with reference to a control map of the engine operation request coolant temperature for the single seat air conditioning beforehand stored in the air-conditioning controller 60. The control map shown in FIG. 15 can be used as the control map as in the seventh embodiment.

After S41 and S42, the blower level is decided based on TAO with reference to the control map beforehand stored in the air-conditioning controller 60 defining the same blower level irrespective of whether the mode is the four-seat air conditioning or the single seat concentration mode in S43.

In this way, the blower level can be decided by using the same control map irrespective of whether the mode is the four-seat air conditioning or the single seat concentration mode, and the engine operation request coolant temperature can be set lower in the single seat concentration mode than in the case of the four-seat air conditioning.

The air blowing amount in the single seat concentration mode is larger than in the case of the four-seat conditioning with respect to the same value of TAO. Therefore, when the engine coolant temperature is the same, the driver's sensation of being warmed is higher in the single seat concentration mode than in the case of the four-seat air conditioning. Therefore, the engine coolant temperature can be reduced and the engine operation rate can be reduced in a range where the sensation of being warmed in the single seat concentration mode is equal to or higher than in the case of the four-seat air conditioning.

(Tenth Embodiment)

Figure 21:
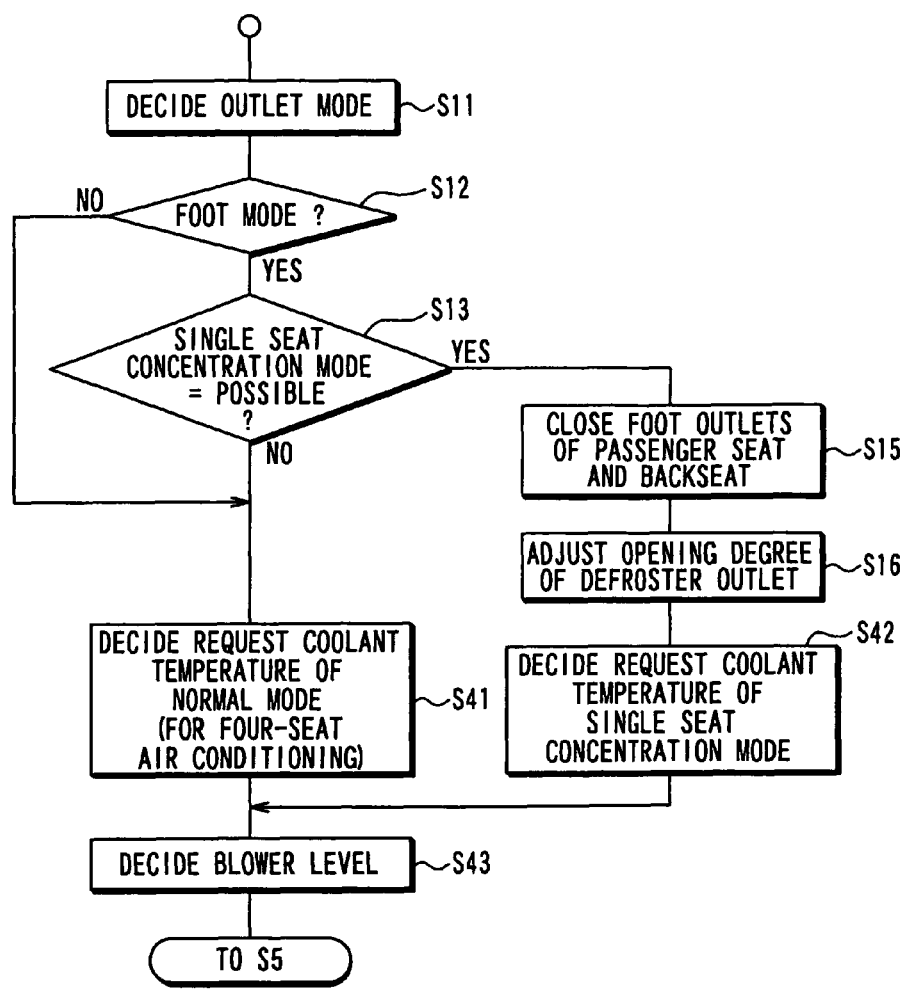
FIG. 21 is a flowchart showing a part of control processing of an air-conditioning controller according to a tenth embodiment of the present invention.

Next, a tenth embodiment of the present invention will be described. FIG. 21 is a flowchart showing a part of control processing performed by an air-conditioning controller according to the present embodiment. In FIG. 21, S32 of the flowchart of FIG. 20 of the ninth embodiment is not used. The ninth embodiment can be modified into the present embodiment as the seventh embodiment is modified into the eighth embodiment.

(Modifications)

(1) In the above-described embodiments, when the air-conditioning controller 60 executes the single seat concentration mode, the controller 60 sets the blower level to be low to equalize the air blowing amount from the foot outlet 51 on the driver seat side to the air blowing amount in the case of the four-seat air conditioning as shown in S17 of FIG. 4. Alternatively, the blower level may be set low to an extent that the air blowing amount from the foot outlet 51 on the driver seat side in the single seat concentration mode becomes equal to or larger than the air blowing amount from the foot outlet 51 on the driver seat side in the four-seat air conditioning for the same value of TAO. Alternatively, the blower level may be set low to an extent that the air blowing amount from the foot outlet 51 on the driver seat side in the single seat concentration mode becomes smaller than the air blowing amount from the foot outlet 51 on the driver seat side in the four-seat air conditioning.

(2) In the above-described embodiments, the air-conditioning unit 10 for the front seats has the foot outlet 53 on the backseat side. Alternatively, the foot outlet 53 on the backseat side may be eliminated. In this case, the blowing of the air from the foot outlet 51 on the driver seat side is permitted and the blowing of the air from the foot outlet 52 on the passenger seat side is prohibited during the single seat concentration mode.

In the above-described embodiments, the blowing of the air from the foot outlet 51 on the driver seat side is permitted and the blowing of the air from the foot outlets 52, 53 on the passenger seat side and the backseat side is prohibited during the single seat concentration mode. Alternatively, the construction may be modified to prohibit only the blowing of the air from the foot outlet 53 on the backseat side when the occupants are seated in both of the driver seat and the passenger seat. In this way, the construction may be modified to prohibit the blowing of the air from at least one of the outlets, which are provided for the seats other than the driver seat, during the single seat concentration mode.

(3) In the above-described first to sixth embodiments, when the air-conditioning controller 60 executes the single seat concentration mode, the controller 60 automatically sets the blower level to be lower than in the case of the four-seat air conditioning as shown in S17 of FIG. 4. Alternatively, instead of setting so automatically, the air-conditioning controller 60 may be configured to set the blower level to be lower than in the case of the four-seat air conditioning when an economy switch 70d is pushed by the occupant and an economy mode is selected.

In the seventh and eighth embodiments, when the air-conditioning controller 60 executes the single seat concentration mode, the controller 60 automatically sets the blower level and the engine operation request coolant temperature to be lower than in the case of the four-seat air conditioning as shown in S33 of FIG. 13. Alternatively, instead of setting so automatically, the air-conditioning controller 60 may be configured to set the blower level and the engine operation request coolant temperature to be lower than in the case of the four-seat air conditioning when the economy switch 70d is pushed by the occupant and the economy mode is selected. Alternatively, the air-conditioning controller 60 may be configured to, set the blower level and the engine operation request coolant temperature to be lower than in the case of the four-seat air conditioning as in the seventh embodiment when the economy switch 70d is pushed by the occupant and the economy mode is selected and to set only the blower level among the blower level and the request coolant temperature to be lower than in the case of the four-seat air conditioning as in the first embodiment when the economy mode is not selected.

In the ninth and tenth embodiments, when the air-conditioning controller 60 executes the single seat concentration mode, the controller 60 automatically sets the engine operation request coolant temperature to be lower than in the case of the four-seat air conditioning as shown in S42 of FIG. 20. Alternatively, instead of setting so automatically, the air-conditioning controller 60 may be configured to set the engine operation request coolant temperature to be lower than in the case of the four-seat air conditioning when the economy switch 70d is pushed by the occupant and the economy mode is selected.

(4) In the above-described embodiments, the air-conditioning controller 60 decides the control target values of the respective devices based on the target blown air temperature TAO calculated from the air-conditioning heat load as shown in S4 of FIG. 3. Alternatively, the control target values may be decided directly based on the air-conditioning heat load. The air-conditioning heat bad is decided according to the set temperature and the environmental conditions including at least the inside temperature, for example.

(5) In the above-described first to seventh embodiments, the single seat concentration mode is executed during the heating. Alternatively, the single seat concentration mode may be executed during the cooling. For example, the first embodiment may be modified to be able to execute the single seat concentration mode also in the face mode or the like by removing S12 of FIG. 4.

By executing the above-mentioned single seat concentration mode during the cooling and by setting the blower level to be low, the endothermic amount of the evaporator 13 can be reduced and the required discharge performance of the compressor can be reduced. Therefore, the energy saving of the vehicular air conditioner can be realized.

(6) In the above-described embodiments, the vehicular air conditioner according to the present invention is applied to the hybrid vehicle. Alternatively, the vehicular air conditioner according to the present invention may be applied to a vehicle other than the hybrid vehicle. The vehicular air conditioner according to the present invention can be applied to a usual engine car that obtains the driving force for running the vehicle only from the engine, an idling stop car that automatically stops the engine during the stoppage of the vehicle and the like, for example. Moreover, the vehicular air conditioner according to the present invention can be applied to a fuel-cell vehicle that has a fuel cell as a drive unit.

For example, also when the vehicular air conditioner according to the first embodiment is applied to the engine car, the warm-up can be ended early like the first embodiment by executing the single seat concentration mode and controlling the blower level to be low with the air-conditioning controller 60 as in the first embodiment. Therefore, the frequency of the operations of the auxiliary electric heater, a heat pump cycle and the like for maintaining the heating can be reduced, and the deterioration of the fuel consumption can be suppressed.

(7) In the above-described embodiments, the coolant is used as the cooling fluid of the drive unit. Alternatively, other liquid or gas than the coolant may be used as the cooling fluid.

(8) The above-described embodiments may be combined with each other within a feasible range.

(Eleventh Embodiment)

Figure 22:
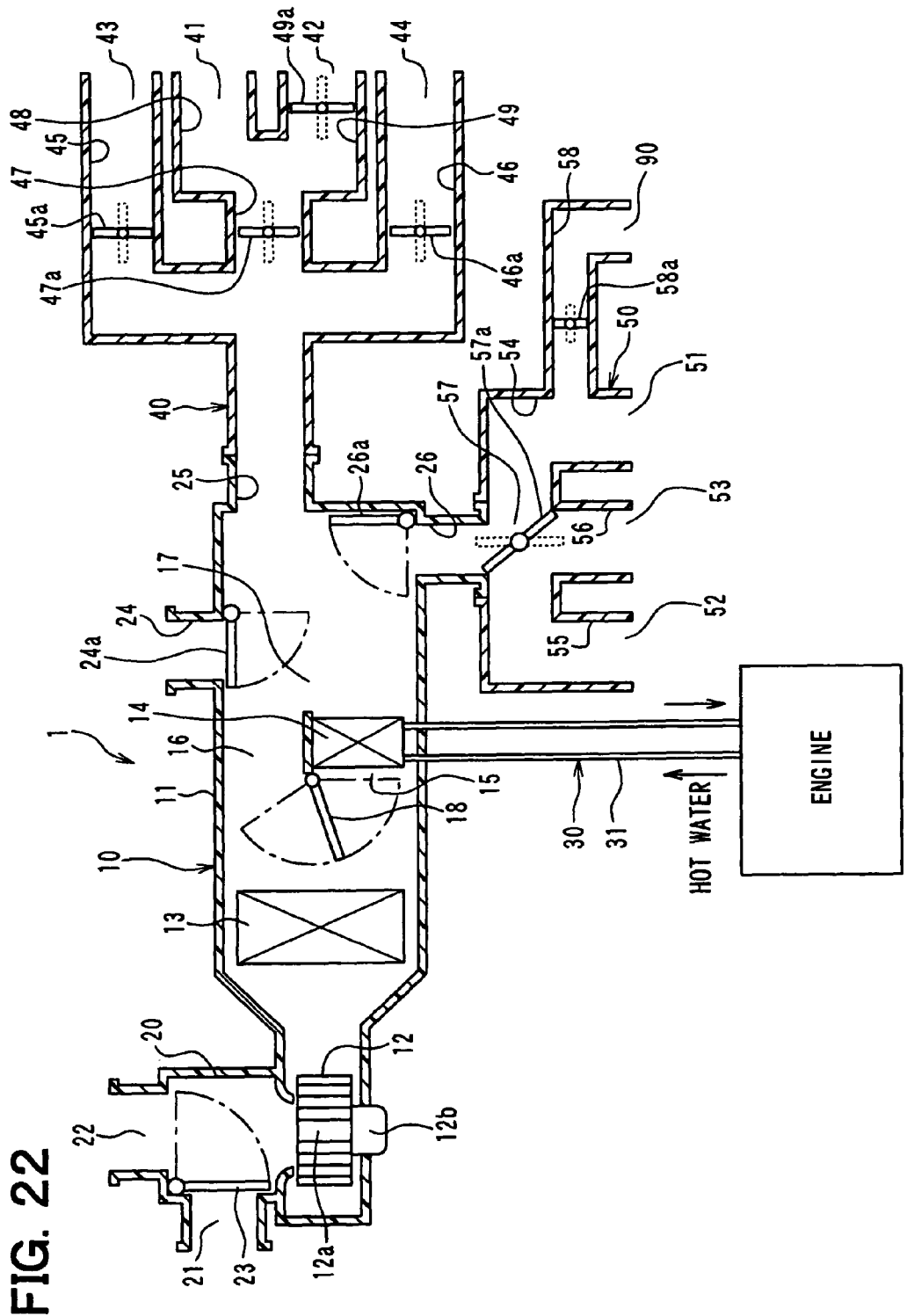
FIG. 22 is a schematic diagram showing an entire construction of a vehicular air conditioner according to an eleventh embodiment of the present invention.

Next, an eleventh embodiment of the present invention will be described. FIG. 22 shows an entire construction of a vehicular air conditioner according to the eleventh embodiment. FIG. 2 shows an electric control section of the vehicular air conditioner of FIG. 22. The vehicular air conditioner according to the present embodiment is mounted in a hybrid vehicle that obtains a driving force for running a vehicle from an engine (internal combustion engine) and an electric running motor.

The hybrid vehicle according to the present embodiment operates or stops the engine in accordance with a running load of the vehicle. Thus, the hybrid vehicle switches a running state of the vehicle among a state in which the vehicle runs by obtaining the driving force from both of the engine and the electric running motor, a state in which the vehicle runs by stopping the engine and by obtaining the driving force only from the electric running motor, and other states. Thus, the hybrid vehicle improves a vehicle fuel consumption as compared to an ordinary vehicle that obtains the driving force for running the vehicle only from the engine.

The vehicular air conditioner 1 has a compartment air-conditioning unit 10 shown in FIG. 22 and an air-conditioning controller 60 (air-conditioning ECU) shown in FIG. 2 as a controller.

The compartment air-conditioning unit 10 is arranged inside an instrument panel positioned in the foremost part of a vehicle compartment. The compartment air-conditioning unit 10 accommodates a blower 12, an evaporator 13, a heater core 14 and the like in a casing 11 defining an outer shell of the compartment air-conditioning unit 10.

The casing 11 defines an air passageway of a blown air blown into the vehicle compartment. The casing 11 is molded with a resin having a certain degree of elasticity and excellent strength. An inside-outside air switching box 20 is arranged in the most upstream part of the casing 11 with respect to a flow direction of the blown air and switchably introduces inside air (air in vehicle compartment) or outside air (air outside vehicle compartment).

More specifically, an inside air introduction port 21 for introducing the inside air into the casing 11 and an outside air introduction port 22 for introducing the outside air into the casing 11 are formed in the inside-outside air switching box 20. An inside-outside air switching door 23 is arranged in the inside-outside air switching box 20 for changing an air volume ratio between an air volume of the inside air and an air volume of the outside air. The inside-outside air switching door 23 is driven by an electric actuator 71 for the inside-outside air switching door 23. An operation of the electric actuator 71 is controlled by a control signal outputted from the air-conditioning controller 60.

The blower 12 is arranged downstream of the inside-outside air switching box 20 with respect to the airflow direction. The blower 12 blows the air suctioned through the inside-outside air switching box 20 toward the vehicle compartment. The blower 12 is an electric blower that drives a centrifugal multi-blade fan 12a with an electric motor 12b. Rotation speed of the blower 12, i.e., air blowing amount, is controlled by a control signal outputted from the air-conditioning controller 60.

The evaporator 13 is arranged downstream of the blower 12 with respect to the airflow direction. The evaporator 13 is a cooling heat exchanger that performs heat exchange between a refrigerant circulating therein and the blown air, thereby cooling the blown air. The evaporator 13 constitutes a refrigeration cycle together with a compressor, a condenser, a gas-liquid separator, an expansion valve and the like (not shown).

Air passageways including a heating cold air passageway 15 for passing air having passed through the evaporator 13 and a cold air bypass passage 16 are formed downstream of the evaporator 13 with respect to the airflow direction. Further, a mixing space 17 for mixing the air flowing out of the heating cold air passageway 15 and the air flowing out of the cold air bypass passage 16 is formed downstream of the evaporator 13 with respect to the airflow direction.

The heater core 14 as a heating section for heating the air having passed through the evaporator 13 is arranged in the heating cold air passageway 15. The heater core 14 is a heating heat exchanger for heating the air having passed through the evaporator 13 by causing heat exchange between a coolant of the engine that outputs the driving force for running the vehicle and the air having passed through the evaporator 13. A coolant flow passage 31 is provided between the heater core 14 and the engine, thereby constructing a coolant circuit 30, through which the coolant circulates between the heater core 14 and the engine.

The cold air bypass passage 16 is an air passageway for leading the air having passed through the evaporator 13 to the mixing space 17 such that the air does not pass through the heater core 14. Therefore, temperature of the blown air mixed in the mixing space 17 changes with the air volume ratio between the air passing through the heating cold air passageway 15 and the air passing through the cold air bypass passage 16.

Therefore, in the present embodiment, an air mixing door 18 is arranged downstream of the evaporator 13 and on an inlet side of the heating cold air passageway 15 and the cold air bypass passage 16 with respect to the airflow direction. The air mixing door 18 continuously changes an air volume ratio between the cold air introduced into the heating cold air passageway 15 and the cold air introduced into the cold air bypass passage 16.

Therefore, the air mixing door 18 constitutes a temperature adjusting section that adjusts the air temperature in the mixing space 17 (i.e., temperature of blown air blown into vehicle compartment). The air mixing door 18 is driven by an electric actuator 72 for the air mixing door 18. An operation of the electric actuator 72 is controlled by a control signal outputted from the air-conditioning controller 60.

In order to blow the air having adjusted temperature from the mixing space 17 into the vehicle compartment as an object space of the air conditioning, a defroster opening section 24, a face opening section 25 and a foot opening section 26 are provided in the most downstream part of the casing 11 with respect to the flow direction of the blown air.

A defroster duct (not shown) is connected to the defroster opening section 24. The air-conditioning wind is blown from a defroster outlet defined in a tip end portion of the defroster duct toward an inner, surface of a windshield. A defroster door 24a for adjusting an opening area of the defroster opening section 24 is arranged upstream of the defroster opening section 24 in the casing 11 with respect to the airflow direction.

A face duct 40 made of a resin is connected to the face opening section 25. The face duct 40 defines an air passageway extending from the face opening section 25 to face outlets 41-44. The air-conditioning wind is blown from the face outlets 41-44 formed in a tip end portion of the face duct 40 toward upper bodies of occupants in the vehicle compartment.

The face outlets 41-44 include a center face outlet 41 on a driver seat side of the vehicle and a center face outlet 42 on a passenger seat side of the vehicle. The center face outlets 41, 42 are positioned in a lateral center position of the vehicle. The face outlets 41-44 further include a side face outlet 43 on the driver seat side and a side face outlet 44 on the passenger seat side. The side face outlets 43, 44 are positioned in both end portions of the lateral direction of the vehicle.

The face duct 40 branches into three passages 45, 46, 47 downstream of the face opening section 25 with respect to the airflow direction. The passage 45 connects to the side face outlet 43 on the driver seat side. The passage 46 connects to the side face outlet 44 on the passenger seat side. The passage 47 connects to the center face outlets 41, 42 on the driver seat side and the passenger seat side. The passage 47 branches into two passages 48, 49 on the driver seat side and the passenger seat side downstream of the branch point of the three passages 45, 46, 47 with respect to the airflow direction. A face door 47a for adjusting a passage area is arranged in the passage 47.

In the present embodiment, a single seat concentration switching door 46a for the side face on the passenger seat side is arranged in the passage 46. The single seat concentration switching door 46a opens and closes the passage 46. A single seat concentration switching door 49a for the center face on the passenger seat side is arranged in the passage 49 connecting to the center face outlet 42 on the passenger seat side. The single seat concentration switching door 49a opens and closes the passage 49. The single seat concentration switching doors 46a, 49a switch between permission and prohibition of the blowing of the air from the face outlets 42, 44 on the passenger seat side.

An air volume adjusting door 45a is arranged in the passage 45. The air volume adjusting door 45a adjusts the air blowing amount blown from the side face outlet 43 on the driver seat side by adjusting the passage area.

A resin foot duct 50 is connected to the foot opening section 26 of the casing 11. A foot door 26a is arranged upstream of the foot opening section 26 with respect to the airflow direction in the casing 11. The foot duct 50 defines an air passageway extending from the foot opening section 26 to respective foot outlets 51, 52, 53. The foot duct 50 further defines an air passageway extending from the foot opening section 26 to an above-the-knee outlet 90.

The above-the-knee outlet 90 (explained in detail later) is arranged near a space above the knees of the occupant in the vehicle compartment for blowing the air-conditioning wind toward the lower body of the occupant extending from thighs to a waist.

The foot outlets 51, 52, 53 in the tip end portion of the foot duct 50 are arranged near the feet of the occupants in the vehicle compartment for blowing the air-conditioning wind toward the feet of the occupants. The foot outlets 51, 52, 53 include a driver seat foot outlet 51 provided near a foot portion of the driver seat, a passenger seat foot outlet 52 provided near a foot portion of the passenger seat, and a backseat foot outlet 53 provided near a foot portion of the backseat.

More specifically, the foot duct 50 branches into three passages 54, 55, 56 at a branch point 57 downstream of the connection between the foot duct 50 and the foot opening section 26 with respect to the airflow direction. The passage 54 connects to the driver seat foot outlet 51. The passage 55 connects to the passenger seat foot outlet 52. The passage 56 connects to the backseat foot outlet 53. A single seat concentration switching door 57a is provided in the branch point 57 of the passages 54, 55, 56. The single seat concentration switching door 57a is capable of switching between a position for closing the passages 55, 56 connecting to the foot outlets 52, 53 on the passenger seat side and the backseat side other than the driver seat side and a position for opening all the three passages 54, 55, 56.

The foot duct 50 has a passage 58 that branches from the passage 54 connecting to the driver seat foot outlet 51 and that connects to the above-the-knee outlet 90. An above-the-knees single seat concentration switching door 58a for opening and closing the passage 58 is provided in the passage 58 connecting to the above-the-knee outlet 90. The single seat concentration switching door 58a switches between permission and prohibition of the blowing of the air-conditioning wind from the above-the-knee outlet 90.

Outlet modes explained below are executed with the above-mentioned defroster door 24a, the face door 47a and the foot door 26a. The outlet modes include a face mode, a bi-level mode, a foot mode and the like as before. In the face mode, the air is blown from the center face outlets 41, 42 on both of the driver seat side and the passenger seat side toward the upper bodies of the occupants in the vehicle compartment. In the bi-level mode, the air is blown from the center face outlets 41, 42 and the foot outlets 51-53 toward the upper bodies and the feet of the occupants in the vehicle compartment. In the foot mode, the air is blown mainly from the foot outlets 51-53 by fully opening the foot opening section 26 and by opening the defroster opening section 24 by a small opening degree. In all the outlet modes except for a single seat concentration mode explained later, the air-conditioning wind is blown from the side face outlets 43, 44 on the driver seat side and the passenger seat side.

The defroster door 24a, the face door 47a and the foot door 26a constitute an outlet mode switching section that switches the outlet mode. For example, the defroster door 24a, the face door 47a and the foot door 26a are linked with an electric actuator 73, which is used for driving the outlet mode doors, via a link mechanism (not shown) and rotated and operated in conjunction with each other. An operation of the electric actuator 73 is controlled by a control signal outputted from the air-conditioning controller 60. Alternatively, the respective outlet mode doors may be operated with separate electric actuators.

In the present embodiment, the single seat concentration mode can be executed during the foot mode by closing the passages connecting to the foot outlets 52, 53 on the passenger seat side and the backseat side other than the driver seat side with the single seat concentration switching door 57a for the feet. Thus, in the single concentration mode, the air-conditioning wind is blown only from the foot outlet 51 on the driver seat side among the all foot outlets 51-53. The single seat concentration switching door 46a for the side face closes the air passageway during the single seat concentration mode such that the air-conditioning wind is blown only from the side face outlet 43 on the driver seat side among the side face outlets. In addition, the single seat concentration switching door 58a for the above-the-knee space opens the air passageway to blow the air-conditioning wind also from the above-the-knee outlet 90.

In this way, the single seat concentration switching door 57a for the feet, the single seat concentration switching door 46a for the face and the single seat concentration switching door 58a for the above-the-knee space constitute a single seat concentration mode switching section that switches the outlet mode to the single seat concentration mode. The single seat concentration switching doors 57a, 46a, 58a are linked with an electric actuator 74, which is used for driving the single seat concentration switching doors, via a link mechanism (not shown) and rotated and operated in conjunction with each other. An operation of the electric actuator 74 is controlled by a control signal outputted from the air-conditioning controller 60. Alternatively, the respective single seat concentration switching doors may be operated with separate electric actuators.

Figure 23:
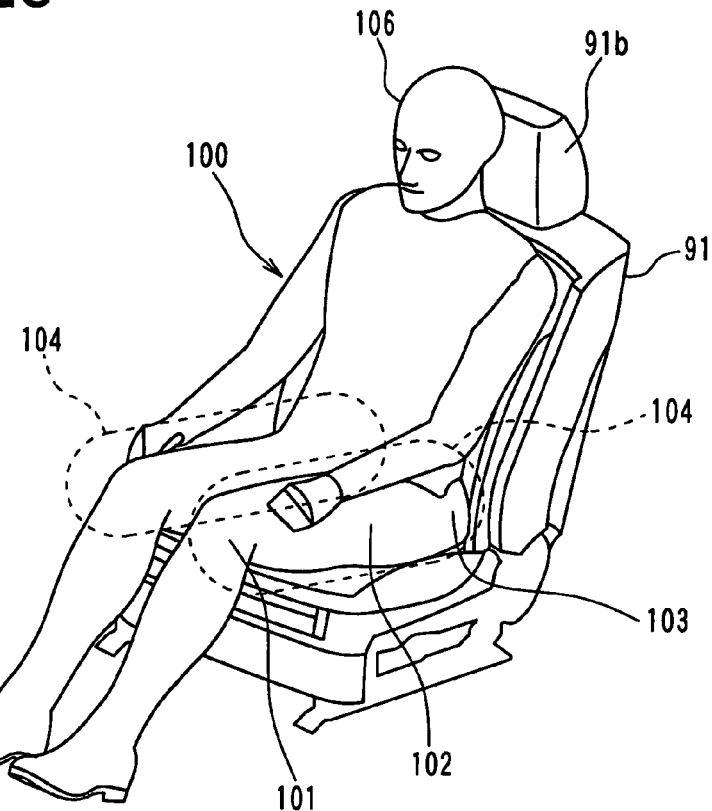
FIG. 23 is a perspective view showing portions of an occupant warmed by warm air blown from an above-the-knee outlet according to the eleventh embodiment.
Figure 24:
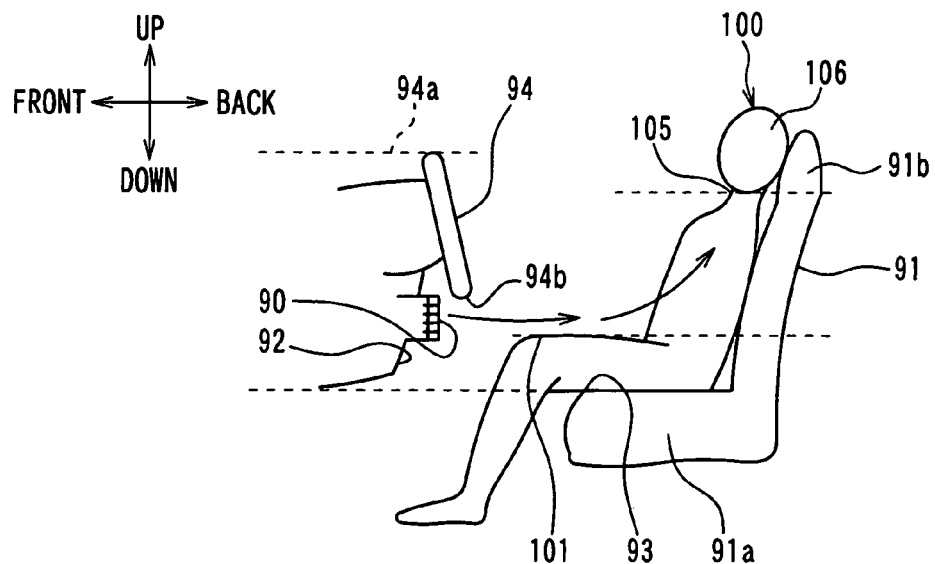
FIG. 24 is a side view of a driver seat showing a position of the above-the-knee outlet according to the eleventh embodiment.
Figure 25A:
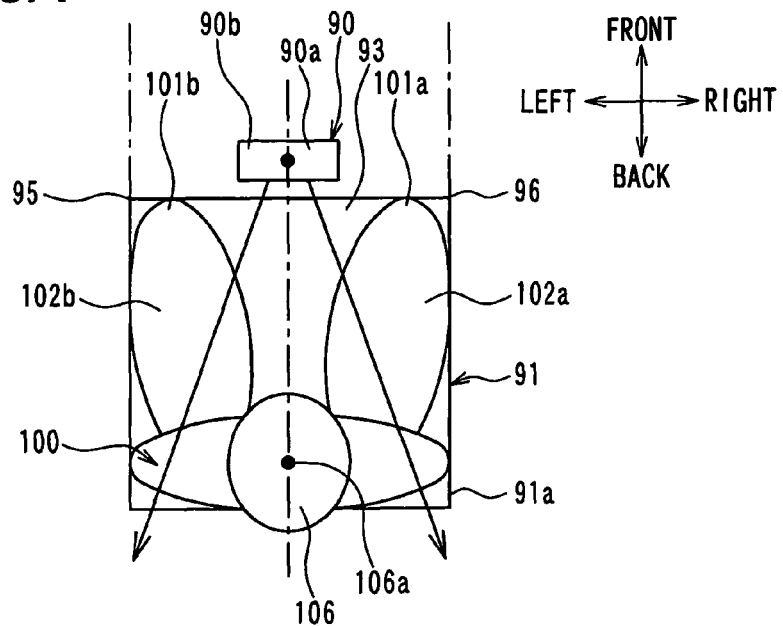
FIGS. 25A and 25B are top views of the driver seat each showing the position of the above-the-knee outlet according to the eleventh embodiment.
Figure 25B:
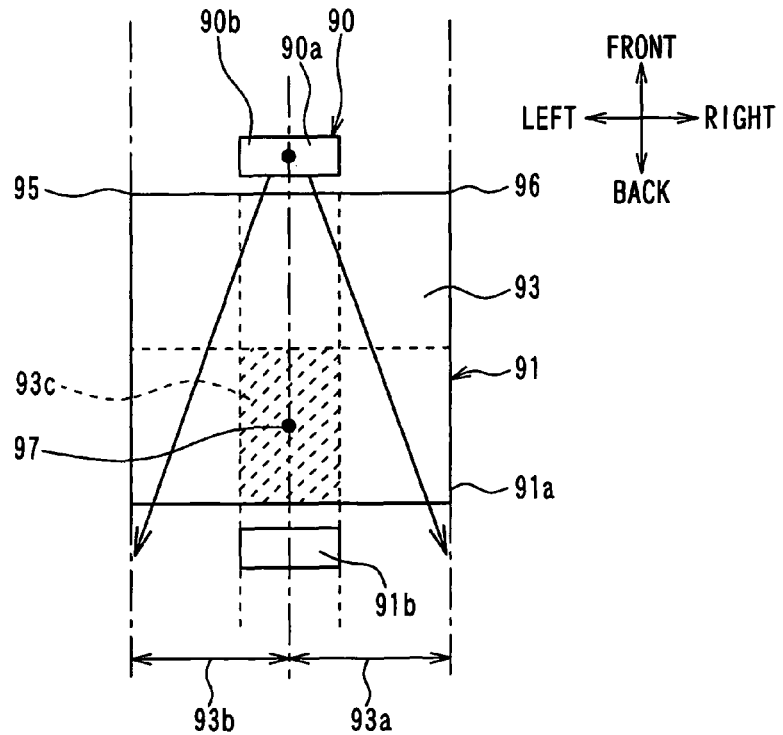

Next, the above-the-knee outlet 90 will be explained in detail. FIG. 23 shows portions of the occupant warmed by the warm air blown from the above-the-knee outlet 90. FIG. 24 is a side view showing the driver seat. FIGS. 25A and 25B are top views each showing the driver seat from the upper side of the vehicle. Arrow marks extending from the above-the-knee outlet 90 indicate mainstream directions of the blown wind from the above-the-knee outlet 90.

As shown in FIG. 23, the above-the-knee outlet 90 is used for warming the knees 101, the thighs 102 and the waist 103 of the occupant 100 seated in the driver seat 91. That is, the above-the-knee outlet 90 is used for warming the lower body 104 of the occupant 100 extending from the thighs 102 to the waist 103.

Therefore, as shown in FIG. 24, the above-the-knee outlet 90 is provided in a dashboard 92 located ahead of the driver seat 91. In the up-and-down direction of the vehicle, the above-the-knee outlet 90 is arranged at height between a seat surface 93 of the driver seat 91 and a steering wheel 94 such that the above-the-knee outlet 90 is higher than the knees 101 of the occupant 100. The height of the seat surface 93 means the height of the uppermost surface of a seat portion 91a of the seat 91. If the seat surface 93 is inclined, the height of the seat surface 93 is height of the seat surface 93 at the front end in the front-back direction of the vehicle.

The above-the-knee outlet 90 is configured to blow the warm air in a direction inclined downward from the horizontal direction such that the warm air flows over the thighs of the occupant while stroking the thighs. Alternatively, the warm air may be blown in the horizontal direction from the above-the-knee outlet 90 as long as the warm air can flow over the thighs. However, the flow of the warm air toward the height of the face can be inhibited by blowing the warm air downward instead of blowing the air in the horizontal direction from the above-the-knee outlet 90.

The position of the above-the-knee outlet 90 in the up-and-down direction of the vehicle is not limited to the position shown in FIG. 24. The position of the above-the-knee outlet 90 should be preferably lower than a position of an upper end 94a of the steering wheel 94 and a position of the shoulder 105 of the occupant. It is further preferable that the position of the above-the-knee outlet 90 is lower than a lower end 94b of the steering wheel 94. It is because the occupant's sensation of warmth lowers if the above-the-knee outlet 90 separates from the lower body 104 of the occupant. Normally, the height of the face outlet corresponds to the standard height of the position of the shoulder 105 of the occupant.

As shown in FIG. 25A, the above-the-knee outlet 90 is located between right and left ends 95, 96 of the seat 91 in the transverse direction of the vehicle. In FIG. 25A, the above-the-knee outlet 90 is arranged at the position coinciding with the lateral center position of the seat 91. That is, the above-the-knee outlet 90 is arranged right in front of the occupant 100.

A wind direction of the above-the-knee outlet 90 is set to blow the warm air in a V-shape to prevent a mainstream of the blown air from hitting the face of the occupant 100. The V-shape means that the directions of the two mainstreams define a certain angle therebetween.

More specifically, the above-the-knee outlet 90 has a right side outlet section 90a as a right half thereof and a left side outlet section 90b as a left half thereof. As shown in FIG. 25A, the mainstream of the air blown from the right side outlet section 90a passes above the occupant's right thigh 102a and passes by the right side of the occupant's head 106. The mainstream of the air blown from the left side outlet section 90b passes above the occupant's left thigh 102b and passes by the left side of the occupant's head 106.

Thus, according to the present embodiment, the warm air flows through a wide area above the right and left thighs 102a, 102b of the occupant. Thus, the flow of the warm air enveloping the lower body 104 of the occupant extending from the thighs 102 to the waist 103 can be formed. Accordingly, the heating enveloping the lower body 104 of the occupant can be performed.

In addition, the mainstreams of the warm air blown from the above-the-knee outlet 90 flow through the spaces on the right side and the left side of the head 106 of the occupant when seen from the upper side of the vehicle to avoid the head 106. Therefore, as compared to the case where the mainstream of the warm air flows toward the occupant's head 106, the flow of the warm air heading to the occupant's face can be reduced, and the flushing in the occupant's face can be inhibited.

Furthermore, the present embodiment can solve following problems.

If the outlet is provided on only one side (i.e., right side or left side) of the occupant and the warm air is blown toward the occupant in the transverse direction as in Patent document 3, there occurs a problem of large difference in the occupant' sensation of warmth in the lower body of the occupant between the right side and the left side. That is, if the warm air is blown from only one side (i.e., right side or left side) of the occupant toward the lower body of the occupant extending from the thighs to the waist, there occurs a problem that the occupant senses the warmth on the side of the lower body closer to the outlet but senses chill on the other side farther from the outlet.

As contrasted thereto, according to the present embodiment, the above-the-knee outlet 90 is provided right in front of the driver seat 91, and the warm air is blown in the V-shape toward the occupant. Therefore, the distances between the above-the-knee outlet 90 and the right and left sides of the occupant are substantially equal to each other. As a result, the occupant can have the sensation of similar warmth on both of the right side portion and the left side portion of the lower body of the occupant.

FIG. 25B shows only the seat surface 93 of the seat 91 by omitting the occupant. As understood by comparing FIGS. 25A and 25B, the right thigh 102a is located on a right half region 93a of the seat surface 93, and the left thigh 102b is located on a left half region 93b of the seat surface 93. A position of a headrest 91b of the seat 91 corresponds to the position of the head (face) of the occupant when seen from the front side of the vehicle.

Therefore, the direction of the warm air blown from the above-the-knee outlet 90 can be described also as follows. That is, the mainstream of the air blown from the right side outlet section 90a flows above the right half region 93a of the seat surface 93 and passes by the right side of the headrest 91b. The mainstream of the air blown from the left side outlet section 90b flows above the left half region 93b of the seat surface 93 and passes by the left side of the headrest 91b.

Broken lines in FIG. 25B partition the seat surface 93 into a front half region and a back half region in the front-back direction and partition the seat surface 93 into three equal portions of a central portion, a right side portion and a left side portion in the transverse direction. In this case, the standard position of the head 106 with respect to the seat surface 93 at the time when the occupant 100 is seated in the driver seat 91 exists in the central portion 93c of the transverse direction in the back half region of the seat surface 93.

Therefore, the direction of the warm air blown from the above-the-knee outlet 90 can be described also as follows. That is, the mainstream of the air blown from the right side outlet section 90a is directed to flow above the right half region 93a of the seat surface 93 excluding the laterally central portion 93c of the back half region of the seat surface 93. The mainstream of the air blown from the left side outlet section 90b is directed to flow above the left half region 93b of the seat surface 93 excluding the laterally central portion 93c of the back half region of the seat surface 93.

As shown in FIG. 25B, a center position 97 of the back half region of the seat surface 93 is close to the standard head center position 106a. Therefore, the direction of the warm air blown from the above-the-knee outlet 90 can be described also as follows. That is, when a virtual line is drawn as shown by a chained line in FIG. 25B to connect the lateral center position of the above-the-knee outlet 90 and the center position 97 of the back half region of the seat surface 93, the mainstream of the air blown from the right side outlet section 90a is directed to flow above the right side region of the seat surface 93 on the right side of the virtual line and the mainstream of the air blown from the left side outlet section 90b is directed to flow above the left side region of the seat surface 93 on the left side of the virtual line.

The head of the occupant is located in the lateral center of the seat 01 when seen from the front side of the vehicle. Therefore, as for the directions of the warm air blown from the above-the-knee outlet 90, the mainstream of the air blown from the right side outlet section 90a is directed to flow through the space on the right side of the lateral center of the seat 91, and the mainstream of the air blown from the left side outlet section 90b is directed to flow through the space on the left side of the lateral center of the seat 91. The seat 91 means the seat section 91a, the backrest or the entire seat 91.

Figure 26:
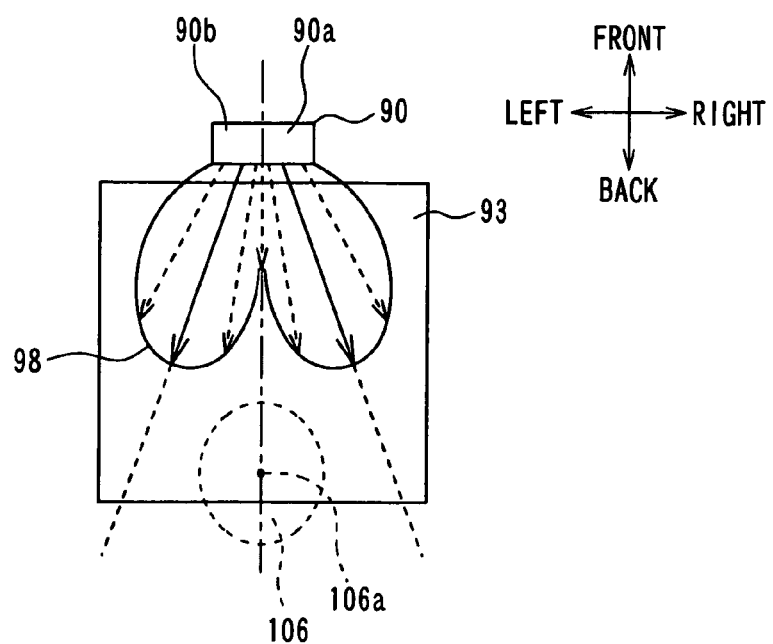
FIG. 26 is a diagram showing a wind speed distribution of the air blown from the above-the-knee outlet according to the eleventh embodiment.

Next, the mainstream of the blown air will be explained. FIG. 26 shows a wind speed distribution of the blown air from the above-the-knee outlet 90. The above-the-knee outlet 90 according to the present embodiment is configured to blow the warm air such that the wind speed distribution 98 shown in FIG. 26 is formed.

The above-mentioned mainstream of the blown air means the direction of the wind having higher wind speed than the other airstreams. Therefore, the mainstream of the air blown from the right side outlet section 90a is shown by a solid arrow mark in FIG. 26 and is the airstream having the highest wind speed among the airstreams blown from the right side outlet section 90a. The mainstream of the air blown from the left side outlet section 90b is shown by another solid arrow mark in FIG. 26 and is the airstream having the highest wind speed among the airstreams blown from the left side outlet section 90b.

Since the blown air disperses as shown in the wind speed distribution 98 of FIG. 26, there is also the airstream that heads from the above-the-knee outlet 90 to the position of the head 106 of the occupant. Under such the situation, the wind speed distribution 98 of the blown air from the above-the-knee outlet 90 according to the present embodiment may be configured such that the wind speed in the direction from the above-the-knee outlet 90 toward the position of the head 106 of the occupant is lower than the wind speeds in the directions from the above-the-knee outlet 90 toward the position on the right side and the position on the left side of the position of the head 106.

In this way, the wind speeds in the directions toward the position on the right side and the position on the left side of the position of the head 106 are the highest and the wind speed of the warm air heading toward the position of the head 106 is relatively low among all the directions of the blown air. Accordingly, as compared to the case where the mainstream of the warm air flows from the outlet toward the head 106 of the occupant, the flow of the warm air heading to the face of the occupant's face can be reduced, and the flushing in the face of the occupant can be inhibited.

Figure 27:
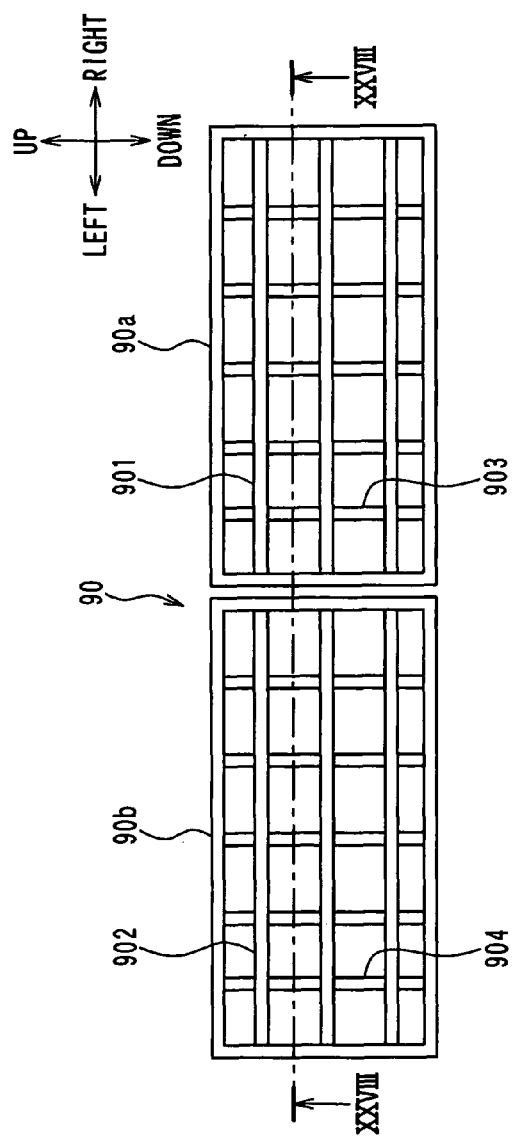
FIG. 27 is a front view showing the above-the-knee outlet according to the eleventh embodiment.
Figure 28:
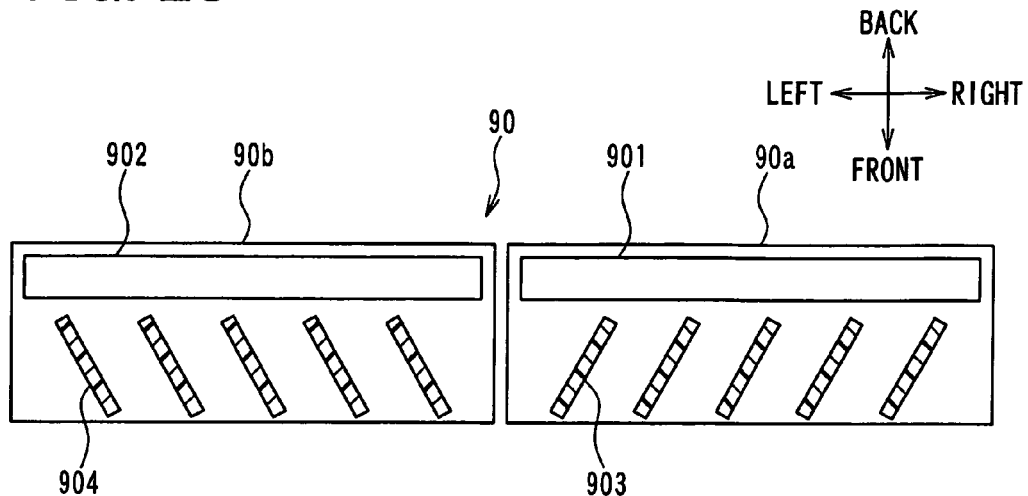
FIG. 28 is a cross-sectional view showing the above-the-knee outlet of FIG. 27 in the direction of arrow marks XXVIII.

Next, concrete constructions of the above-the-knee outlet 90 will be explained in detail. FIG. 27 is a front view showing the above-the-knee outlet 90. FIG. 28 is a cross-sectional diagram showing the above-the-knee outlet 90 of FIG. 27 in the direction of the arrow marks XXVIII.

As shown in FIG. 27, the right side outlet section 90a and the left side outlet section 90b of the above-the-knee outlet 90 are provided as separate outlets in the dashboard and are arranged adjacently to each other. The right side outlet section 90a and the left side outlet section 90b are located in the tip end portion of the single duct. The right side outlet section 90a and the left side outlet section 90b have louvers directed differently from each other, whereby the mainstreams of the right side outlet section 90a and the left side outlet section 90b are blown in directions different from each other. The single duct defines the passage 58 that branches from the passage 54 connecting to the foot outlet 51 on the driver seat side and that connects to the over-the-knee outlet 90 shown in FIG. 22.

The right side outlet section 90a has a first louver 901 that defines an up-and-down wind direction and a second louver 903 that defines a horizontal wind direction as wind direction defining members. The left side outlet section 90b has a first louver 902 that defines an up-and-down wind direction and a second louver 904 that defines a horizontal wind direction as wind direction defining members.

Each of the first louvers 901, 902 is constituted by straightening plates that extend horizontally and that are arrayed to be adjacent to each other in the up-and-down direction. Plate surfaces of the straightening plates are inclined downward in parallel with each other such that the wind direction is inclined downward from the horizontal direction.

Each of the second louvers 903, 904 is constituted by straightening plates that extend in the up-and-down direction and that are arrayed to be adjacent to each other in the lateral direction. As shown in FIG. 28, in the right side outlet section 90a, the plate surfaces of the straightening plates are inclined from the backward direction of the vehicle toward the right side in parallel to each other such that the wind direction is inclined from the backward direction of the vehicle toward the right side. In the left side outlet section 90b, the plate surfaces of the straightening plates are inclined from the backward direction of the vehicle toward the left side in parallel with each other such that the wind direction is inclined from the backward direction of the vehicle toward the left side.

The first and second louvers 901-904 may be fixed or may be configured to enable fine adjustment of angles. The positions of the upper surfaces of the thighs and the faces of the occupants vary because of difference in the body size and preferences of the occupants about the wind direction varies among the occupants. Therefore, it is preferable that the angles of the first and second louvers 901-904 can be adjusted finely by the occupant. In order to blow the air-conditioning wind toward the thighs, the directions of the first louvers 901, 902 may be interlocked with tilt of the steering wheel such that the plate surfaces of the first louvers 901, 902 are inclined downward when the position of the steering wheel is changed to a higher position.

The above-the-knee outlet 90 having the above-mentioned construction may be constructed integrally with the duct or may be constructed to be attachable to and detachable from the duct.

Next, an electric control section according to the present embodiment will be explained based on FIG. 2. The air-conditioning controller 60 consists of a microcomputer having CPU, ROM, RAM and the like and peripheral circuitries. The air-conditioning controller 60 performs various calculations and processing based on an air-conditioning control program stored in the ROM. Thus, the air-conditioning controller 60 controls the operations of the blower 12, the various electric actuators 71, 72, 73, 74 and the like connected to an output side thereof.

An input side of the air-conditioning controller 60 receives sensing signals from sensors such as an inside air sensor 61 for sensing temperature Tr in the vehicle compartment, an outside air sensor 62 (ambient temperature sensing section) for sensing ambient temperature Tam, an insolation sensor 63 for sensing an insolation amount Ts in the vehicle compartment, an evaporator temperature sensor 64 (evaporator temperature sensing section) for sensing evaporator blown air temperature TE (evaporator temperature) that is the temperature of the air discharged from the evaporator 13, and a coolant temperature sensor 65 for sensing engine coolant temperature TVV.

Further, the input side of the air-conditioning controller 60 receives manipulation signals from various air-conditioning manipulation switches provided in a manipulation panel 70 arranged near an instrument panel in the front portion of the vehicle compartment. The various air-conditioning manipulation switches provided in the manipulation panel 70 include an operation switch (not shown) of the vehicular air conditioner 1, an air-conditioning switch 70a for switching between ON and OFF of the air conditioner, an automatic control switch 70b for setting and canceling automatic control of the vehicular air conditioner 1, a changing-over switch (not shown) of an operation mode, a suction port mode switch (not shown) for switching the suction port mode, an outlet mode switch (not shown) for switching the outlet mode, an air volume setting switch (not shown) of the blower 12, a vehicle compartment inside temperature setting switch 70c for setting the temperature in the vehicle compartment, an economy switch 70d for outputting a command for prioritizing power saving of the refrigeration cycle, and the like.

Furthermore, the air-conditioning controller 60 is electrically connected with an engine controller 80 that controls the operation of the engine. The air-conditioning controller 60 and the engine controller 80 are connected to each other to be able to perform electric communication therebetween. Thus, based on the sensing signal or the manipulation signal inputted to one of the two controllers 60, 80, the other one of the two controllers 60, 80 can control the operations of the various devices connected to the output side. For example, the air-conditioning controller 60 can operate the engine by outputting the operation request signal of the engine to the engine controller 80.

Next, an operation of the above-described construction according to the present embodiment will be explained based on FIG. 3. FIG. 3 is a flowchart showing control processing of the air-conditioning controller 60.

First, in S1 (S means "Step"), initialization of flags, timers and the like, initial positioning of stepping motors constituting the above-described electric actuators and the like are performed.

In following S2, the manipulation signals of the manipulation panel 70, the signals of the vehicle environment conditions used for the air-conditioning control (i.e., above-mentioned sensing signals of sensors 61-65) and the like are read. Then, the process proceeds to S3. Concrete manipulations signals include a vehicle compartment inside set temperature Tset set with the vehicle compartment inside temperature setting switch 70c, a selection signal of the outlet mode, a selection signal of the suction port mode, a setting signal of the air volume of the blower 12 and the like.

In S3, target blown air temperature TAO of the air blown into the vehicle compartment is calculated. The target blown air temperature TAO is calculated based on the set temperature and environmental heat loads such as the temperature inside the vehicle compartment as shown by following formula.

$$TAO = Kset \times Tset - Kr \times Tr - Kam \times Tam - Ks \times Ts + C$$

In the above formula, Tset represents the vehicle compartment inside set temperature set with the vehicle compartment inside temperature setting switch 70c. Tr is the temperature in the vehicle compartment (inside temperature) sensed with the inside air sensor 61. Tam is the ambient temperature sensed with the outside air sensor 62. Ts is the insolation amount sensed with the insolation sensor 63. Kset, Kr, Kam, Ks are control gains. C is a constant for correction.

In following S4, the control target values of the various devices connected to the air-conditioning controller 60 such as the air blowing amount of the blower 12 (i.e., blower level), the suction port mode, the outlet mode, the opening degree of the air mixing door, existence/nonexistence of request for the engine operation and the like are decided. As for the existence/nonexistence of the request for the engine operation, it is decided to request the engine operation when the coolant temperature TW is lower than reference temperature.

Figure 29:
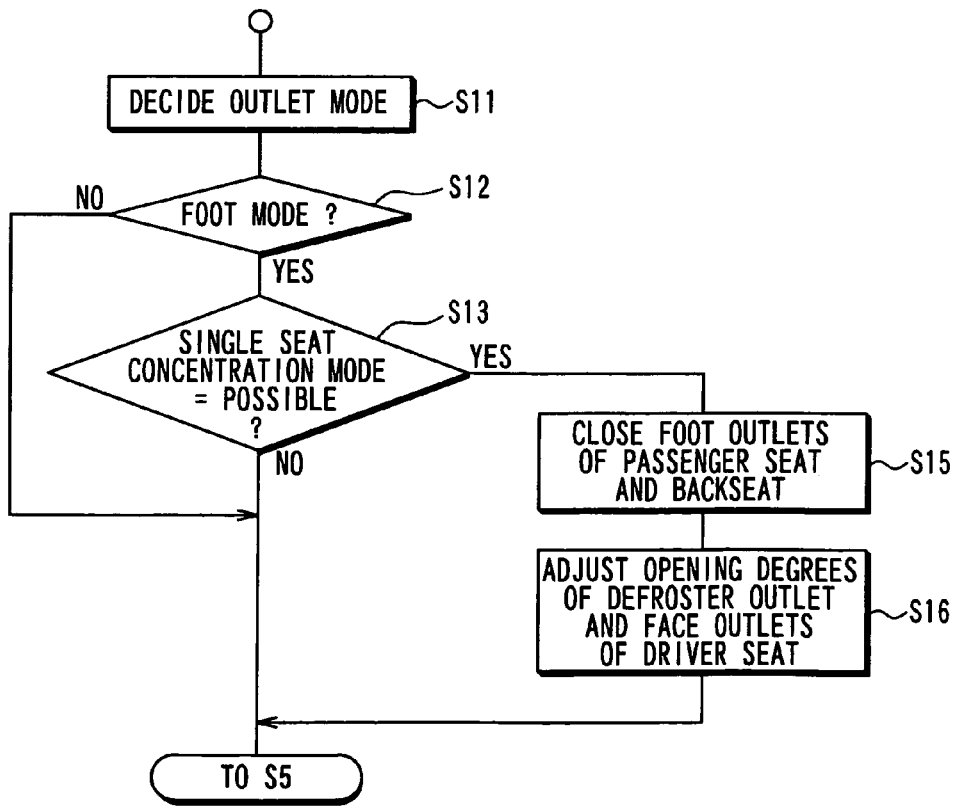
FIG. 29 is a flowchart for explaining details of S4 of FIG. 3.

FIG. 29 is a flowchart showing details of S4. FIG. 29 shows only steps for deciding the outlet mode among the control target values of the various devices. Next, the processing for deciding the outlet mode will be explained.

For example, the outlet mode is decided based on the target blown air temperature TAO in S11. In the present embodiment, a face mode, a foot mode or the like is decided as the outlet mode as before. In S11, the position of the single seat concentration switching door 57a for the feet is set to a normal position for opening the passages connecting to all the foot outlets 51, 52, 53 on the driver seat side, the passenger seat side and the backseat side. The other single seat concentration switching doors 46a, 49a and the air volume adjusting door 45a are positioned to opening positions for opening the passages. The single seat concentration switching door 58a for the above-the-knee space is positioned to a position for closing the passage.

In following S12, it is determined whether the outlet mode is the foot mode. The outlet mode is set at the foot mode in S11 during winter, in which the ambient temperature is low. Therefore, in this case, determination result in S12 is "YES" and the process proceeds to S13. When the outlet mode is not the foot mode, the determination result of S12 is "NO" and the process proceeds to S5.

In S13, it is determined whether the single seat concentration mode can be executed. In the present example, it is determined whether there is no occupant in the seats other than the driver seat. It can be determined whether there is no occupant in the seats other than the driver seat by using an occupant absence detection device described in JP-A-2000-142081 and the like. For example, a sitting sensor, an IR sensor, a sensor for sensing whether a seatbelt is fastened or the like can be used as the occupant absence detection device.

When it is determined that there is an occupant in the seat other than the driver seat from the detection result of the occupant absence detection device (i.e., when S13: NO), the process proceeds to S5.

In S5 of FIG. 3, the control signals are outputted to the various devices connected to the air-conditioning controller 60 and the engine controller 80 to obtain the control target values decided in S4. Thus, the single seat concentration switching door 57a for the feet is positioned to the normal position when the outlet mode is not the foot mode or when the single seat concentration mode cannot be executed even during the foot mode. The other single seat concentration switching doors 46a, 49a are positioned to the opening positions. The blowing mode switching doors 26a, 47a operate to realize the decided outlet mode.

When it is determined that there is no occupant in the seats other than the driver seat in S13 of FIG. 29 (i.e., when S13:

YES), the process proceeds to S15. In S15, the mode is decided on the single seat concentration mode for closing the foot outlets 52, 53 on the passenger seat side and the backseat side.

FIG. 30 shows the blowing positions during the foot mode in the case of the single seat concentration mode and the normal mode (four-seat air conditioning). In the normal foot mode (four-seat air conditioning), the single seat concentration switching door 57a for the feet is positioned at the normal position. In FIG. 30, "YES" means that the air-conditioning wind is blown from the corresponding outlet, and "NO" means that the air-conditioning wind is not blown from the corresponding outlet. As shown in FIG. 30, in the normal foot mode (four-seat air conditioning), the air-conditioning wind is blown from the foot outlets 51-53 on the driver seat side, the passenger seat side and the backseat side, and the blowing of the air-conditioning wind from the above-the-knee outlet 90 is prohibited. At that time, the air-conditioning wind is blown only from the side face outlets 43, 44 on the driver seat side and the passenger seat side among the face outlets 41-44, and the air-conditioning wind is blown also from the defroster outlet.

As contrasted thereto, in the single seat concentration mode, the setting is changed to prohibit the blowing of the air-conditioning wind from the foot outlets 52, 53 on the passenger seat side and the backseat side and from the side face outlet 44 on the passenger seat side. The setting is changed to blow the warm air from the above-the-knee outlet 90 and the center face outlet 41 on the driver seat side. The air-conditioning wind is blown from the center face outlet 41 on the driver seat side in order to prevent sensation of coldness in the shoulder of the occupant on the center side of the vehicle.

Therefore, in S15, the single seat concentration switching door 57a for the feet in the foot duct 50 is positioned to the position for closing the passages 55, 56 connecting to the foot outlets 52, 53 on the passenger seat side and the backseat side other than the driver seat side. In addition, the single seat concentration switching door 46a for the side face is positioned to a position for closing the passage. The single seat concentration switching door 58a for the above-the-knee space is positioned to a position for opening the passage. Furthermore, the face door 47a is positioned to a position for opening the passage, and the single seat concentration switching door 49a for the center face on the passenger seat side is positioned to a position for closing the passage.

In following S16, the opening degrees of the defroster opening section 24 (i.e., defroster outlet) and the side face outlet 43 on the driver seat side are adjusted.

More specifically, the door position of the defroster door 24a is changed from the position in the case where all the foot outlets 51, 52, 53 are opened. If the opening degree of the defroster opening section 24 at the time when the foot outlets 52, 53 other than the foot outlet 51 on the driver seat side are closed is the same as the opening degree of the defroster opening section 24 at the time before the foot outlets 52, 53 are closed, the air volume of the air-conditioning wind blown from the defroster opening section 24 increases. Therefore, in order to maintain the air volume blown from the defroster opening section 24 to be equal to the air volume blown before the foot outlets 52, 53 are closed, the opening degree of the defroster opening section 24 is set smaller than the opening degree used before the foot outlets 52, 53 are closed.

In order to prevent the chill in the both shoulders of the occupant, the warm air is blown from the center face outlet 41 and the side face outlet 43 on the driver seat side. The opening degree of the air volume adjusting door 45a is decided to suppress the increase in the difference between the air volumes blown from the both outlets 41, 43.

Then, the process proceeds to S5 of FIG. 3, in which the control signals are outputted. Thus, when the mode is the foot mode and the single seat concentration mode can be executed, the outlet mode switching doors 26a, 47a, the single seat concentration switching doors 57a, 58a and the like are positioned to the predetermined positions to execute the single seat concentration mode shown in FIG. 30.

The process waits until the control cycle τ elapses in following S6. Then, the process returns to S2 when it is determined that the control cycle τ elapses.

As described above regarding S12, S13 and S15 of FIG. 29, the air-conditioning controller 60 executes the single seat concentration mode shown in FIG. 30 when there is no occupant in the seats other than the driver seat during the foot mode.

Conventionally, when the heating is performed, the outlet mode is switched to the foot mode, and the entire internal space of the vehicle compartment is heated with the warm air blown from all the foot outlets 51-53 provided in the vehicle compartment. However, if the entire vehicle compartment is warmed when the occupant is only the driver, the space in which there is no occupant is warmed, so the heat amount is consumed wastefully for the heating.

Specifically when the heat amount usable for the heating is limited as in the case where the engine of the hybrid vehicle is stopped, the heat amount of the engine coolant becomes deficient quickly if the heat amount of the engine coolant is consumed wastefully. In this case, the engine or an auxiliary electric heater has to be operated in order to maintain the heating, thereby deteriorating the fuel consumption.

Therefore, in the present embodiment, when the occupant is only the driver, the single seat concentration mode for prohibiting the blowing of the air from the foot outlets 52, 53 other than the foot outlet 51 on the driver seat side and the blowing of the air from the side face outlet 44 on the passenger seat side is performed. Thus, the waste of the heat amount can be avoided by using the heat amount of the engine coolant as the heat source only for the heating on the driver seat side.

If the single seat concentration mode is executed by merely changing the conventional foot mode such that the blowing of the air from the foot outlets 52, 53 other than the foot outlet 51 on the driver seat side and the blowing of the air from the side face outlet 44 on the passenger seat side are prohibited and such that the warm air is blown from the foot outlet 51 and the side face outlet 43 on the driver seat side, there is a possibility that driver's sensation of being warmed lowers.

Regarding this point, in the single seat concentration mode according to the present embodiment, the heating is performed by blowing the warm air from the above-the-knee outlet 90 in addition to the foot outlet 51 on the driver seat side to envelope the lower body 104 of the occupant extending from the thighs 102 to the waist 103 with the warm air. Therefore, the occupant's sensation of being warmed can be secured. Furthermore, the warm air is blown also from the center face outlet 41 and the side face outlet 43 on the driver seat side toward the both shoulders of the occupant, whereby the drivers sensation of being warmed can be secured.

Therefore, according to the present embodiment, the heat amount used for the heating can be reduced while maintaining the occupant's sensation of being warmed as compared to the case where the warm air is blown from all the foot outlets 51-53 to warm the entire vehicle compartment when the occupant is only the driver.

Thus, the heat release amount from the heater core 14 can be reduced and therefore a gradient of the decrease of the engine coolant temperature can be made gentle while the engine of the hybrid vehicle is stopped. As a result, frequency of operation of the engine or the auxiliary electric heater for maintaining the heating can be reduced, thereby suppressing the deterioration of the fuel consumption.

(Twelfth Embodiment)

Figure 31:
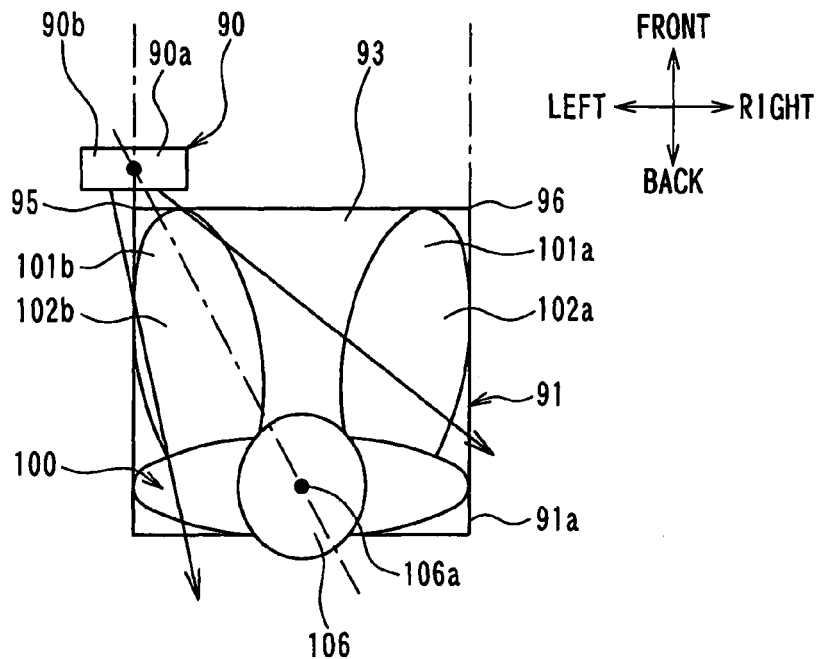
FIG. 31 is a top view of a driver seat showing a position of an above-the-knee outlet according to a twelfth embodiment of the present invention.

Next, a twelfth embodiment of the present invention will be explained. FIG. 31 is a top view of the driver seat showing a position of the above-the-knee outlet 90 according to the twelfth embodiment. As shown in FIG. 31, the above-the-knee outlet 90 is arranged in a position facing a left end portion 95 of the seat 91. Also from such the position, the warm air can be blown in a V-shape such that the warm air flows from the above-the-knee outlet 90 above the thighs of the occupant and steers around the face.

More specifically, also in the present embodiment, the mainstream of the blown air from the right side outlet section 90a passes above the right thigh 102a of the occupant and passes by the right side of the head 106 of the occupant. The mainstream of the air blown from the left side outlet section 90b passes above the occupant's left thigh 102b and passes by the left side of the occupant's head 106.

If a virtual straight line that connects the lateral center position of the above-the-knee outlet 90 and the head center position 106a is drawn as shown by a chained line in FIG. 31, the mainstream of the air blown from the right side outlet section 90a passes above the right region of the seat surface 93 on the right side of the virtual straight line. The mainstream of the blown air from the left side outlet section 90b passes above the left region of the seat surface 93 on the left side of the virtual straight line. As shown in FIG. 25B, the central position 97 of the rear half of the seat surface 93 is close to, the head center position 106a.

In this way, the position of the above-the-knee outlet 90 is not limited to the lateral center position of the seat as long as the above-the-knee outlet 90 is positioned in front of the seat 91. The above-the-knee outlet 90 may be positioned to face the left end portion 95 of the seat 91.

Since the above-the-knee outlet 90 is located in front of the seat 91 also in the present embodiment, difference between distances from the outlet to the right side and the left side of the occupant can be reduced, and difference in the occupant's sensation of warmth between the right side and the left side of the occupant can be reduced as compared to the case where the above-the-knee outlet is provided on only the right side or the left side of the seat distanced from the front of the seat to blow the warm air from the transverse direction to the occupant.

The position of the above-the-knee outlet 90 may be arbitrary as long as the position of the above-the-knee outlet 90 overlaps with the seat 91 in the front-back direction.

(Thirteenth Embodiment)

Figure 32:
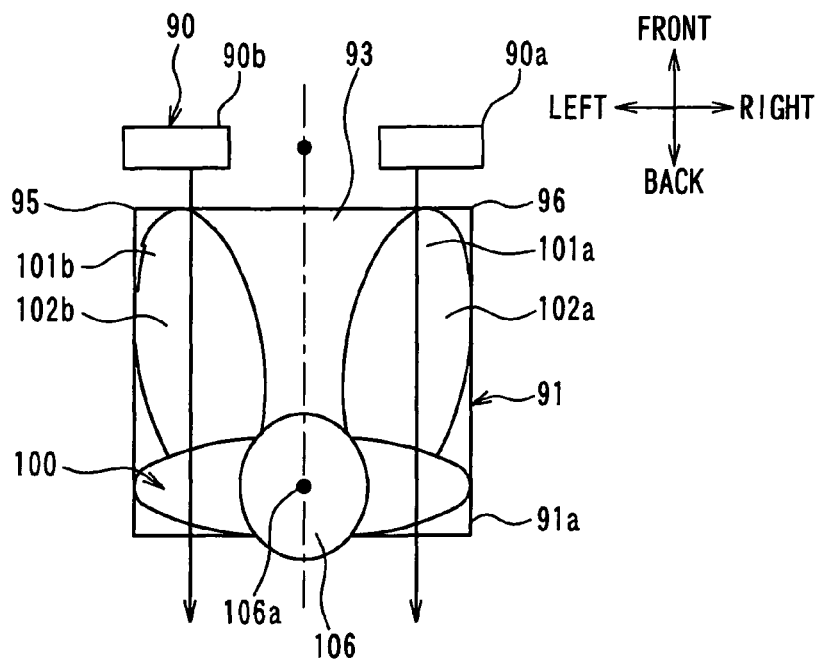
FIG. 32 is a top view of the driver seat showing a position of an above-the-knee outlet according to a thirteenth embodiment of the present invention.

Next, a thirteenth embodiment of the present invention will be explained. FIG. 32 is a top view of the driver seat showing the position of the above-the-knee outlet 90 according to the thirteenth embodiment.

In the present embodiment, as shown in FIG. 32, the right side outlet section 90a and the left side outlet section 90b of the above-the-knee outlet 90 are arranged separately from each other. The wind direction of the above-the-knee outlet 90 is set to blow the warm air toward the rear side of the vehicle such that the mainstreams from the respective outlet sections 90a, 90b are not in the V-shape but are parallel to each other.

Also in the present embodiment, the mainstream of the blown air from the right side outlet section 90a passes above the right thigh 102a of the occupant and passes by the right side of the head 106 of the occupant. The mainstream of the blown air from the left side outlet section 90b passes above the left thigh 102b of the occupant and passes by the left side of the head 106 of the occupant.

If a virtual straight line connecting the lateral center position of the entire above-the-knee outlet 90 (i.e., middle point between right side outlet section 90a and left side outlet section 90b) and the head center position 106a is drawn as shown by a chained line in FIG. 32, the mainstream of the blown air from the right side outlet section 90a passes above the right region of the seat surface 93 on the right side of the virtual straight line. The mainstream of the blown air from the left side outlet section 90b passes above the left region of the seat surface 93 on the left side of the virtual straight line. As shown in FIG. 25B, the center position 97 of the rear half of the seat surface 93 is close to the head center position 106a.

Therefore, effects similar to those of the above-described eleventh and twelfth embodiments can be exerted also with the present embodiment.

If the warm air is blown from both of the outlet sections 90a, 90b in parallel when seen from the upper side of the vehicle as in the present embodiment, a stream of warm air heading toward the face of the occupant is caused by dispersion of the blown warm air. In order to inhibit the stream of the warm air heading toward the face of the occupant, the above-the-knee outlet 90 should be preferably structured to blow the warm air in the V-shape from the both of the outlet sections 90a, 90b when seen from the upper side of the vehicle. With such the construction, the two mainstreams from the above-the-knee outlet 90 widens more as the mainstreams are distanced more from the above-the-knee outlet 90, whereby the mainstreams flow toward the outside of the occupant as shown in FIG. 25A.

In the present embodiment, the two outlet sections 90a, 90b are provided as the above-the-knee outlet 90. Alternatively, three or more outlet sections may be provided as the above-the-knee outlet 90. When three or more outlet sections are used, the middle point between the two outlet sections positioned in the both ends in the lateral direction is the lateral center position of the entire above-the-knee outlet 90.

(Fourteenth Embodiment)

Next, a fourteenth embodiment of the present invention will be explained. FIG. 5 shows an air volume map used in the air-conditioning control performed by the air-conditioning controller 60. Next, points different from the eleventh embodiment will be explained.

The air-conditioning controller 60 controls a power supplied to the blower 12, thereby controlling the target air blowing amount of the blower 12. More specifically, the air-conditioning controller 60 outputs a control signal to a drive circuit (not shown) that drives the electric motor 12b to set the electric power supplied from the drive circuit to the electric motor 12b. Thus, the air-conditioning controller 60 controls the rotation speed of the electric motor 12b. The rotation speed of the electric motor 12b increases when the power supplied to the electric motor 12b is high. The rotation speed of the electric motor 12b decreases when the power supplied to the electric motor 12b is low.

For example, when a voltage applied to the electric motor 12b is controlled (i.e., when voltage control is performed), the drive circuit applies a voltage, which corresponds to the control signal from the air-conditioning controller 60, to the electric motor 12b. When PWM control of current supplied to the electric motor 12b is performed, the drive circuit controls an average supply current of the electric motor 12b to desired intensity by setting a duty ratio of pulse width of a pulse signal, which is used for controlling ON/OFF of the electric motor 12b, according to the control signal from the air-conditioning controller 60. In this way, the air-conditioning controller 60 is configured to set the output value sent to the blower 12. That is, the air-conditioning controller 60 is configured to set the voltage value or the current value outputted from the drive circuit to the electric motor 12b of the blower 12.

When the air-conditioning controller 60 decides the target blowing amount (i.e., blower level) of the blower 12, which is one of the control target values, in S4 of the flowchart shown in FIG. 3 and explained in the description of the eleventh embodiment, the air-conditioning controller 60 decides the blower level based on the target blown air temperature TAO of the blown air blown into the vehicle compartment by using the air volume map shown in FIG. 5.

More specifically, when it is determined in S13 of FIG. 29 that the single seat concentration mode can be executed (i.e., S13: YES), a step for changing the blower level is executed in addition to S15 and S16. As shown in FIG. 5, in the single seat concentration mode, the blower level is set lower than in the case of the four-seat air conditioning, thereby lowering the target air blowing amount of the blower 12. Thus, the power consumption of the blower 12 can be reduced to achieve the energy saving of the entire vehicular air conditioner.

The single seat concentration mode according to the eleventh embodiment can secure the occupant's sensation of being warmed because of the blowing of the warm air from the above-the-knee outlet 90. Therefore, even if the air blowing amount of the blower 12 is reduced, the influence over the occupant's sensation of being warmed can be lessened.

(Modifications)

(A) The above-the-knee outlet 90 is arranged in front of the seat 91 in the above-described eleventh to fourteenth embodiments. The position of the above-the-knee outlet 90 may be changed to a different position in a range where the above-the-knee outlet 90 can blow the warm air such that one of the two mainstreams passes by way of the position of the right thigh 102a of the occupant and the position on the right side of the head 106 of the occupant and such that the other one of the two mainstreams passes by way of the position of the left thigh 102b of the occupant and the position on the left side of the head 106 of the occupant.

(B) In the eleventh embodiment, the first and second louvers 901-904 are provided inside the above-the-knee outlet 90 as shown in FIGS. 27 and 28. Alternatively, a different structure may be used as a section for defining the wind direction. For example, a guide member that has a shape extending from the above-the-knee outlet 90 to the inside of the vehicle compartment may be provide on the outside of the above-the-knee outlet 90. Alternatively, the wind direction may be defined by a direction of an inner wall surface of the duct extending to the above-the-knee outlet 90.

(C) In the eleventh embodiment, as shown in FIG. 22, the air passageway extending from the casing 11 to the above-the-knee outlet 90 is formed by branching the air passageway from the foot duct 50. Alternatively, the air passageway may be formed by a duct different from the foot duct 50. For example, an above-the-knee opening section may be provided in the casing 11 separately from the foot opening section 26, and a duct extending from the above-the-knee opening section to the above-the-knee outlet 90 may be newly provided.

In the above-described eleventh to fourteenth embodiments, the casing 11 and the ducts are separate bodies. Alternatively, the casing 11 and the ducts may be an integral body.

(D) In the eleventh embodiment, the air-conditioning controller 60 determines whether the foot mode is selected as the outlet mode in S12 of FIG. 29. Alternatively, it may be determined whether a mode for blowing the warm air from the foot outlet (e.g., foot mode or bi-level mode) is selected.

That is, when the mode for blowing the air-conditioning wind from the foot outlet is selected as the outlet mode and the single seat concentration mode can be executed, the single seat concentration switching door 58*a* for the above-the-knee space may be opened to blow the air-conditioning wind from the above-the-knee outlet 90.

(E) In the eleventh embodiment, the foot outlets on the passenger seat side and the backseat side are closed in S15 of FIG. 29 when the single seat concentration mode is possible (refer to FIG. 30). In this case, the foot outlet on the driver seat side may be closed additionally. That is, in the single seat concentration mode, the warm air may be blown from the above-the-knee outlet 90 instead of the foot outlet 51.

(F) In the eleventh embodiment, as shown in FIG. 30, the blowing of the air from the side face outlet 44 on the passenger seat side is prohibited in the single seat concentration mode. Alternatively, when there is a concern about fogging of the window, a small amount of the air may be blown from the side face outlet 44 on the passenger seat side.

For example, when the air-conditioning controller 60 detects the fogging of the window with a window fogging sensor or the like, the air-conditioning controller 60 may perform control for opening the side face outlet 44 on the passenger seat side. When there is no window fogging sensor, the side face outlet 44 may be structured such that the side face outlet 44 is not closed completely.

(G) In the eleventh embodiment, when the single seat concentration mode is executed, the single seat concentration switching door 58*a* for the above-the-knee space is opened, and the warm air is blown from the above-the-knee outlet 90. Alternatively, the single seat concentration switching door 58*a* for the above-the-knee space of the construction shown in FIG. 22 may be eliminated to simplify the construction. In this case, the modified construction invariably blows the warm air also from the above-the-knee outlet 90 when the warm air is blown from the foot outlet 51 on the driver seat side.

(H) In the above-described eleventh to fourteenth embodiments, the above-the-knee outlet 90 is provided for the driver seat. The above-the-knee outlet 90 may be provided for the seat other than the driver seat.

(I) In the above-described eleventh to fourteenth embodiments, the vehicular air conditioner according to the present invention is applied to the hybrid vehicle. Alternatively, the vehicular air conditioner according to the present invention may be applied to vehicles other than the hybrid vehicle. The vehicular air conditioner according to the present invention may be applied to an ordinary engine vehicle, an idling-stop vehicle that stops an engine automatically when the vehicle stops, an electric vehicle that uses an electric water heater as a heater, a fuel-cell vehicle or the like, for example.

(Fifteenth Embodiment)

Figure 33:
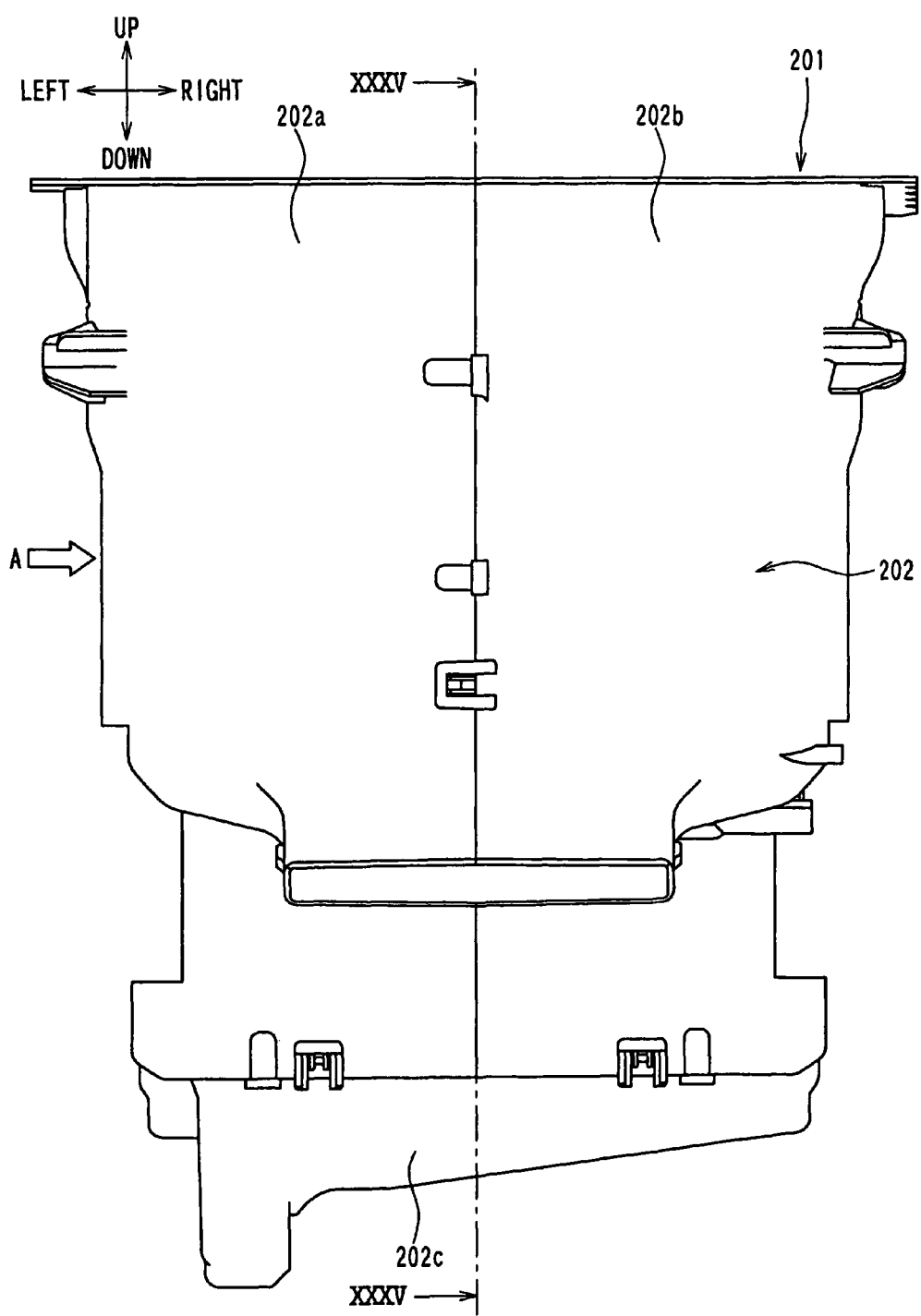
FIG. 33 is a front view showing an external appearance of an air-conditioning unit according to a fifteenth embodiment of the present invention.
Figure 34:
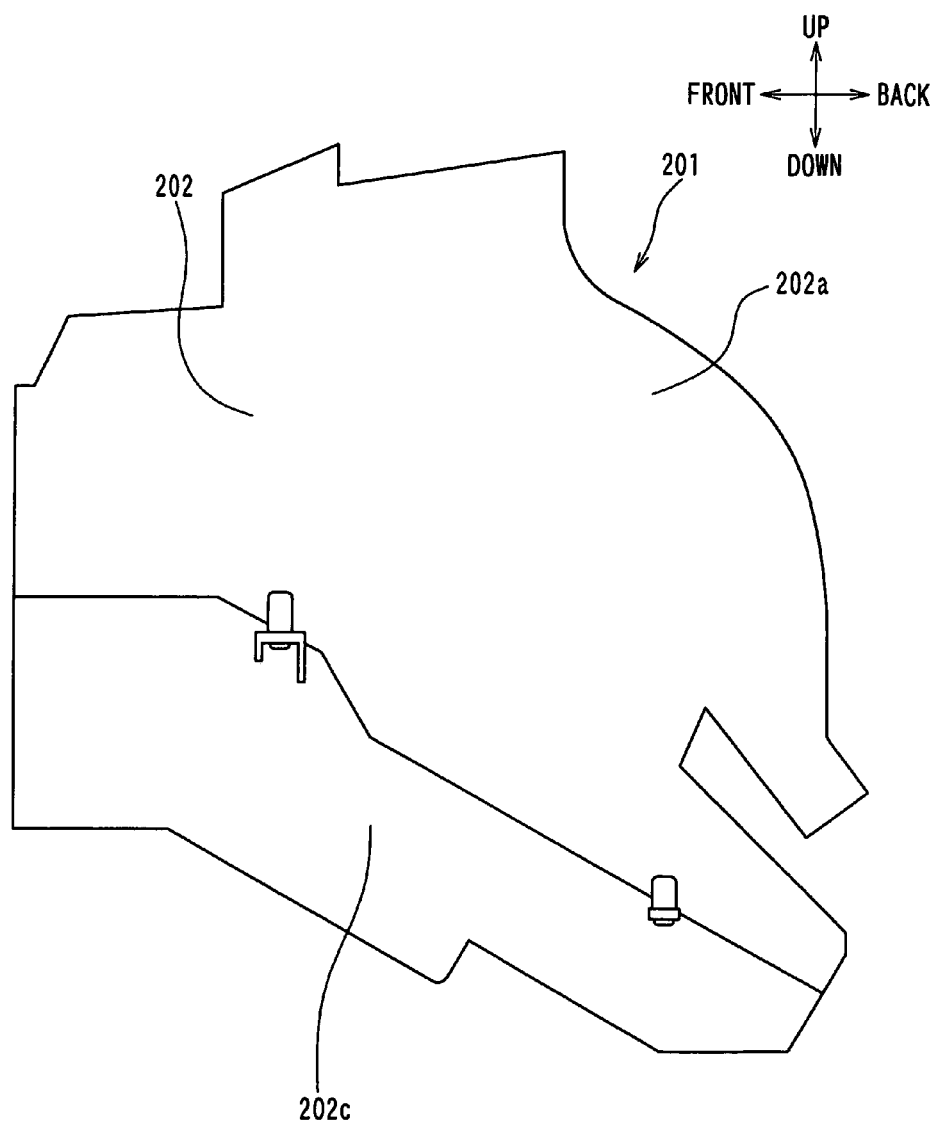
FIG. 34 is a side view showing the external appearance of the air-conditioning unit according to the fifteenth embodiment.
Figure 35:
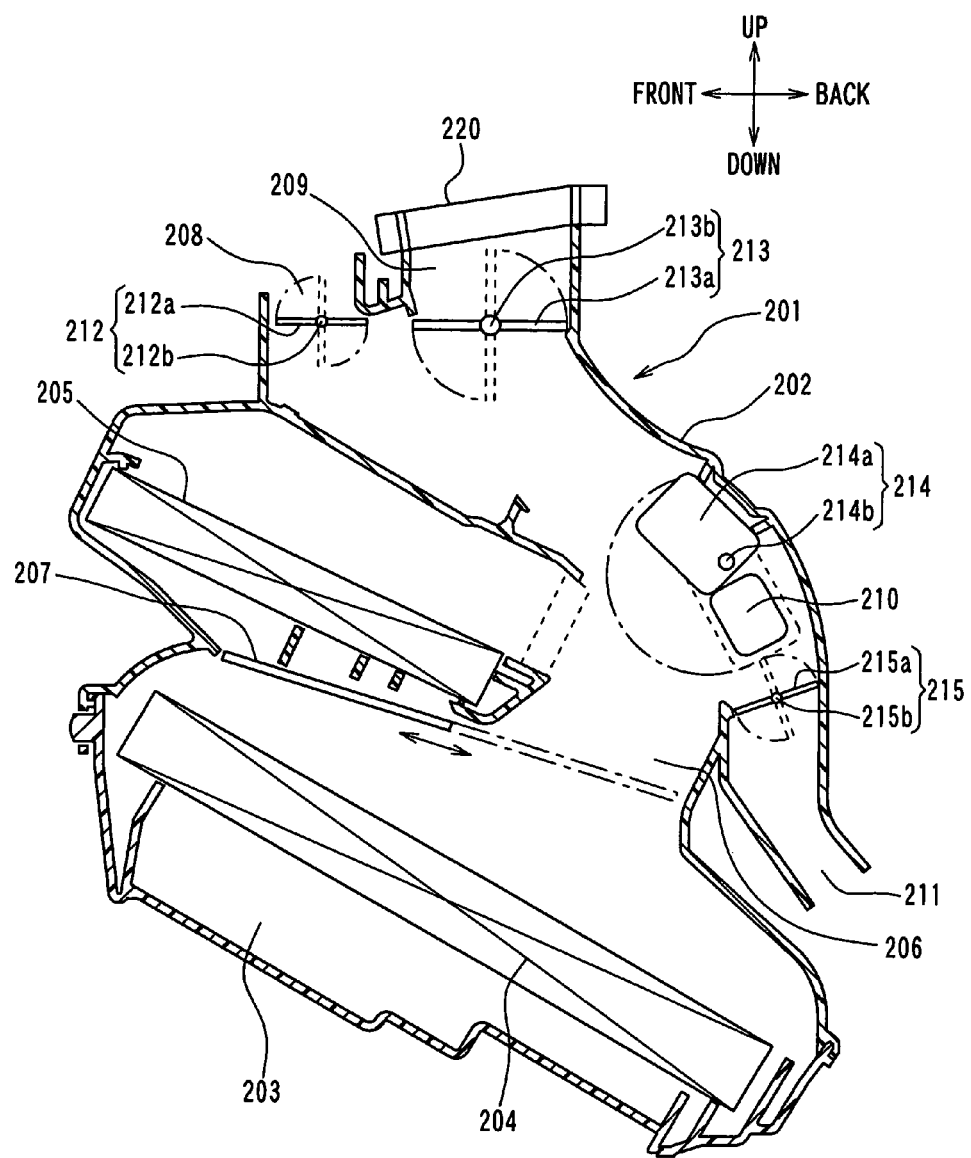
FIG. 35 is a cross-sectional view showing the air-conditioning unit of FIG. 33 taken along the line XXXV-XXXV.

Next, a fifteenth embodiment of the present invention will be described with reference to FIGS. 33 to 37. FIG. 33 is a front view showing an external appearance of an air-conditioning unit 201 according to the fifteenth embodiment. In FIG. 33, the air-conditioning unit 201 is seen from a back side of the vehicle. FIG. 34 is a side view showing the external appearance of the air-conditioning unit 201 of FIG. 33 in a direction of an arrow mark A. FIG. 35 is a cross-sectional view showing the air-conditioning unit 201 of FIG. 33 taken along the line XXXV-XXXV.

The vehicular air conditioner according to the present embodiment can be divided roughly into two units of the air-conditioning unit 201 and a blower unit (not shown). The blower unit is offset from a central portion of an inside of a dashboard in a vehicle compartment to the left side. The air-conditioning unit 201 is arranged in a substantially lateral center portion in the inside of the dashboard.

The blower unit consists of a blower case defining an outer shell of the blower unit, an inside-outside air switching box that switchably introduces inside air (air in vehicle compartment) or outside air (air outside vehicle compartment), a blower that blows the air introduced from the inside-outside air switching box and the like. The blower drives and rotates a centrifugal multi-blade fan with an electric motor to blow the air.

As shown in FIG. 33, the air-conditioning unit 201 has an air-conditioning case 202 that defines an outer shell of the air-conditioning unit 201 and that defines an air passageway of air-conditioning wind blown from the blower of the blower unit to the inside of the vehicle compartment. The air-conditioning case 202 is made of a resin (e.g., polypropylene containing talc) having a certain degree of elasticity and excellent strength.

As shown in FIGS. 33 and 34, the air-conditioning case 202 according to the present embodiment has first and second divided case members 202*a*, 202*b*, which are divided into two pieces and define an upper portion of the air-conditioning case 202, and a third divided case member 202*c* defining a lower portion of the air-conditioning case 202. The divided case members 202*a*-202*c* are joined with each other by fixing members such as metal springs, clips or screws in a state where the divided case members 202*a*-202*c* incorporate various component devices constituting the air-conditioning unit 201 inside.

Next, the various component devices arranged inside the air-conditioning case 202 of the air-conditioning unit 201 will be explained. As shown in FIG. 35, an air introduction section 203 for introducing the blown air from the blower to the inside is formed in the most upstream portion of the air-conditioning case 202 with respect to the airflow direction. The air introduction section 203 is opened in a side wall surface of the air-conditioning case 202 on a passenger seat side to connect to an air outlet section of the blower unit arranged on the passenger seat side.

An evaporator 204 is arranged downstream of the air introduction section 203 with respect to the airflow direction inside the air-conditioning case 202. The evaporator 204 is a cooling heat exchanger for cooling the air to be blown into the vehicle compartment. The evaporator 204 is one of components constituting a vapor compression refrigeration cycle (not shown). The evaporator 204 evaporates a low pressure refrigerant flowing to the inside thereof to cause an endothermic action, thereby exerting a cooling function for cooling the blown air from the blower.

A heater core 205 is arranged downstream of the evaporator 204 with respect to the airflow direction. The heater core 205 is a heating heat exchanger for reheating the air having passed through the evaporator 204 by using an engine coolant as a heat source. The evaporator 204 and the heater core 205 are supported and fixed to the inside of the air-conditioning case 202 by attachments (not shown) provided in the air-conditioning case 202.

A bypass passage 206 is formed downstream of the evaporator 204 with respect to the airflow direction and on a side of the heater core 205 in the air-conditioning case 202. The bypass passage 206 is for passing the air having passed through the evaporator 204 such that the air bypasses the heater core 205.

An air mixing door 207 is arranged between the evaporator 204 and the heater core 205. An opening degree of the air mixing door 207 is adjusted by a servomotor (not shown) or by manual operation. Thus, the air mixing door 207 adjusts an air volume ratio of the air having passed through the evaporator 204 between an air volume passing through the heater core 205 and an air volume passing through the bypass passage 206. In the present embodiment, the air mixing door 207 is provided by a sliding door configured to be able to move in a direction shown by a double-headed arrow mark in FIG. 35. The air mixing door 207 is not limited to the sliding door but can be provided by other type of door.

Warm air having passed through the heater core 205 and cold air having passed through the bypass passage 206 are mixed downstream of the heater core 205 and the bypass passage 206 and the mixed air is blown into the vehicle compartment. The temperature of the air blown into the vehicle compartment is adjusted by the above-mentioned air volume ratio. Therefore, the air mixing door 207 constitutes a temperature adjusting section that adjusts the temperature of the air blown into the vehicle compartment.

A defroster opening section 208, a face opening section 209, a foot opening section 210 and a backseat opening section 211 are formed in the most downstream portion of the air-conditioning case 202. The defroster opening section 208 is for blowing the air-conditioning wind toward a windshield of the vehicle. The face opening section 209 is for blowing the air-conditioning wind toward a face of the occupant (or upper half body of occupant). The foot opening section 210 is for blowing the air-conditioning wind toward feet of the occupant. The backseat opening section 211 is for blowing the air-conditioning wind toward the occupants in the backseat of the vehicle. Details of the face opening section 209 will be explained later.

The defroster opening section 208 is connected to a defroster outlet (not shown) through a duct member. The defroster outlet is for blowing the air-conditioning wind having the adjusted temperature toward the inner surface of the windshield. The face opening section 209 is connected to a pair of center face outlets (not shown) and a pair of side face outlets (not shown) through a duct member. The pair of center face outlets are provided in substantially the center portion of the dashboard in the vehicle compartment. The pair of side face outlets are provided on right and left sides of the dashboard. An opening degree adjusting section 220 is provided downstream of the face door 213 with respect to the airflow direction for adjusting a part of multiple opening sections 209a-209d formed in the face opening section 209 independently from each other.

The foot opening section 210 is connected to a foot outlet (not shown) arranged near the feet of the occupant through a duct member. The backseat opening section 211 is connected to a rear outlet (not shown) through a duct member. The rear outlet is for blowing the air-conditioning wind having the adjusted temperature toward the occupants in the backseat.

A defroster door 212, a face door 213, a foot door 214 and a rear door 215 for opening and closing the respective opening sections 208-211 are arranged rotatably upstream of the opening sections 208-211 with respect to the airflow direction. The doors 212-215 consist of plate-like door base plates 212a-215a, door shafts 212b-215b for rotatably supporting the door base plates 212a-215a and the like. Opening-closing operation of the doors 212-215 is performed by a common servomotor or by manual operation through a linking mechanism (not shown). The defroster door 212, the face door 213, the foot door 214 and the rear door 215 correspond to an opening section opening-closing section of the present invention.

Figure 36A:
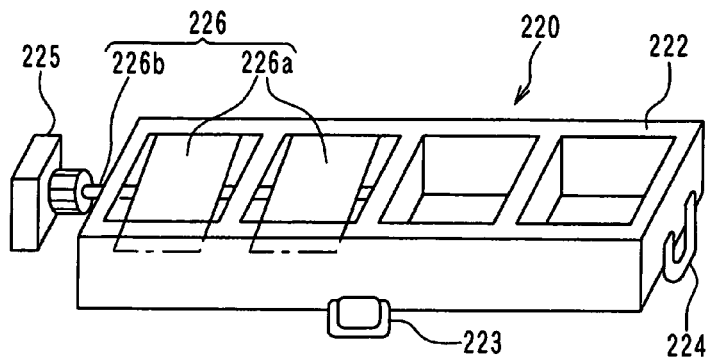
FIG. 36A is a perspective view showing an opening degree adjusting section according to the fifteenth embodiment.
Figure 36B:
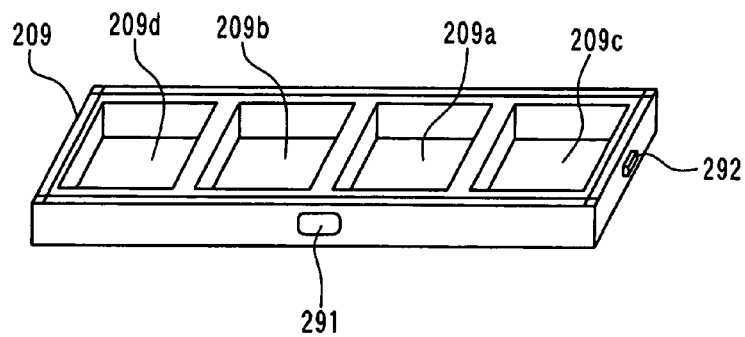
FIG. 36B is a perspective view showing a face opening section according to the fifteenth embodiment.
Figure 37:
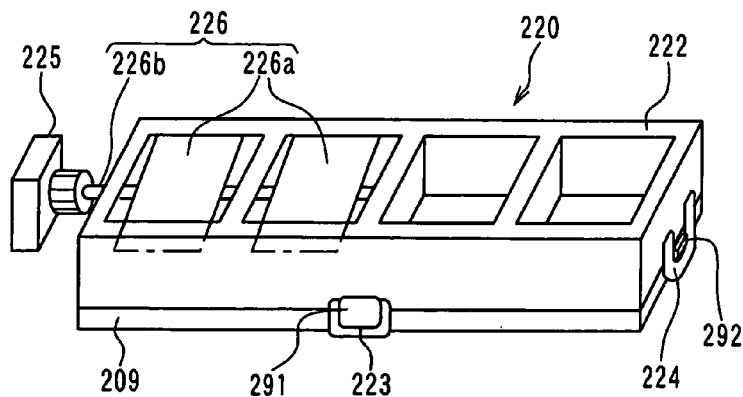
FIG. 37 is a perspective view showing the opening degree adjusting section attached to the face opening section according to the fifteenth embodiment.

Next, the face opening section 209 according to the present embodiment will be explained based on FIGS. 36A, 36B and 37. FIG. 36A is a perspective view showing the opening degree adjusting section 220 according to the present embodiment. FIG. 36B is a perspective view showing the face opening section 209 according to the present embodiment. FIG. 37 is a perspective view showing the opening degree adjusting section 220 fixed to the face opening section 209.

The face opening section 209 according to the present embodiment is divided by partition plates into multiple opening sections including a center face opening section 209a on the driver seat side, a center face opening section 209b on the passenger seat side, a side face opening section 209c on the driver seat side, and a side face opening section 209d on the passenger seat side.

The center face opening section 209a on the driver seat side is connected to the center face outlet on the driver seat side through a duct member (not shown). The center face opening section 209b on the passenger seat side is connected to the center face outlet on the passenger seat side through a duct member (not shown). The side face opening section 209c on the driver seat side is connected to the side face outlet on the driver seat side through a duct member (not shown). The side face opening section 209d on the passenger seat side is connected to the side face outlet on the passenger seat side through a duct member (not shown).

Claw sections 291, 292 projecting outward are formed on an opening edge section (wall surface surrounding face opening section 209) of the face opening section 209 according to the present embodiment.

The opening degree adjusting section 220 constitutes an opening degree adjusting section for adjusting the opening degrees of the opening sections 209b, 209d on the passenger seat side independently from the opening degrees of the opening sections 209a, 209c on the driver seat side among the opening sections 209a, 209b, 209c, 209d of the face opening section 209.

The opening degree adjusting section 220 according to the present embodiment consists of a body separate from the air-conditioning case 202. The opening degree adjusting section 220 is fixed to a connection connected to the duct member for connecting the face opening section 209 and the respective face outlets downstream of the face door 213 with respect to the airflow direction. The duct member (not shown) is structured to be connectable to a frame member 222 of the opening degree adjusting section 220.

The opening degree adjusting section 220 has the frame member 222, a door section 226 and a drive section 225. The frame member 222 can be attached to the outside of the opening edge section of the face opening section 209 of the air-conditioning case 202. The door section 226 is supported by the frame member 222. The drive section 225 drives the door section 226. In the present embodiment, the door section 226 corresponds to a door section of the present invention. The drive section 225 corresponds to a drive section of the present invention.

The frame member 222 is a frame that surrounds the outer circumference of the opening edge section of the face opening section 209. Openings having the same shapes as the respective opening sections 209a-209d of the face opening section 209 are formed in a part of the frame member 222 facing the face opening section 209. The frame member 222 has engaging sections 223, 224 that can engage with the claw sections 291, 292 provided on the outside of the opening edge section of the face opening section 209. The frame member 222 is made of a material similar to the material of the air-conditioning case 202 (e.g., polypropylene containing talc).

The door section 226 consists of two plate-like door base plates 226a and a door shaft 226b. The two plate-like door base plates 226a are for adjusting the opening degrees of the opening sections 209b, 209d on the passenger seat side in the face opening, section 209. The door shaft 226b rotatably supports the door base plates 226a. The door base plates 226a are made of the polypropylene, for example. The door shaft 226b is made of a PBT resin (polybutylene terephthalate resin) or a POM resin (polyacetal resin).

The door shaft 226b is rotatably supported by bushings (not shown) provided to the frame member 222. An end of the door shaft 226b penetrates through the frame member 222 and is connected to the drive section 225, which is provided outside the frame member 222 and which consists of a servomotor or a manipulation lever for manual operation and the like. The drive section 225 is constructed such that the drive section 225 can be operated according to a control signal from an air-conditioning controller (not shown) or manipulation of the manipulation lever performed by the occupant.

The drive section 225 is configured to adjust the opening degrees of the opening sections 209b, 209d on the passenger seat side independently in the face opening section 209. The respective door base plates 226a according to the present embodiment are driven and rotated by the common drive section 225 in an interlocked manner.

The thus-constructed opening degree adjusting section 220 can be attached to the outside of the opening edge section of the face opening section 209 by engaging the engaging sections 223, 224 of the frame member 222 with the claw sections 291, 292 provided to the outside of the opening edge section of the face opening section 209 as shown in FIG. 37.

Next, an operation of the vehicular air conditioner according to the present embodiment having the above-described construction will be explained. If the vehicular air conditioner is operated, the blower is driven and rotated and the opening degree of the air-mixing door 207 is adjusted according to the control signals outputted from the air-conditioning controller (not shown). The doors 212-215 upstream of the respective opening sections 208-211 and the door section 226 of the opening degree adjusting section 220 downstream of the face door 213 are operated. Further, the above-mentioned refrigeration cycle is brought to an operating state.

The blown air blown from the blower is cooled by the evaporator 204 and a part of the air is reheated by the heater core 205 according to the opening degree of the air mixing door 207. The warm air having passed through the heater core 205 and the cold air having passed through the bypass passage 206 are mixed downstream of the heater core 205 and the bypass passage 206 to form the air-conditioning wind having the adjusted temperature. The air-conditioning wind having the adjusted temperature flows into the respective opening sections 208-211 according to the opened or closed states of the respective doors 212-215 provided to the opening sections 208-211 respectively and is blown into the vehicle compartment. Thus, the air conditioning in the vehicle compartment is performed.

In the present embodiment, the opening degree adjusting section 220 is provided downstream of the face door 213 with respect to the airflow direction. The opening degree adjusting section 220 is for adjusting the opening degrees of the opening sections 209b, 209d on the passenger seat side independently from the opening sections 209a, 209c on the driver seat side among the opening sections 209a-209d constituting the face opening section 209.

Therefore, when the face opening section 209 is opened by the face door 213, the air volume of the air-conditioning wind blown to the driver seat side and the air volume of the air-conditioning wind blown to the passenger seat side are adjusted according to the opening degrees of the opening sections 209b, 209d on the passenger seat side defined by the door section 226 of the opening degree adjusting section 220.

According to the present embodiment described above, the opening degree adjusting section 220 provided as the body separate from the air-conditioning case 202 is attached to the outside of the opening edge section of the face opening section 209 formed in the air-conditioning case 202. The opening degree adjusting section 220 is constructed to be able to adjust the opening degrees of the opening sections 209b, 209d on the passenger seat side independently from the opening degrees of the opening sections 209a, 209c on the driver seat side among the opening sections 209a, 209b, 209c, 209d of the face opening section 209.

With such the construction, the opening degrees of the opening sections 209b, 209d on the passenger seat side can be independently adjusted with the door section 226, which is supported by the frame member 222 of the opening degree adjusting section 220, without changing the air-conditioning case 202. As a result, the common air-conditioning case 202 can be used in the vehicular air conditioners having the different functions.

The opening degree adjusting section 220 according to the present embodiment is constructed to be able to adjust the opening degrees of the opening sections 209b, 209d on the passenger seat side among the opening sections 209a-209d constituting the face opening section 209. Therefore, the air-conditioning wind can be blown to the driver seat side in priority to the passenger seat side. That is, the air conditioning concentrated on the driver seat side can be realized by adjusting the opening degrees of the opening sections on the passenger seat side to blow the air-conditioning wind to the driver seat side in priority to the passenger seat side when there is no occupant on the passenger seat side. Thus, the feeling of the occupant about the air conditioning can be improved.

The opening degree adjusting section 220 according to the present embodiment drives the respective door base plates 226a, which are used for adjusting the opening degrees of the two opening sections 209b, 209d on the passenger seat side, with the common drive section 225. Therefore, increase in the number of parts of the opening degree adjusting section 220 can be suppressed.

In the present embodiment, the opening degree adjusting section 220 adjusts the opening degrees of the opening sections 209b, 209d on the passenger seat side in the face opening section 209. Alternatively, the opening degree adjusting section 220 may be constructed to adjust at least one of the opening degrees of the opening sections 209b, 209d on the passenger seat side.

(Sixteenth Embodiment)

Figure 38A:
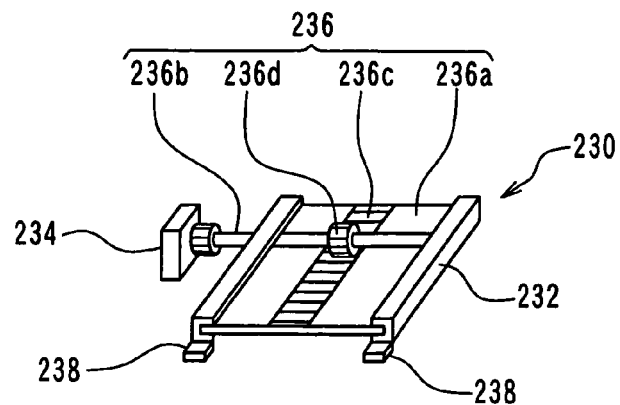
FIG. 38A is a perspective view showing an opening degree adjusting section according to a sixteenth embodiment of the present invention.
Figure 38B:
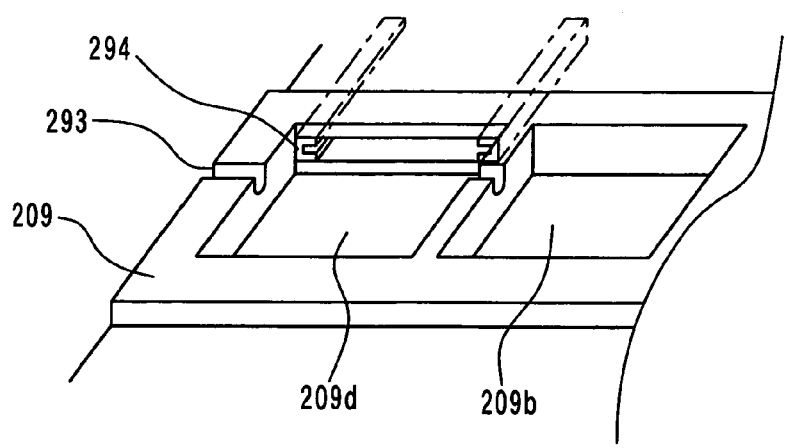
FIG. 38B is a perspective view showing a part of a face opening section according to a sixteenth embodiment.
Figure 39:
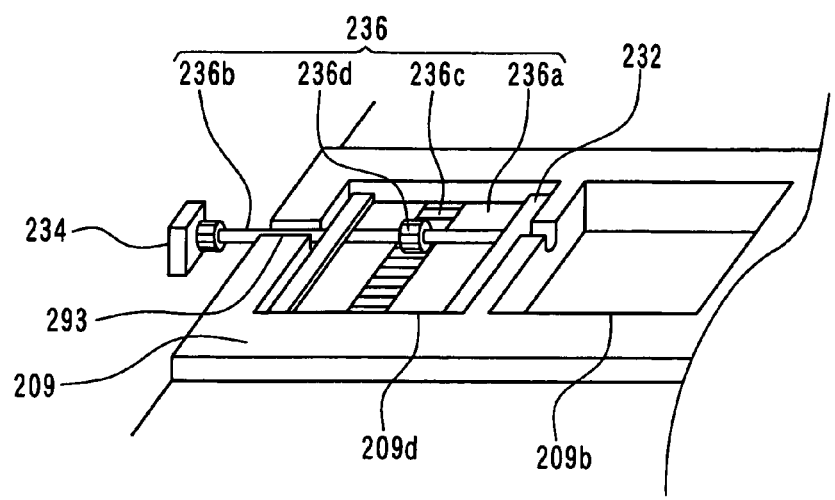
FIG. 39 is a perspective view showing the opening degree adjusting section attached to the part of the face opening section according to the sixteenth embodiment.

Next, a sixteenth embodiment of the present invention will be explained based on FIGS. 38A, 38B and 39. FIG. 38A is a perspective view showing an opening degree adjusting section 230 according to the present embodiment. FIG. 38B is a perspective view showing a part of the face opening section 209 according to the present embodiment. FIG. 39 is a perspective view showing the opening degree adjusting section 230 fixed to the part of the face opening section 209.

The opening degree adjusting section 220 according to the fifteenth embodiment is constructed by attaching the frame member 222, which supports the door section 226, to the outside of the opening edge section of the face opening section 209. Differently from the construction of the fifteenth embodiment, the opening degree adjusting section 230 according to the present embodiment is constructed by attaching a frame member 232 to an inside of the opening of the face opening section 209. The present embodiment will be explained below by using an example that attaches a door section 236 of the opening degree adjusting section 230 to the side face opening section 209d on the passenger seat side in the face opening section 209.

The opening degree adjusting section 230 according to the present embodiment has a frame member 232, the door section 236 and a drive section 234. The frame member 232 is made of a resin (e.g., polypropylene) and can be accommodated inside each of the opening sections 209a-209d of the face opening section 209. The door section 236 is supported by the frame member 232 and used for adjusting the opening degree of each of the opening sections 209a-209d. The drive section 234 drives the door section 236.

The door section 236 according to the present embodiment has a sliding door 236a made of a resin (e.g., polypropylene). The sliding door 236a can move in a direction perpendicular to an alignment direction of the opening sections 209a-209d of the face opening section 209 and along the plane of the opening. A tooth section 236c (rack) is formed on a central portion of a plate surface of the sliding door 236a such that the tooth section 236c extends in the movement direction of the door 236a. The tooth section 236c engages with a pinion 236d provided to a rotation drive shaft 236b made of a resin (e.g., PBT resin or POM resin). The drive section 234 for driving and rotating the rotation drive shaft 236b is connected to an end of the rotation drive shaft 236b.

The frame member 232 consists of a pair of rail sections, which extend along the movement direction of the sliding-door 236a and support two sides of the sliding door 236a parallel to the movement direction of the door 236a. Rail grooves are formed in the respective rail sections of the frame member 232 such that the sliding door 236a can move.

The frame member 232 has engaging sections 238, which engage with claw sections (not shown) provided inside each of the opening sections 209a-209d of the face opening section 209 in the state where the frame member 232 supports the sliding door 236a. The frame member 232 has bushings (not shown) for rotatably supporting the rotation drive shaft 236b.

A penetrating groove section 293 is formed in the opening edge section of each of the opening section 209a-209d of the face opening section 209 according to the present embodiment. The rotation drive shaft 236b projects from the inside to the outside of the opening edge section through the penetrating groove section 293. The rotation drive shaft 236b is connected to the drive section 234 provided outside the opening edge section through the penetrating groove section 293.

A door accommodation section 294 is provided inside the opening edge section of the side face opening section 209d on the passenger seat side in the face opening section 209 according to the present embodiment. The door accommodation section 294 accommodates the sliding door 236a when the sliding door 236a moves in a direction for opening the side face opening section 209d on the passenger seat side.

Rail grooves are formed in the door accommodation section 294 like the frame member 232 such that the sliding door 236a can move. The door accommodation section 294 is sealed to prevent the blown air from leaking through the rail grooves. The door accommodation sections 294 are provided also in the other opening sections 209a-209c of the face opening section 209 respectively.

The opening degree adjusting section 230 having the above-described construction can be attached to the inside of the opening edge section of the face opening section 209 by engaging the engaging sections 238 of the frame member 232 with the claw sections (not shown) provided to the inside of the opening edge section of the face opening section 209 as shown in FIG. 39. If the rotation drive shaft 236b is rotated by the drive section 234 in the state shown in FIG. 39, the sliding door 236a moves to open the side face opening section 209d on the passenger seat side.

According to the present embodiment described above, the opening degree adjusting section 230 provided as the body separate from the air-conditioning case 202 is attached to the inside of the opening edge section of the side face opening section 209d on the passenger seat side formed in the air-conditioning case 202. The opening degree of the side face opening section 209d on the passenger seat side can be adjusted independently from the other face opening sections 209a-209c.

With such the construction, the opening degree of the side face opening section 209d on the passenger seat side can be independently adjusted with the door section 236, which is supported by the frame member 232 of the opening degree adjusting section 230, without changing the air-conditioning case 202. As a result, the common air-conditioning case 202 can be used in the vehicular air conditioners having the different functions.

The opening degree adjusting section 230 according to the present embodiment has the engaging sections 238, at which the frame member 232 engages with the inside of the side face opening section 209d on the passenger seat side in the state where the frame member 232 supports the door section 236. Therefore, the opening degree adjusting section 230 can be accommodated inside the side face opening section 209d on the passenger seat side.

With such the construction, even if the opening degree adjusting section 230 is attached to the inside of the side face opening section 209d on the passenger seat side, an external shape of the air-conditioning case 202 is unchanged. Therefore, for example, when the duct member is connected to the outside of the opening edge section of each of the opening sections 208-211 of the air-conditioning case 202, there is no need to change the structure of the connection of the duct member connected to the face opening section 209. Accordingly, the common duct can be used among the vehicular air conditioners having the different functions.

In the present embodiment, the opening degree adjusting section 230 adjusts the opening degree of the side face opening section 209d on the passenger seat side in the face opening section 209. Alternatively, the opening degree of the center face opening section 209b on the passenger seat side may be adjusted in addition to the opening degree of the side face opening section 209d on the passenger seat side.

In this case, the frame member 232 supporting the sliding door 236a may be accommodated inside the opening edge section of the center face opening section 209b on the passenger seat side. The other end of the rotation drive shaft 236b opposite to the drive section 234 may be extended to cross the center face opening section 209b on the passenger seat side, and the pinion 236d to be engaged with the tooth portion 236c of the sliding door 236a may be provided to the extended portion.

(Seventeenth Embodiment)

Figure 40:
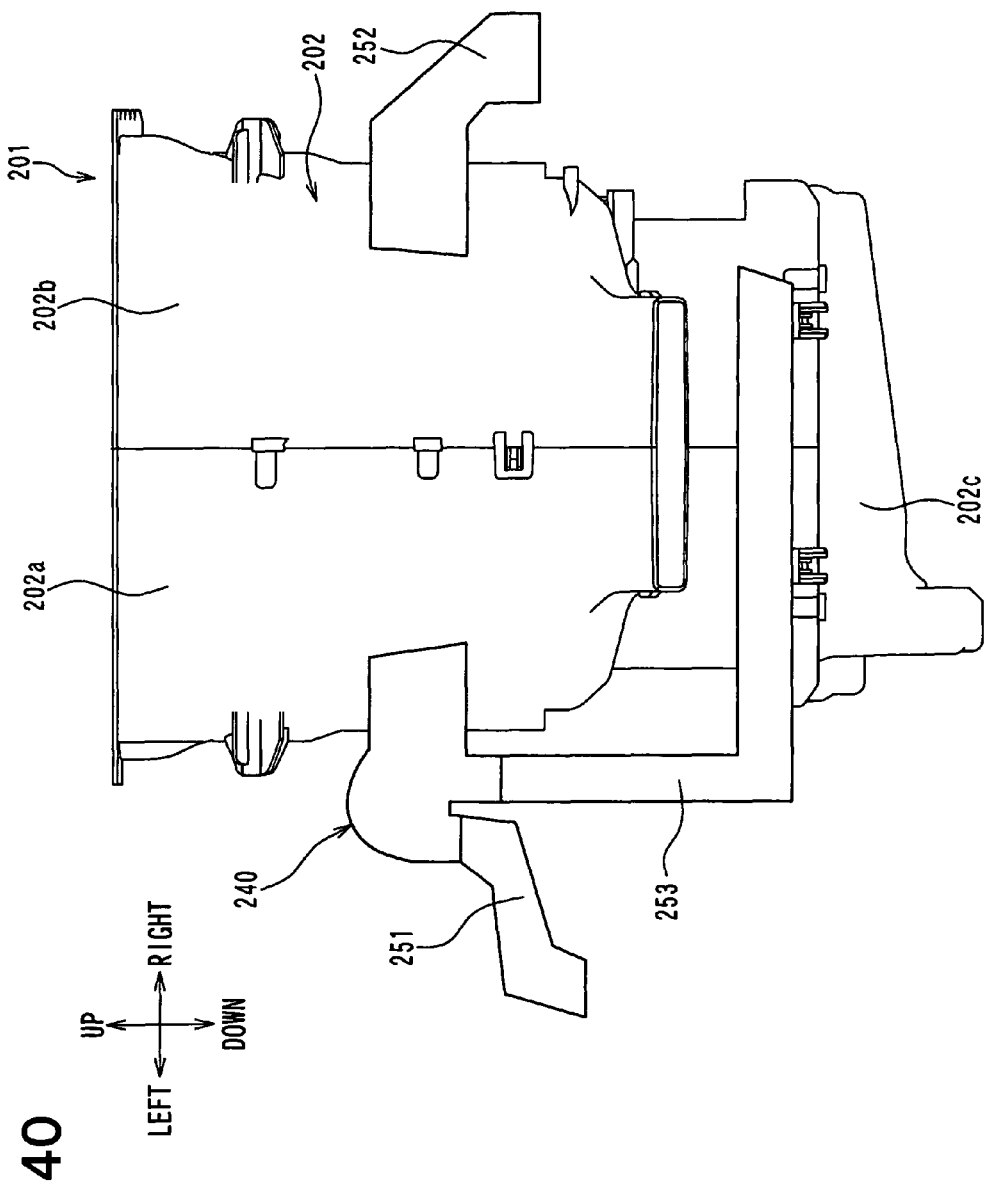
FIG. 40 is a front view showing an external appearance of an air-conditioning unit according to a seventeenth embodiment of the present invention.
Figure 41:
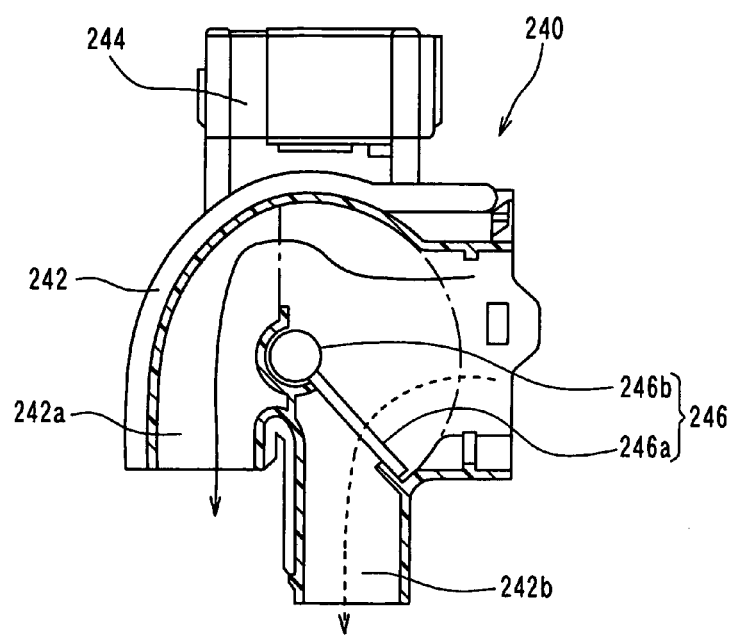
FIG. 41 is a cross-sectional view showing an opening degree adjusting section according to the seventeenth embodiment.

Next, a seventeenth embodiment of the present invention will be explained based on FIGS. 40 and 41. FIG. 40 is a front view showing an external appearance of an air-conditioning unit 201 according to the seventeenth embodiment. In FIG. 40, the air-conditioning unit 201 is seen from the backside of the vehicle. FIG. 41 is a cross-sectional view showing an opening degree adjusting section 240 provided in a connection between a foot opening section (not shown) on a passenger seat side and duct members 251, 253 according to the present embodiment.

A foot opening section 210 according to the present embodiment has the foot opening section (not shown) on the passenger seat side and a foot opening section (not shown) on the driver seat side.

A foot duct member 251 on the passenger seat side and a middle duct member 253 on the driver seat side are connected to the foot opening section on the passenger seat side (refer to FIG. 40). The foot duct member 251 on the passenger seat side is for leading the air-conditioning wind to the foot outlet on the passenger seat side for blowing the air-conditioning wind to the feet of the occupant on the passenger seat side. The middle duct member 253 on the driver seat side is for leading the air-conditioning wind to a middle outlet on the driver seat side for blowing the air-conditioning wind to a space near the thighs of the occupant on the driver seat side. That is, the two duct members of the foot duct 251 on the passenger seat side and the middle duct member 253 on the driver seat side corresponding to the both of the foot outlet on the passenger seat side and the middle outlet on the driver seat side are connected to the foot opening section on the passenger seat side.

A foot duct member 252 on the driver seat side is connected to the foot opening section on the driver seat side (refer to FIG. 40). The foot duct member 252 on the driver seat side is for leading the air-conditioning wind to the foot outlet on the driver seat side for blowing the air-conditioning wind to the feet of the occupant on the driver seat side.

In the present embodiment, the opening degree adjusting section 240 is provided in a connection between the foot opening section on the passenger seat side and the foot duct member 251 on the passenger seat side downstream of the foot door 214 with respect to the airflow direction. The opening degree adjusting section 240 is constituted to be able to adjust a passage opening degree of an air passageway in the foot duct member 251 on the passenger seat side and a passage opening degree of an air passageway in the middle duct member 253 on the driver seat side.

More specifically, the opening degree adjusting section 240 has a frame member 242 (refer to FIG. 41). The frame member 242 has an engaging section (not shown) engaged with an opening edge section of the foot opening section on the passenger seat side and engaging sections (not shown) respectively engaged with the foot duct member 251 on the passenger seat side and the middle duct member 253 on the driver seat side. The frame member 242 functions also as a connection member for connecting the foot duct member 251 on the passenger seat side and the middle duct member 253 on the driver seat side to the foot opening section on the passenger seat side.

As shown in FIG. 41, air passageways 242*a*, 242*b* are formed inside the frame member 242. The air passageway 242*a* is for leading the air from the foot opening section on the passenger seat side to the foot duct member 251 on the passenger seat side. The air passageway 242*b* is for leading the air from the foot opening section on the passenger seat side to the middle duct member 253 on the driver seat side.

A door section 246 for adjusting the passage opening degree of the air passageway in the foot duct member 251 on the passenger seat side and the passage opening degree of the air passageway in the middle duct member 253 on the driver seat side is provided in the frame member 242. The door section 246 functions to adjust the opening degree of the foot opening section on the passenger seat side, which opens to the foot outlet on the passenger seat side, and the opening degree of the foot opening section on the passenger seat side, which opens to the middle outlet on the driver seat side.

More specifically, the door section 246 consists of a plate-like door base plate 246*a* and a door shaft 246*b* that rotatably supports the door base plate 246*a*. The door shaft 246*b* is rotatably supported by bushings (not shown) provided to the frame member 242. An end of the door shaft 246*b* penetrates through the frame member 242 and is connected to a drive section 244 provided outside the frame member 242. The drive section 244 consists of a servomotor or a manipulation lever for manual operation and the like. The drive section 244 is constructed to be able to operate according to a control signal from an air-conditioning controller (not shown) or manipulation of the manipulation lever performed by the occupant.

In the present embodiment, the opening degree adjusting section 240 provided as the body separate from the air-conditioning case 202 is attached to the foot opening section on the passenger side in the foot opening section 210 formed in the air-conditioning case 202. The opening degree of the foot opening section on the passenger seat side can be adjusted independently from the foot opening section on the driver seat side.

With such the construction, the opening degree of the foot opening section on the passenger seat side can be adjusted with the door section 246, which is supported by the frame member 242 of the opening degree adjusting section 240, independently from the foot opening section on the driver seat side without changing the air-conditioning case 202. As a result, the common air-conditioning case 202 can be used in the vehicular air conditioners having the different functions.

Moreover, in the present embodiment, the opening degree adjusting section 240 can adjust the air volume distribution of the air-conditioning winds blown from the two duct members of the foot duct member 251 on the passenger seat side and the middle duct member 253 on the driver seat side.

For example, the air-conditioning wind can be blown to the driver seat in priority to the passenger seat by closing the air passageway 242*a* corresponding to the foot duct member 251 on the passenger seat side and by opening the air passageway 242*b* corresponding to the middle duct member 253 on the driver seat side with the door section 246. That is, the air conditioning concentrated on the driver seat can be realized by adjusting the opening degree of the opening section on the passenger seat side such that the air-conditioning wind is blown to the driver seat in priority to the passenger seat when there is no occupant in the passenger seat. Thus, the occupant's feeling about the air conditioning can be improved.

(Modifications)

The above-described fifteenth to seventeenth embodiments may be modified as follows, for example.

(a) The door section 226 is constituted by the plate-like door base plate 226*a* in the fifteenth embodiment. Alternatively, the construction of the sliding door of sixteenth embodiment may be used for the door section 226.

The door section 236 of the sixteenth embodiment is constituted by the sliding door 236*a*. Alternatively, the door section 236 may be constituted by the plate-like door base plate of the fifteenth embodiment.

In the seventeenth embodiment, the door section 246 adjusts the passage opening degree of the air passageway in the foot duct member 251 on the passenger seat side and the passage opening degree of the air passageway in the middle duct member 253 on the driver seat side. Alternatively, a construction of adjusting only the opening degree of the foot opening section on the passenger seat side may be used instead of the construction that adjusts the passage opening degrees of the respective air passageways.

(b) In the above-described fifteenth to seventeenth embodiments, the frame members 222, 232, 242 of the opening degree adjusting sections 220, 230, 240 have the engaging sections 223, 224, 238 to be engaged with the claw sections formed in the opening edge sections of the respective opening sections. The engagement between the opening degree adjusting sections 220, 230, 240 and the opening edge sections of the opening sections is not limited thereto. Alternatively, for example, the engagement may be performed by tapping or the like.

(c) In the above-described fifteenth to seventeenth embodiments, the opening degree adjusting sections 220, 230, 240 are provided in the face opening section 209 and the foot opening section 210. Alternatively, an opening degree adjusting section may be provided to the opening section 211 for the backseat.

(d) In the above-described fifteenth embodiment, the door base plates 226a of the door section 226 are driven with the common drive section 225. Alternatively, drive sections 225 may be provided for the respective door base plates 226a of the door section 226, and the respective door base plates 226a may be controlled independently from each other.

(e) In the above-described fifteenth to seventeenth embodiments, the door sections 226, 236, 246 for adjusting the opening degrees of the opening sections on the passenger seat side are provided in the opening degree adjusting sections 220, 230, 240. Alternatively, a door section for adjusting the opening degree of the opening section on the driver seat side may be provided.

(f) In the above-described fifteenth to seventeenth embodiments, the present invention is applied to the vehicular air conditioner, in which the air-conditioning unit 201 is arranged in the lateral center of the vehicle and the blower unit is offset to the passenger seat side in the lateral direction of the vehicle. Alternatively, the present invention may be applied to a vehicular air conditioner, in which the air-conditioning unit 201 and the blower unit are arranged in the lateral center of the vehicle.

(g) In the above-described seventeenth embodiment of the present invention, the opening degree adjusting section 240 is arranged in the connection between the case 202 and the foot ducts 251, 253. Alternatively, for example, the opening degree adjusting section 240 may be provided integrally with the foot ducts 251, 253.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A vehicular air conditioner for a vehicle, the vehicular air conditioner comprising:
    an air-conditioning unit that has a plurality of outlets corresponding to a driver's seat and any other seats in the vehicle and that blows air-conditioned air from the outlets to the driver's seat and the any other seats;
    a blower that is accommodated in the air-conditioning unit and that is driven by an electric motor to generate blown air;
    a switching section provided in the air-conditioning unit for switching between a normal air-conditioning mode, in which the air-conditioned air is blown from a driver's seat outlet corresponding to the driver's seat and the any other outlets corresponding to the any other seats other than the driver's seat, and a single seat concentration mode, in which the blowing of the air-conditioned air from at least one of the any other outlets is prohibited and the air-conditioned air is blown solely from the driver's seat outlet; and
    a controller configured to control the operation of the switching section and to control the amount of the air blown by the blower by setting a supplied power to the blower in accordance with an air-conditioning heat load, wherein
    the controller is configured to execute the normal air-conditioning mode when an occupant is seated in any seat other than the driver's seat,
    the controller is configured to execute the single seat concentration mode when there is no occupant in the seats other than the driver's seat, and
    the controller is configured to set the supplied power to the blower in the single seat concentration mode to be smaller than in the normal air-conditioning mode at any given air-conditioning heat load.

2. The vehicular air conditioner as in claim 1, further comprising:
    a heating heat exchanger provided in the air-conditioning unit for heating the blown air by using a cooling fluid, the cooling fluid being used for cooling a drive unit used to obtain a driving force for running the vehicle, as a heat source, wherein
    the controller is configured to request operation of the drive unit when the temperature of the cooling fluid is lower than a predetermined temperature,
    the controller is configured to set the predetermined temperature based on the air-conditioning heat load, and
    the controller is configured to set the predetermined temperature in the single seat concentration mode to be lower than in the normal air-conditioning mode at any given air-conditioning heat load.

3. The vehicular air conditioner as in claim 2, wherein
    the air-conditioning unit further includes at least another one outlet, which is provided to correspond with the driver's seat;
    the controller prohibits the blowing of the air-conditioned air from the at least another one outlet during the normal air-conditioning mode; and
    the controller permits the blowing of the air-conditioned air from the at least another one outlet during the single seat concentration mode.

4. The vehicular air conditioner as in claim 2, wherein
    when the occupant manipulates an economy switch to select an economy mode during the single seat concentration mode, the controller is configured to set the predetermined temperature to be lower than in the normal air-conditioning mode for any given air-conditioning heat load.

5. The vehicular air conditioner as in claim 1, wherein the plurality of outlets are foot outlets for blowing the air-conditioned air toward the feet of any occupants in the driver's seat and in the any other seats, and
    the controller is configured to execute the single seat concentration mode during a foot outlet mode, in which warm air is blown from at least the foot outlets.

6. The vehicular air conditioner as in claim 1, wherein
    when the occupant manipulates an economy switch to select an economy mode during the single seat concentration mode, the controller is configured to set the power supplied to the blower to be smaller than in the normal air-conditioning mode for any given air-conditioning heat load.

7. The vehicular air conditioner as in claim 1, wherein
the air-conditioning unit has a defroster outlet for blowing the air-conditioned air toward a windshield of the vehicle and also has an opening degree adjusting section for adjusting an opening degree of the defroster outlet, and the controller is configured to control the opening degree adjusting section during the single seat concentration mode such that the opening degree of the defroster outlet becomes smaller than in the normal air-conditioning mode.

8. A vehicular air conditioner for a vehicle, the vehicular air conditioner comprising:

an air-conditioning unit that has a plurality of outlets corresponding to a driver's seat and any other seats in the vehicle and that blows air-conditioned air from the outlets to the driver's seat and the any other seats;

a switching section provided in the air-conditioning unit for switching between a normal air-conditioning mode, in which the air-conditioned air is blown from a driver's seat outlet corresponding to the driver's seat and the any other outlets corresponding to the any other seats other than the driver's seat, and a single seat concentration mode, in which the blowing of the air-conditioned air from at least one of the any other outlets is prohibited and the air-conditioned air is blown solely from the driver's seat outlet;

a heating heat exchanger that is provided in the air-conditioning unit and that heats the blown air heading to an inside of a vehicle compartment of the vehicle by using a cooling fluid, the cooling fluid cooling a drive unit used for obtaining a driving force for running the vehicle, as a heat source; and a controller configured to control operation of the switching section and to request an operation of the drive unit when a temperature of the cooling fluid is lower than a predetermined temperature, wherein the controller is configured to execute the normal air-conditioning mode when there is an occupant in any of the any other seats other than the driver's seat, the controller is configured to execute the single seat concentration mode when there is no occupant in any of the any other seats other than the driver's seat, the controller is configured to set the predetermined temperature based on an air-conditioning heat load, and the controller is configured to set the predetermined temperature in the single seat concentration mode to be lower than in the normal air-conditioning mode at any given air-conditioning heat load.

* * * * *